United States Patent
Miyachi et al.

(10) Patent No.: US 7,342,632 B2
(45) Date of Patent: Mar. 11, 2008

(54) DISPLAY ELEMENT AND DISPLAY DEVICE

(75) Inventors: Koichi Miyachi, Soraku-gun (JP); Seiji Shibahara, Tenri (JP); Iichiro Inoue, Tenri (JP); Akihito Jinda, Kitakatsuragi-gun (JP); Takako Koide, Kashihara (JP); Kiyoshi Ogishima, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 514 days.

(21) Appl. No.: 11/035,425

(22) Filed: Jan. 14, 2005

(65) Prior Publication Data

US 2005/0179847 A1    Aug. 18, 2005

(30) Foreign Application Priority Data

Jan. 16, 2004  (JP)  ............................. 2004-009832
Jan. 13, 2005  (JP)  ............................. 2005-006872

(51) Int. Cl.
  *G02F 1/1343*  (2006.01)
  *C09K 19/02*  (2006.01)

(52) U.S. Cl. ............... 349/141; 349/168; 349/170; 349/171

(58) Field of Classification Search ............ 349/141, 349/168, 170, 171
See application file for complete search history.

(56) References Cited

U.S. PATENT DOCUMENTS

| | | |
|---|---|---|
| 4,943,386 A | 7/1990 | Takehara et al. |
| 5,753,139 A * | 5/1998 | Wand et al. ............ 252/299.01 |
| 5,852,485 A | 12/1998 | Shimada et al. |
| 6,266,109 B1 * | 7/2001 | Yamaguchi et al. ......... 349/86 |
| 6,829,028 B2 | 12/2004 | Lai et al. |
| 2005/0151912 A1 * | 7/2005 | Miyachi et al. ............ 349/141 |
| 2005/0162607 A1 * | 7/2005 | Miyachi et al. ............ 349/179 |
| 2005/0168663 A1 * | 8/2005 | Miyachi et al. ............ 349/24 |
| 2005/0179632 A1 * | 8/2005 | Miyachi et al. ............ 345/87 |
| 2005/0185105 A1 * | 8/2005 | Miyachi et al. ............ 349/24 |
| 2005/0185125 A1 * | 8/2005 | Miyachi et al. ............ 349/128 |
| 2005/0237472 A1 * | 10/2005 | Shibahara et al. ......... 349/167 |

(Continued)

FOREIGN PATENT DOCUMENTS

JP    6-214244 A    8/1994

(Continued)

OTHER PUBLICATIONS

Saito et al, "Thermodynamics of a Unique Thermo-Tropic Liquid Crystal Having Optical Isotropy", Ekisho, Vo. 5, No. 1, 2001, pp. 20-27 w/partial English Translation.

(Continued)

*Primary Examiner*—Mike Qi
(74) *Attorney, Agent, or Firm*—Nixon & Vanderhye, P.C.

(57) ABSTRACT

A display element of the present invention includes: a pair of substrates at least one of which is transparent; a medium layer, made of a medium sandwiched between the substrates 1 and 2, whose magnitude of an optical anisotropy is changed by applying an electric field; and at least a pair of electrodes applying to the medium layer an electric field which is substantially parallel to the substrates. The electrodes are provided above the substrate via insulating layers each of which is formed in a convex shape. Therefore, a maximal electric field region generated by the electrodes is separated from interfaces of the substrates.

102 Claims, 18 Drawing Sheets

U.S. PATENT DOCUMENTS

2007/0070282 A1* 3/2007 Shibahara et al. .......... 349/141

FOREIGN PATENT DOCUMENTS

| JP | 6-250159 A | 9/1994 |
|---|---|---|
| JP | 9-211477 A | 8/1997 |
| JP | 11-231344 A | 8/1998 |
| JP | 11-64886 A | 3/1999 |
| JP | 11-174493 A | 7/1999 |
| JP | 11-183937 A | 7/1999 |
| JP | 2001-249363 A | 9/2001 |

OTHER PUBLICATIONS

Yamamoto, "Liquid Crystal Micro Emulsion", Ekisho, vol. 4, No. 3, 2000, pp. 248-254 (partial English Translation).

Yoneya, "Examining Nano-Structured Liquid Crystal Phase by Molecule Simulator", Ekisho, vol. 7, No. 3, 2003, pp. 238-245 (partial English Translation).

Yamamoto, "First Lecture of Liquid Crystal Science Experiment: Identification of Liquid Crystal Phase", Lyotropic Liquid Crystal, Ekisho, vol. 6, No. 1, 2002, pp. 72-83 (partial English Translation).

Yamamoto et al, "Organic Electrooptic Materials", National Technical Report, vol. 22, No. 6, Dec. 1976, pp. 826-834 (partial English Translation).

Shiraishi et al, "Palladium Nanoparticles Covered with Liquid-Crystalline Molecules-Preparation and Elecro-Optic Properties of Liquid-Crystal Displays Doped with Palladium Nanoparticles", vol. 59, No. 12, Dec. 2002, pp. 753-759 (partial English Translation).

Matsumoto et al, "Fine Droplets of Liquid Crystals in a Transparent Polymer and Their Response to an Electric Field", Appl. Phys. Lett., 69, 1996, pp. 1044-1046.

Mizoshita et al, "Fast and High-Contrast Electro-Optical Switching of Liquid-Crystalline Physical Gels" Formation of Oriented Microphase-Separated Structures, Adv. Funct. Mater., vol. 13, No. 4, Apr. 2003, pp. 313-317.

Kikuchi et al, "Polymer-Stabilized Liquid Crystal Blue Phases", Nature Materials, vol. 1, Sep. 2002 pp. 64-68.

Diele et al, "Chapter XIII Thermotropic Cubic Phases", Handbook of Liquid Crystals, Demus et al, WILEY-VCH, vol. 2B, 1998, pp. 887-900.

Demus et al, Handbook of Liquid Crystals, vol. 1: Fundamentals, 1998, pp. 484-485 & 530.

Grelet et al, "Structural Investigations on Smectic Blue Phases", Physical Review Letters, vol. 86, No. 17, pp. 3791-3794.

\* cited by examiner

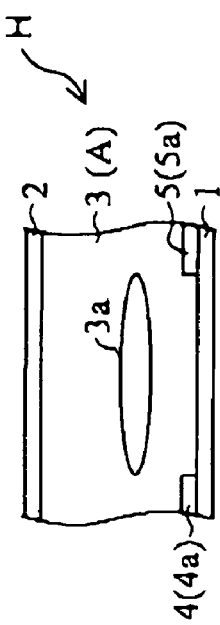
FIG. 6(a)
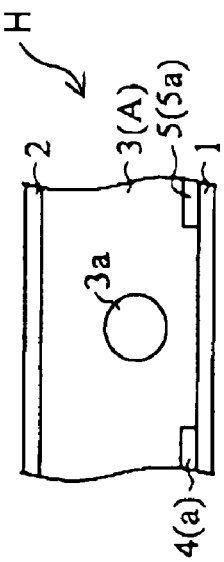
FIG. 6(b)
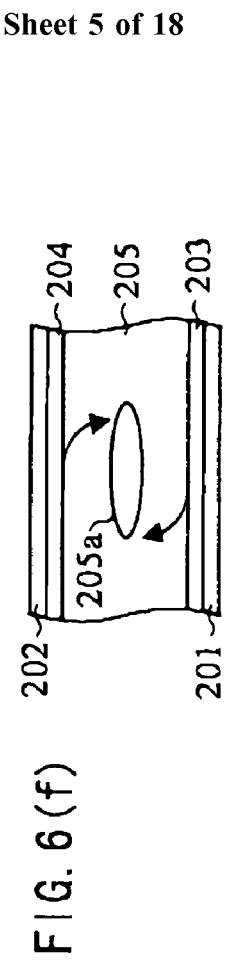
FIG. 6(c)
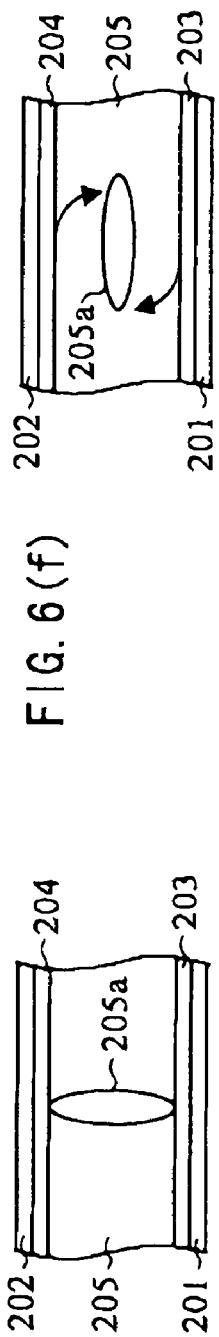
FIG. 6(d)
FIG. 6(e)
FIG. 6(f)
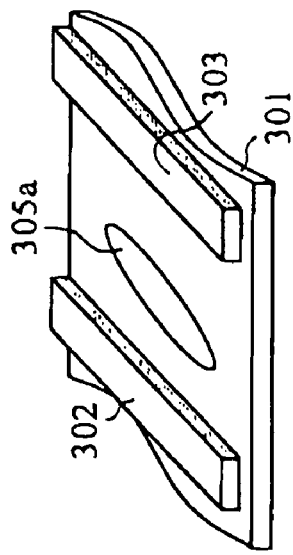
FIG. 6(g)
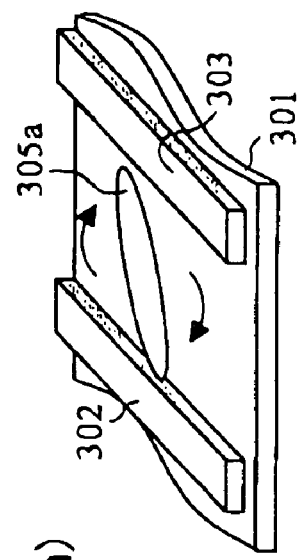
FIG. 6(h)
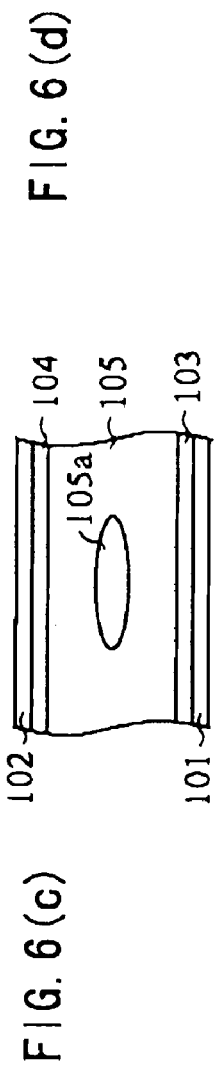

GENERAL VIEW OF AGGLOMERATIONS | PACKING PARAMETER

SPATIAL PACKING AND PHASES

MICELLE — <1/3

ROD-LIKE MICELLE — <1/2

BILAYER MEMBRANE — ~1

REVERSE MICELLE — >1

(a) SPHERICAL MICELLE (b) STRING-LIKE/ELLIPTICAL MICELLE (c) MIDDLE (d) CUBIC (e) VESICLE (f) SPONGE (g) LAMELLAR(Lα)

(h) LAMELLAR(Lβ)

(i) LAMELLAR(Pα)

(j) CUBIC (k) REVERSE MICELLE (l) REVERSE MICELLE (ORDERLY PHASE)

DISPLAY ELEMENT AND DISPLAY DEVICE

This Nonprovisional application claims priority under 35 U.S.C. § 119(a) on Patent Application Nos. 2004/9832 and 2005/6872 filed in Japan respectively on Jan. 16, 2004 and on Jan. 13, 2005, the entire contents of which are hereby incorporated by reference.

FIELD OF THE INVENTION

The present invention relates to a display element and a display device each of which has a high-speed response property and a wide viewing angle display property.

BACKGROUND OF THE INVENTION

As compared with various display elements, a liquid crystal display element has advantages such as thinner size, light weight, and lower power consumption. The liquid crystal display element is widely used in image display apparatuses such as televisions, videocassette recorders, and the like, and OA (Office Automation) apparatuses such as monitors, word processors, personal computers, and the like.

Conventionally known liquid crystal display methods of the liquid crystal display elements are, for example, the TN (Twisted Nematic) mode in which a nematic liquid crystal is used, display modes in which FLC (Ferroelectric Liquid crystal) or AFLC (Antiferroelectric Liquid crystal) is used, a polymer dispersion type liquid crystal display mode, and a similar mode.

Among the liquid crystal display modes, for example, the TN (Twisted Nematic) mode in which the nematic liquid crystal is used is conventionally adopted in the liquid crystal display elements in practical use. However, the liquid crystal display elements using the TN mode have disadvantages such as slow response, narrow viewing angle, and similar drawbacks. Those disadvantages are large hindrances for the TN mode to take over CRT (Cathode Ray Tube).

Moreover, the display mode in which FLC or AFLC is used has advantages such as high-speed response and wide viewing angles, but is significantly poor in shock-resistant property and temperature property. Therefore, the display mode in which the FLC or AFLC is used has not been widely in practical use.

Further, the polymer dispersion type liquid crystal display mode, which utilizes scattering of light, does not require polarizer and is capable of performing a bright display. However, in principle, the polymer dispersion type liquid crystal display mode cannot control the viewing angle by using a phase plate. Furthermore, the polymer dispersion type liquid crystal display mode has a problem with a response property. Therefore, the polymer dispersion type liquid crystal display mode is not really superior to the TN mode.

In all those display modes, liquid crystal molecules are orientated in a certain direction and thus a displayed image looks different depending on an angle between a line of vision and the liquid crystal molecules. On this account, all those display modes have limits in terms of a viewing angle. Moreover, all those display modes utilize rotation of the liquid crystal molecules which is caused by applying an electric field to the liquid crystal molecules. Because the liquid crystal molecules are rotated in alignment all together, all those display modes take time to respond. Note that, the display modes in which the FLC and the AFLC are used have advantages in the response speed and the viewing angle, but have such a problem that their alignment would be irreversibly destroyed by an external force.

In opposition to those display modes in which the rotation of the molecules by the application of the electric field is utilized, a display mode of an electronic polarization in which the secondary electro-optic effect is utilized is proposed.

The electro-optic effect is a phenomenon in which a refractive index of a material is changed by an external electric field. There are two types of the electro-optic effect: one is an effect proportional to the electric field and the other is proportional to the square of the electric field. The former is called Pockel's effect and the latter is called Kerr effect. Especially Kerr effect (secondary electro-optic effect) has been adopted in high-speed optical shutters early on, and has been practically used in a special measurement instruments. Kerr effect was discovered by J. Kerr in 1875. So far, organic liquid such as nitrobenzene, carbon disulfide, and the like, are known as materials showing Kerr effect. Those materials are used, for example, in the aforementioned optical shutters, and also used for measurement of intensity of high electric fields for power cables and the like.

Later on, it was found that liquid crystal materials have a large Kerr constant. Researches on basic technology have been conducted to utilize the large Kerr constant of the liquid crystal materials for use in optical modulation devices, light deflection devices, and further optical integrated circuit. It was reported that a certain liquid crystal compound has a Kerr constant more than 200 times higher than that of nitrobenzene.

Under those circumstances, studies for utilizing Kerr effect in display apparatuses have been started. Because Kerr effect is proportional to the square of the electric field, it is expected that the utilization of Kerr effect will attain relatively a low voltage driving. Further, it is expected that the utilization of Kerr effect will attain a high-speed response display apparatus because Kerr effect shows a response property of several µ seconds to several m seconds, as its basic nature.

Under those circumstances, for example, Japanese Unexamined Patent Publication No. 249363/2001 (Tokukai 2001-249363, published on Sep. 14, 2001, hereinafter referred to as "Document 1"), Japanese Unexamined Patent Publication No. 183937/1999 (Tokukaihei 11-183937, published on Jul. 9, 1999, hereinafter referred to as "Document 2", Corresponding U.S. patent application Ser. No. 6,266,109), and "Shiro Matsumoto and three others, "Fine droplets of liquid crystal in a transparent polymer and their response to an electric field", Appl. Phys., 1996, Lett., 69, p. 1044-1046" (hereinafter referred to as "Non-patent Document 1") suggest an element to be used as a display element. The element is structured such that a medium made of the liquid crystal material is injected and sealed between a pair of substrates, and an electric field parallel to the substrate or an electric field perpendicular to the substrate is applied to the substrate in order to induce Kerr effect.

Moreover, Document 1 suggests that an alignment treatment should be carried out onto the surface of the substrate in advance so that Kerr effect is easily expressed.

Furthermore, Document 2 suggests that optically-responsive medium should be divided into sub-regions so that Kerr effect is easily expressed.

However, any of the conventional methods cannot adequately reduce the driving voltage for a practical use.

SUMMARY OF THE INVENTION

An object of the present invention is to provide a display element and a display device each of which requires less driving voltage than before.

In order to achieve the above object, the display element of the present invention includes: a pair of substrates at least one of which is transparent; a medium, sandwiched between the substrates, whose magnitude of an optical anisotropy is changed by applying an electric field; and at least a pair of electrodes for applying to the medium an electric field which is substantially parallel to the substrates, wherein each of the above members is structured such that it is possible to increase a thickness to which the electric field is practically applied and a thickness (practical thickness) of a medium layer which practically responds.

More concretely, in order to achieve the above object, the display element of the present invention includes: for example, a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein, the electrodes are provided such that a maximal electric field region is separated from interfaces of the substrates.

Such display element has at least one of the following arrangements; an arrangement in which a concave portion is formed between at least a pair of the electrodes so as to be concaved lower than the electrodes; an arrangement in which at least one of the electrodes is formed above the substrate via an insulating layer formed in a convex shape; an arrangement in which at least one of the electrodes is structured such that a plurality of electrodes are stacked via insulating layers; an arrangement in which at least one of the electrodes is formed such that a height of the electrode in a substrate normal direction is 0.5 µm or more; an arrangement in which at least one of the electrodes is formed so as to cover at least part of an insulating layer formed in a convex shape; and an arrangement in which the electrodes are formed on side surfaces of insulating layers each of which is formed in a convex shape, and electrodes which are not electrically connected to those electrodes are further provided on the side surfaces of the insulating layers.

In the present invention, the wording "changeable in an optical anisotropy magnitude by and according to electric field application" indicates that the magnitude of the optical anisotropy is changeable by and according to the electric field applied. More specifically, a shape of a refractive index ellipsoid is changeable by and according to the electric field applied. That is, in the display element according to the present invention, it is possible to realize different display states by utilizing change in the shape of the refractive index ellipsoid depending whether the electric field is applied or not.

That is, the refractive index in materials is not isotropic in general and differs depending on directions. This anisotropy in the refractive index, that is, the optical anisotropy of the material is generally due to the refractive index ellipsoid. In general, it is considered that a plane passing the original point and perpendicular to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction. When the optical anisotropy is discussed in terms of the refractive index ellipsoid, the different display states are realized in a conventional liquid crystal device by changing (rotating) a direction of a major axial direction of the refractive index ellipsoid of a liquid crystal molecule by application of electric field. Here, the shape (shape of cross section of the refractive index ellipsoid) of the refractive index ellipsoid is not changed (constantly ellipsoidal). On the other hand, in the present invention, the different display states are realized by changing the shape (shape of cross section of the refractive index ellipsoid) of the refractive index ellipsoid formed from molecules constituting the medium.

As described above, in the conventional liquid crystal display element, the display operation is carried out by utilizing only the change in the orientational direction of the liquid crystal molecules due to rotation thereof caused by the electric field application. The liquid crystal molecules in alignment are rotated together in one direction. Thus, inherent viscosity of the liquid crystal largely affects responding speed. On the other hand, the present invention, in which the display is carried out by utilizing the change in the modulation of the optical anisotropy in the medium, is free from the problem that the inherent viscosity of the liquid crystal largely affects responding speed, unlike the conventional liquid crystal display element. Thus, it is possible to realize high-speed responding. Moreover, the high-speed responding allows the display element to be used, for example, in a display device of the field sequential color mode.

Moreover, the conventional liquid crystal display element has such a problem that its driving temperature range is limited to temperatures near a phase transition point of a liquid crystal phase, and thus it requires a highly accurate temperature control. On the other hand, the present invention is only required that the medium be kept at temperatures at which the magnitude of the optical anisotropy is changeable by the application of the electric field. Thus, it is possible to easily perform the temperature control in the preset invention.

Moreover, according to the present invention, it is possible to realize a wider viewing angle property than in the conventional liquid crystal display element, because the present invention utilizes, for performing the display operation, the change in the magnitude of the optical anisotropy of the medium, whereas the conventional liquid crystal display element utilizes, for performing the display operation, the change in the orientational direction of the liquid crystal.

Then, According to the above arrangement, the electrodes are provided so as to form the maximal electric field region separated from the interface of the substrate, so that it is possible to effectively use components of the electric field positioned lower than the maximal electric field region, that is, positioned closer to the interface of the substrate than the maximal electric field region. Therefore, it is possible to increase the thickness (practical thickness) of the medium which practically responds, that is, the thickness to which the electric field is practically applied. On this account, according to the above arrangement, it is possible to provide the display element whose driving voltage is reduced to be low as compared with the conventional display elements and to be able to reach a practical level.

Moreover, according to the above arrangement, the electrodes are provided so as to form the maximal electric field region separated from the interface of the substrate and to reduce the driving voltage, so that it is possible to suppress and prevent the printing afterimage which occurs because the molecules stuck to the interface of the substrate are aligned in the electric field direction so as to express the optical anisotropy. It is also possible to suppress and prevent contrast deterioration which occurs due to the printing afterimage. Note that, the above-described effects can not be obtained by the conventional liquid crystal display devices such as an IPS mode liquid crystal display device in which, instead of a medium layer made of the above medium, a conventional liquid crystal layer is used and a horizontal electric field is applied to the liquid crystal layer. That is, the present invention can obtain effects which can not be obtained by the conventional liquid crystal display device, and the effects are specific to the present invention.

Moreover, in order to achieve the above object, the display element of the present invention includes the display element according to the present invention which has any one of the above arrangements.

Therefore, the present invention can provide the display device which has a wide driving temperature range, a wide viewing angle property, and a high-speed response property. Moreover, according to the present invention, the driving voltage is reduced as compared with the conventional ones, that is, the driving voltage is reduced so as to reach a practical level. Further, It is also possible to suppress and prevent the contrast deterioration which occurs due to the printing afterimage. For example, the present display device can be suitably used as a display device of a field sequential color mode.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6(a) is a cross-sectional view schematically illustrating a shape and a main axis direction of a typical refractive index ellipsoid of a medium in a display element when no electric field is applied to the medium. The display element carries out the display by utilizing a change in the optical anisotropy caused by application of an electric field.

FIG. 6(b) is a cross-sectional view schematically illustrating the shape and the main axis direction of the typical refractive index ellipsoid of the medium in the display element illustrated in FIG. 6(a) when an electric field is applied to the medium.

FIG. 6(c) is a cross-sectional view schematically illustrating a shape and a main axis direction of a typical refractive index ellipsoid of a medium in a conventional TN mode liquid crystal display element when no electric field is applied to the medium.

FIG. 6(d) is a cross-sectional view schematically illustrating the shape and the main axis direction of the typical refractive index ellipsoid of the medium in the liquid crystal display element illustrated in FIG. 6(c) when an electric field is applied.

FIG. 6(e) is a cross-sectional view schematically illustrating a shape and a main axis direction of a typical refractive index ellipsoid of a medium in a conventional VA mode liquid crystal display element when no electric field is applied to the medium.

FIG. 6(f) is a cross-sectional view schematically illustrating the shape and the main axis direction of the typical refractive index ellipsoid of the medium in the liquid crystal display element illustrated in FIG. 6(e) when an electric field is applied to the medium.

FIG. 6(g) is a cross-sectional view schematically illustrating a shape and a main axis direction of a typical refractive index ellipsoid of a medium in a conventional IPS mode liquid crystal display element when no electric field is applied to the medium.

FIG. 6(h) is a cross-sectional view schematically illustrating the shape and the main axis direction of the typical refractive index ellipsoid of the medium in the liquid crystal display element illustrated in FIG. 6(g) when an electric field is applied to the medium.

DESCRIPTION OF THE EMBODIMENTS

Embodiment 1

The following description explains one embodiment of the present invention in reference to FIGS. 1 to 14 and FIGS. 22 to 24.

Figure 1:
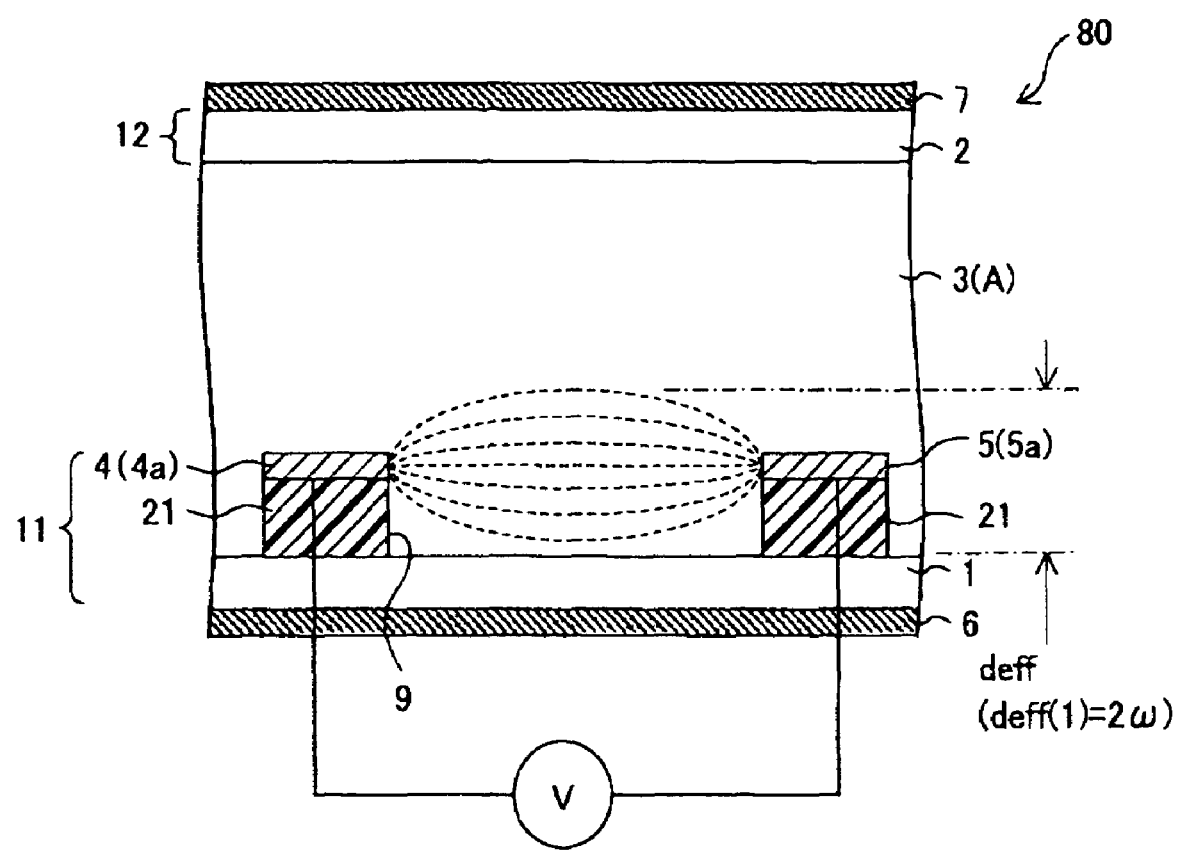
FIG. 1 is a cross-sectional view illustrating a schematic arrangement of substantial parts of a display element in accordance with one embodiment of the present invention.
Figure 2:
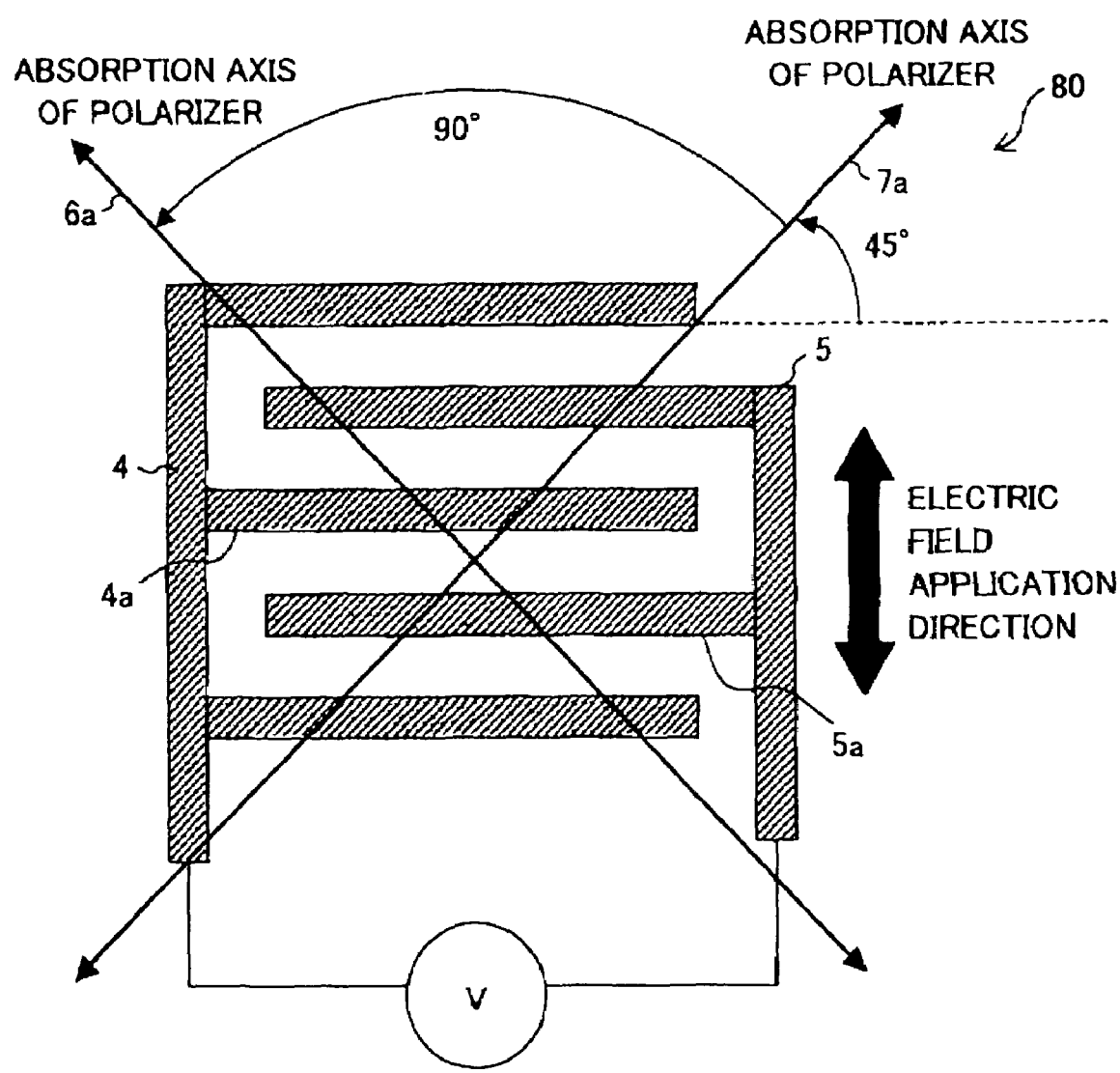
FIG. 2 is a view for explaining a relationship between an electrode structure and polarizing plate absorption axes in the display element.
Figure 22:
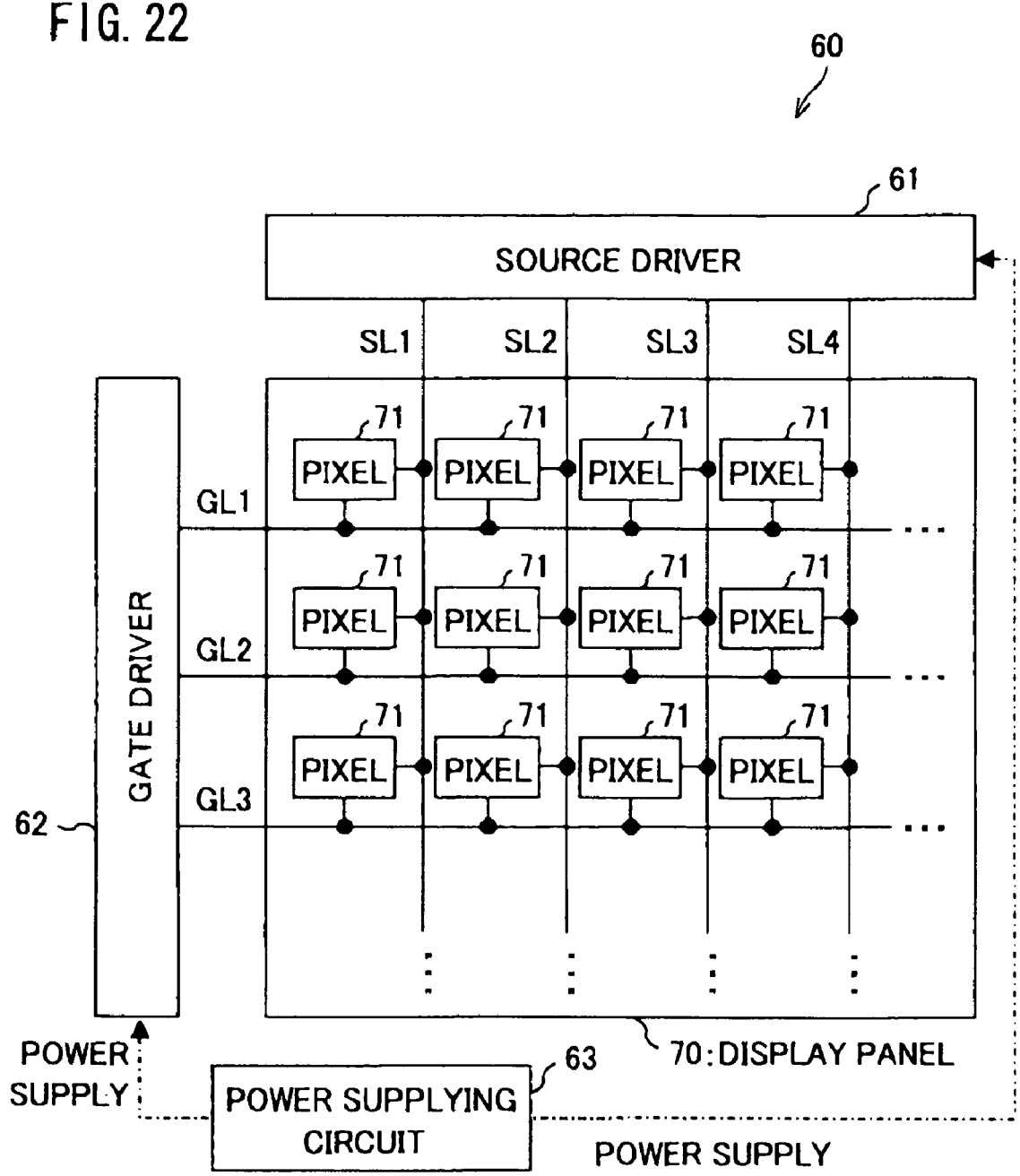
FIG. 22 is a block diagram illustrating a schematic arrangement of substantial parts of a display device using a display element in accordance with one embodiment of the present invention.
Figure 23:
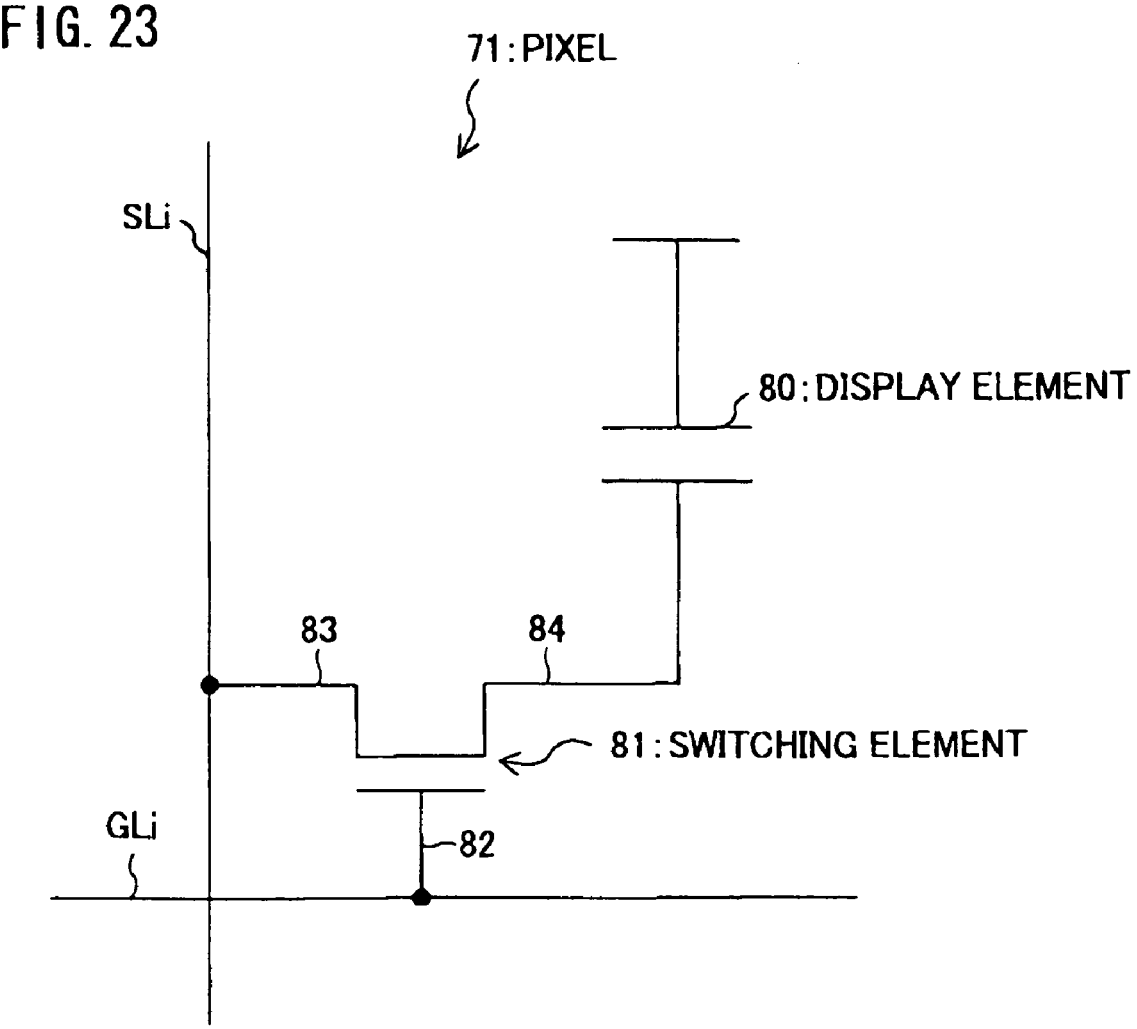
FIG. 23 is a diagram illustrating a schematic arrangement around the display element used in the display device illustrated in FIG. 22.

FIG. 1 is a cross-sectional view illustrating a schematic arrangement of substantial parts of a display element in accordance with the present embodiment. FIG. 2 is a view for explaining a relationship between an electrode structure and polarizing plate absorption axes in the display element. FIG. 22 is a block diagram illustrating a schematic arrangement of substantial parts of a display device using the display element in accordance with the present invention. FIG. 23 is a schematic diagram illustrating a schematic arrangement around the display element used in the display device illustrated in FIG. 22.

The display element in accordance with the present embodiment is provided in the display device together with a drive circuit, signal lines (data signal lines), scanning lines (scanning signal lines), switching elements, etc.

As illustrated in FIG. 22, the display device 60 in accordance with the present embodiment is provided with a display panel 70 in which pixels 71 are provided in a matrix manner, a source driver 61 as a drive circuit, a gate driver 62 as a drive circuit, a power source circuit 63, and the like.

As illustrated in FIG. 23, in each of the pixels 71, a display element 80 and a switching element 81 (described later) in accordance with the present embodiment are provided.

Moreover, the display panel 70 is provided with a plurality of data signal lines SL1 to SLv (v is an arbitral integer not less than 2), and a plurality of scanning signal lines GL1 to GLw (w is an arbitral integer not less than 2), which cross with the data signal lines SL1 to SLv. The pixels 71 are provided corresponding to respective intersections of the data signal lines SL1 to SLv and scanning signal lines GL1 to GLw.

The power source circuit 63 supplies a voltage to the source driver 61 and the gate driver 62 in order to cause the display panel 70 to perform display operation. By using the voltage, the source driver 61 drives (address) the data signal lines SL1 to SLv in the display panel 70. Meanwhile, by using the voltage, the gate driver 62 drives (address) the scanning signal lines GL1 to GLw in the display panel 70.

The switching element 81 may be, for example, an FET (Field Effect Transistor), a TFT (Thin Film Transistor) or the like. The switching element 81 is connected to the scanning signal line GLw via its gate electrode 82, and to the data signal line SLv via its source electrode 83. Further, the switching element 81 is connected with a display element 80 via its drain electrode 84. Moreover, the other end of the display element 80 is connected to a common electrode line (not illustrated) which is shared by all the pixels 71. With this arrangement, the pixels 71 work as follows: the switching element 81 is turned ON in a pixel 71 when a scanning signal line GLu (u is an arbitral integer not less than 1) is selected. Then, a signal voltage determined in accordance with the display data signal inputted from a controller (display-use control section, display-use control device; not illustrated) is applied on the display element 80 via the data signal line SLu (u is an arbitral integer not less than 1) from the source driver 61. While the switching element is OFF after the period in which the scanning signal line GLu is selected is ended, the display element 80 ideally keeps holding the voltage that it has when the switching element 81 is turned OFF.

In the present embodiment, the display element 80 performs the display operation by using a medium (liquid crystalline medium (liquid crystal material), dielectric material) which is optically isotropic (at least macroscopically optically isotropic) when no electric field (voltage) is applied or when the electric field (voltage) is applied. Here, specifically, the medium (liquid crystalline medium (liquid crystal material), dielectric material) is isotropic in visible light wavelength range, that is, in a wavelength scale of the visible light, or in a larger scale, when no electric field (voltage) is applied or when the electric field (voltage) is applied.

The following description explains one example of an arrangement of the display element in accordance with the present embodiment in detail in reference to FIGS. 1 and 2.

As illustrated in FIG. 1, the display element 80 of the present embodiment is structured such that (i) a pair of substrates (hereinafter referred to as pixel substrate 11 and counter substrate 12), provided face to face as means for holding a medium (optical modulation layer holding means), at least one of which is transparent, are provided, and (ii) between these substrates, a medium layer 3 is provided as an optical modulation layer, the medium layer 3 being made of a medium (hereinafter referred to as medium A) which is optically modulated by application of an electric field. In addition, polarizing plates 6 and 7 are respectively provided on outer surfaces of the substrates, that is, the polarizing plates 6 and 7 are respectively provided on rear surfaces with respect to counter surfaces which are facing each other and are surfaces of the pixel substrate 11 and the counter substrate 12.

As illustrated in FIG. 1, the pixel substrate 11 includes a transparent substrate 1, and the counter substrate 12 includes a transparent substrate 2. Moreover, comb-shaped electrodes 4 and 5 are provided on a surface of the substrate 1 of the pixel substrate 11, the surface facing the substrate 2, that is, the surface facing the counter substrate 12. The comb-shaped electrodes 4 and 5 are means for applying the electric field (horizontal electric field) to the medium layer 3 (members for applying an electric field), the electric field being substantially parallel to the substrate 1. As illustrated in FIG. 2, comb-teeth portions 4a and 5a (comb-shaped electrodes) of the comb-shaped electrodes 4 and 5 are provided face to face so that the comb-teeth portions 4a and 5a mesh with each other.

The comb-shaped electrodes 4 and 5 are made of electrode materials such as transparent electrode materials (for example, ITO (indium tin oxide), etc.). In the present embodiment, the comb-shaped electrodes 4 and 5 have a line width of 5 μm, and the distance between the electrodes (electrode interval) is 5 μm, and the thickness of the electrode is 0.3 μm. Note that, the above-mentioned electrode material, the line width, the distance between the electrodes, and the thickness of the electrode are just one example, and are not limited to this.

The comb-shaped electrodes 4 and 5 are stacked above the substrate 1 via an insulating layer 21 which is formed (patterned) in a convex shape, more specifically, which is formed in a comb-like shape similar to the shape of the comb-shaped electrodes 4 and 5. Therefore, the comb-shaped electrodes 4 and 5 are not directly in contact with the substrate 1 because of the insulating layer 21. Moreover, a concave portion 9 is formed between the electrodes 4 and 5, and is concaved lower than the comb-shaped electrodes 4 and 5 (that is, a concave portion 9 is concaved to the substrate 1).

Note that, the insulating layer 21 can be made of various insulating materials such as an organic film (acrylic resin, etc.), an inorganic film (silicon nitride, silicon dioxide, etc.), and the like. The thickness of the insulating layer 21 is not especially limited.

The above electrode structure, that is, an electrode portion (electric field application means) including the comb-shaped electrodes 4 and 5 and the insulating layers 21 can be realized by using conventionally well-known methods such as, for example, sputtering, photolithography, etching, and the like. To be more precise, for example, the electrode structure is realized such that (i) insulating materials for the insulating layers 21 are stacked on the substrate 1, and (ii) on the insulating layers 21 made of the insulating materials, electrode materials for the comb-shaped electrodes 4 and 5 are stacked by sputtering, and (iii) the comb-shaped electrodes 4 and 5 are formed by patterning, and (iv) the concave portion 9 having a desired cross-sectional form is formed by etching the insulating layer 21 between the comb-shaped electrodes 4 and 5. Note that, the etching may be carried out after a resist application, or may be carried out without the resist application in order to reduce the number of the steps.

The display element 80 is formed such that (i) the pixel substrate 11 and the counter substrate 12 are made to adhere to each other by a sealing agent (not illustrated), if necessary, via a spacer (not illustrated) such as plastic beads, glass fiber spacer, or the like, and (ii) the medium A is injected and sealed in an air gap between the substrates.

The medium A used in the present embodiment changes the magnitude of its optical anisotropy by application of the electric field. When an electric field $E_j$ is applied from outside to a material, an electric displacement $D_{ij}=\epsilon_{ij} \cdot E_j$ is generated, and a dielectric constant ($\epsilon_{ij}$) also changes a little. In frequency of light, a refractive index (n) multiplied by itself is equivalent to the dielectric constant. Therefore, the medium A may be a material which changes its refractive index by application of the electric field. Note that, it does not matter if the medium A is liquid, gas, or solid.

Thus, the display element 80 of the present embodiment carries out a display by using such a phenomenon that an electric field application changes the magnitude of the optical anisotropy of a material, for example, such a phenomenon (electro-optic effect) that a refractive index of a material is changed by an outer electric field. Unlike a conventional liquid crystal display element using such a phenomenon that molecules (alignment directions of molecules) lined up in a fixed direction rotate all together by application of the electric field, a direction of the optical anisotropy is almost unchanged, and the display is carried out by the change of the magnitude of the optical anisotropy (mainly, an electronic polarization and an alignment polarization).

As described above, in the conventional liquid crystal display element, the display operation is carried out by utilizing only the change in the orientational direction of the liquid crystal molecules due to rotation thereof caused by the electric field application. The liquid crystal molecules in alignment are rotated together in one direction. Thus, inherent viscosity of the liquid crystal largely affects responding speed. On the other hand, the display element 80 of the present embodiment, in which the display is carried out by utilizing the change in the modulation of the optical anisotropy in the medium, is free from the problem that the inherent viscosity of the liquid crystal largely affects responding speed, unlike the conventional liquid crystal display element. Thus, it is possible to realize high-speed responding. Moreover, the high-speed responding allows the display element 80 of the present embodiment to be used, for example, in a display device of the field sequential color mode.

Moreover, the conventional liquid crystal display element has such a problem that its driving temperature range is limited to temperatures near a phase transition point of a liquid crystal phase, and thus it requires a highly accurate temperature control. On the other hand, the display element 80 of the present embodiment is only required that the medium be kept at temperatures at which the magnitude of the optical anisotropy is changeable by the application of the electric field. Thus, it is possible to easily perform the temperature control in the preset invention.

Moreover, according to the display element 80 of the present embodiment, it is possible to realize a wider viewing angle property than in the conventional liquid crystal display element, because the present invention utilizes, for performing the display operation, the change in the magnitude of the optical anisotropy of the medium, whereas the conventional liquid crystal display element utilizes, for performing the display operation, the change in the orientational direction of the liquid crystal.

The medium A used in the present embodiment (i) may be a material which shows Pockel's effect or Kerr effect, that is, may be a material which is optically isotropic (isotropic in broad view) when no electric field is applied, and expresses the optical anisotropy when an electric field is applied, or (ii) may be a material which has the optical anisotropy when no electric field is applied, and loses the optical anisotropy and express the optical isotropy (isotropy in broad view) when an electric field is applied. Moreover, the medium A may be a material which shows the optical anisotropy when no electric field is applied and changes the magnitude of the optical anisotropy by applying an electric field. A typical example of the medium is optically isotropic (isotropic in broad view) when no electric field is applied, and expresses an optical modulation when an electric field is applied (it is especially preferable that a birefringence rise by application of an electric field).

Pockel's effect and Kerr effect (which can be seen in an isotropic phase state) are the electro-optic effects which are respectively in proportion to the electric field and the square of the electric field. When no electric field is applied, a material is in an isotropic phase so that the material is optically isotropic. When an electric field is applied, in a region where an electric field is applied, long-axis directions of compound molecules are aligned along an electric field direction so that the birefringence is expressed. Thus, it is possible to modulate transmittance. For example, in case of a display method using a material showing Kerr effect, deviation of electrons in a single molecule is controlled by application of the electric field, so that each of the molecules randomly arranged rotates in order to change its direction. Therefore, responsive speed is very quick. Moreover, because the molecules are arranged randomly, the display method using the material which shows Kerr effect has such an advantage that there is no limit in terms of a viewing angle. Note that, in the above medium A, materials which are roughly in proportion to the electric field or the square of the electric field can be treated as materials showing Pockel's effect or Kerr effect.

An example of the material showing Pockel's effect is an organic solid material (for example, hexamine), and the like, but it is not especially limited. Various organic and inorganic materials showing Pockel's effect can be used as the medium A.

Examples of the material showing Kerr effect are PLZT (metal oxide prepared by adding lanthanum to a solid solution of lead zirconate and lead titanate), liquid crystal materials shown by the following structural formulas (1) to (4), and the like. However, the examples are not especially limited.

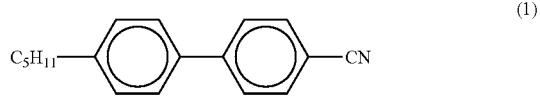

(1)

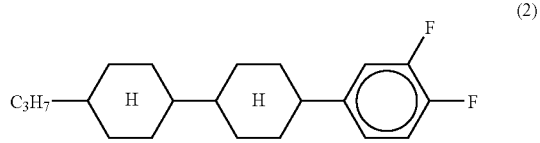

(2)

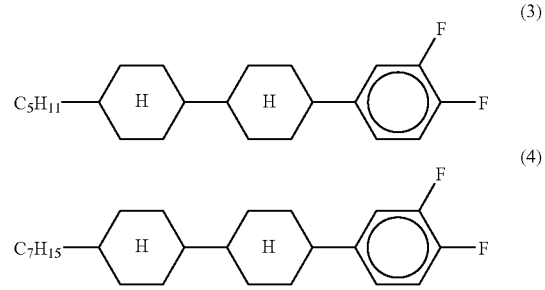

(3)

(4)

Kerr effect is observed in a medium which is transparent with respect to incident light. Therefore, the material showing Kerr effect is used as a transparent medium. Commonly, with an increase in temperature, the phase of the liquid crystal material transits from a liquid crystal phase having a short-distance order to the isotropic phase having molecules aligned randomly. That is, Kerr effect of the liquid crystal material can be seen in a liquid not in a nematic phase but in the isotropic phase state at a liquid crystal phase/isotropic phase transition temperature or higher. The liquid crystal material is used as transparent dielectric liquid.

When an operating environmental temperature (heat temperature) is high by application of heat, the dielectric liquid such as the liquid crystal material is in the isotropic phase state. Therefore, when the dielectric liquid such as the liquid crystal material is used as the medium, in order to use the dielectric liquid which is in a liquid state and transparent, that is, transparent with respect to the visible light, for example, (1) it is possible to heat the dielectric liquid by heating means such as heater (not illustrated) provided around the medium layer 3, so that the temperature of the dielectric liquid reaches its clearing point or higher, or (2) it is possible to heat the dielectric liquid by heat radiation from a back light, heat conduction from the back light and/or peripheral driving circuits (in this case, the back light and the peripheral driving circuit function as heating means), or the like, so that the temperature of the dielectric liquid reaches its clearing point or higher, or (3) it is possible to heat the dielectric liquid by a sheet heater (heating means) attached as a heater on at least one of the substrates 1 and 2, so that the temperature of the dielectric liquid reaches a predetermined temperature. In addition, in order to use the dielectric liquid in a transparent state, it is possible to use a material having a clearing point which is lower than a lower limit of an operating temperature range of the display element 80.

It is preferable that the medium A include the liquid crystal material. When using the liquid crystal material as the medium A, it is preferable that, in broad view, the liquid crystal material be a transparent liquid in the isotropic phase, and, in narrow view, the liquid crystal material include a cluster which is an assembly of molecules arranged in a certain direction and having the short-distance order. Note that, the liquid crystal material is used in a transparent state with respect to the visible light, so that the cluster is also used in a transparent (optically isotropic) state with respect to the visible light.

On this account, as described above, the temperature of the display element 80 may be controlled by using heating means such as heater. As described in Document 2, a polymeric material which is divided into sub-regions, or the like may be used for the medium layer 3. Moreover, for example, a diameter of the liquid crystal material is set to be 0.1 µm or less. That is, the liquid crystal material is made into minute droplets each having smaller diameter than the wavelength of the visible light. In this way, scattering of light is suppressed and the liquid crystal material is in a transparent state. Furthermore, it is possible to use a liquid crystal compound which is transparent and is in the isotropic phase at operating environmental temperatures (room temperatures). It is possible to ignore the scattering of light when the diameter of the liquid crystal material is 0.1 µm or less, or when axis (major axis) of the cluster is 0.1 µm or less, that is, when the diameter of the liquid crystal material and the axis (major axis) of the cluster are shorter than the wavelength of the visible light (wavelength of incident light). On this account, when the axis of the cluster is 0.1 µm or less, the cluster is also transparent with respect to the visible light.

Note that, as described above, the medium A is not limited to materials showing Pockel's effect or Kerr effect. A molecular arrangement of the medium A may be (i) an orderly structure, having a cubic symmetry and a scale smaller than the wavelength of the visible light (for example, nano-scale), and (ii) in a cubic phase which is optically isotropic (see "Kazuya Saito and another, "Thermodynamics of Optically-Isotropic Rare Thermotropic Liquid Crystal", Liquid crystal, 2001, Vol. 5, No. 1, p. 20-27" (hereinafter referred to as "Non-patent Document 3"), "Hirotsugu Kikuchi and four others, "Polymer-stabilized liquid crystal blue phases", p. 64-68, [online], Sep. 2, 2002, Nature Materials, Vol. 1, [searched on Jul. 10, 2003], Internet <URL: http://www.nature.com/naturematerials>" (hereinafter referred to as "Non-patent Document 6"), "Makoto Yoneya, "Nano-structure Liquid Crystal Phase Examined By Molecular Simulation", Liquid crystal, 2003, Vol. 7, No. 3, p. 238-245" (hereinafter referred to as "Non-patent Document 7"), "D. Demus and three others, "Handbook of Liquid Crystals Low Molecular Weight Liquid Crystal", Wiley-VCH, 1998, Vol. 2B, p. 887-900" (hereinafter referred to as "Non-patent Document 8"). The cubic phase is one of liquid crystal phases of the liquid crystal material which can be used as the medium A. An example of the liquid crystal material showing the cubic phase is BABH8 which is shown by the following structural formula (5).

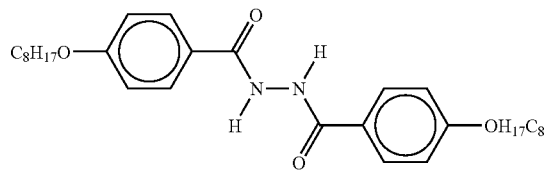

(5)

When an electric field is applied to the above liquid crystal material, its fine structure is distorted, so that it becomes possible to induce the optical modulation.

In a temperature range from 136.7° C. to 161° C., BABH8 is in the cubic phase of the orderly structure having the cubic symmetry and a scale smaller than the wavelength of the visible light. The orderly structure (cubic symmetric orderly structure) of the cubic phase has a lattice constant about 6 nm, that is, not more than one tenth of the light wavelength. Thus, BABH8 has the orderly structure having a scale smaller than the wavelength of the visible light, and shows the optical isotropy in the above-mentioned temperature range when no electric field is applied (isotropic in a broad view). Therefore, satisfactory black display can be carried out under cross nicol polarizers.

Moreover, the temperature of BABH8 is controlled by the above-mentioned heating means to be from 136.7° C. to 161° C., and an electric field (voltage) is applied between the comb-shaped electrodes 4 and 5. This causes a structure (orderly structure) having the cubic symmetry to be distorted. That is, in the above-mentioned temperature range, BABH8 is isotropic when no electric field is applied, and expresses the anisotropy when an electric field is applied.

Therefore, the birefringence is generated in the medium layer 3, so that the display element 80 can carry out a satisfactory white display. Note that, the birefringence is generated in a fixed direction, and its size changes according to electric field (voltage) application. A voltage transmittance curve shows a relationship between (i) a voltage applied between the comb-shaped electrodes 4 and 5 and (ii) transmittance. The voltage transmittance curve draws a stable curve in a temperature range from 136.7° C. to 161° C., that is, in a wide temperature range (about 20K). On this account, when BABH8 is used as the medium A, it is extremely easy to control the temperature. That is, the medium layer 3 made of BABH8 is thermally in a stable phase, so that sudden temperature dependency does not occur, and it is extremely easy to control the temperature.

Moreover, as the medium A, it is possible to realize a system (i) which is filled with assemblies, in each of which the liquid crystal molecules are smaller than the wavelength of the visible light and are aligned in a radial pattern, and (ii) which is optically isotropic. To realize this, it is possible to use a technique of liquid crystal microemulsion described in "Jun Yamamoto, "Liquid Crystal Microemulsion", Liquid crystal, 2000, Vol. 4, No. 3, p. 248-254" (hereinafter referred to as "Non-patent Document 4")", or a technique of a liquid crystal/fine particle dispersion system (mixture system in which fine particles are mixed in a solvent (liquid crystal), hereinafter referred to as liquid crystal fine particle dispersion system) described in "Yukihide Shiraishi and four others, "Palladium Nanoparticles Protected By Liquid Crystal Molecules—Preparation and Application to Guest-Host Mode Liquid Crystal Display Element", KOBUNSHI RONBUNSHU (Japanese Journal of Polymer Science and Technology), December 2002, Vol. 59, No. 12, p. 753-759" (hereinafter referred to as "Non-patent Document 5"). When an electric field is applied to them, the assemblies each having molecules aligned in a radial pattern are distorted, so that it is possible to induce the optical modulation.

Note that, each of these liquid crystal materials may be (i) a liquid crystal material which is made of a single material showing liquid crystallinity, (ii) a liquid crystal material in which a plurality of materials are mixed so as to show liquid crystallinity, (iii) a liquid crystal material in which other non-liquid crystal material is mixed in the plurality of materials. Moreover, it is possible to apply polymer/liquid crystal dispersion system materials described in Non-patent Document 1. Furthermore, it is possible to add a gelling agent described in "Takashi Kato and two others, "Fast and High-Contrast Electro-optical Switching of Liquid-Crystalline Physical Gels: Formation of Oriented Microphase-Separated Structures", Adv. Funct. Mater., April 2003, Vol. 13. No. 4, p. 313-317" (hereinafter referred to as "Non-patent Document 2").

It is preferable that the medium A contain polar molecules. For example, nitrobenzene is preferable as the medium A. Note that, nitrobenzene is one of the mediums showing Kerr effect.

The following description shows materials which can be used as the medium A, and forms of the materials. However, the present invention is not limited to the following description.

[Smectic D Phase (SmD)]

Smectic D phase (SmD) is one of liquid crystal phases of liquid crystal materials which can be used as the medium A. The smectic D phase (SmD) has a three-dimensional grating structure, and its grating constant is smaller than the wavelength of the visible light. Therefore, the smectic D phase is optically isotropic.

An example of a liquid crystal material showing the smectic D phase is ANBC16 represented by the following general formulas (6) and (7) described in Non-patent Documents 3 or 8.

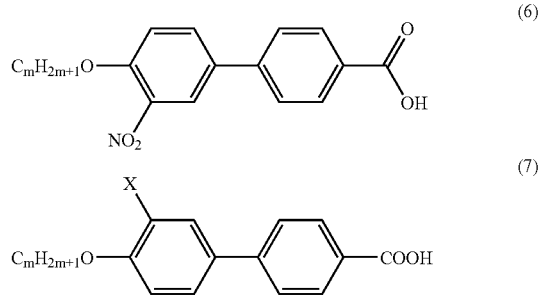

Note that, in the above general formulas (6) and (7), m is an arbitrary integer. To be more precise, m=16 in the general formula (6), and m=15 and X is —$NO_2$ group in the general formula (7).

ANBC16 expresses the smectic D phase in a temperature range from 171.0° C. to 197.2° C. In the smectic D phase, a plurality of molecules form a 3-dimentional lattice like a jungle gym (Registered Trademark). The lattice has a lattice constant of several ten nm or less, which is less than the wavelength of the visible light. That is, the smectic D phase has a cubic symmetry and orderly orientation (orderly structure) smaller than the wavelength of the visible light. Note that the lattice constant of ANBC16 described in the present embodiment is about 6 nm. Because of this, the smectic D phase is optically isotropic. However, when an electric field is applied to ANBC16 in the above temperature range in which ANBC16 shows the smectic D phase, molecules of ANBC16 tend to change their directions to the direction of the electric field because the molecules have dielectric anisotropy. As a result, the grating structure is distorted. That is, ANBC16 expresses the optical anisotropy. Note that, not only ANBC16 but also materials showing the smectic D phase are applicable as the medium A of the display element 80 of the present embodiment, because the magnitude of the optical anisotropy is changeable according to whether or not the electric field is applied (that is, between when the electric field is applied and when no electric field is applied).

[Liquid Crystal Microemulsion]

As proposed in Non-patent Document 4, liquid crystal microemulsion is a generic term for a system (mixture system) in which oil molecules of O/W type microemulsion (a system in which droplet-shape water is dissolved in oil (continuous phase) by surfactant) are replaced with thermotropic liquid crystal molecules.

A concrete example of the liquid crystal microemulsion is a mixture system of pentyl-cyano-biphenyl (5CB) and didodecyl-ammonium-bromide (DDAB) solution. Pentyl-cyano-biphenyl (5CB) is a thermotropic liquid crystal showing a nematic liquid crystal phase, and didodecyl-ammonium-bromide (DDAB) is a lyotropic liquid crystal showing a reverse micelle phase. This mixture system has a structure illustrated by schematic views of FIGS. 7 and 8.

According to the above mixture system, a diameter of a reverse micelle is about 50 Å, and a distance between reverse micelles is about 200 Å. Each of these scales is approximately one tenth of the light wavelength. That is, the above-described mixture system has an orientational order (orderly structure) smaller than the wavelength of the visible light. The reverse micelles randomly exist in a three-dimensional space, and 5CBs are aligned in a radial pattern centering on each reverse micelle. Therefore, the above mixture system is optically isotropic.

When an electric field is applied to a medium made of the above mixture system, molecules tend to change their directions to the direction of the electric field because 5CB has dielectric anisotropy. That is, although a system is optically isotropic because 5CBs are aligned in a radial pattern centering on the reverse micelle, alignment anisotropy is expressed, and the optical anisotropy is expressed. Note that, the medium A is not limited to the above mixture system. In cases where the liquid crystal microemulsion is optically isotropic when no electric field is applied, and is optically anisotropic when an electric field is applied, it is possible to apply the liquid crystal microemulsion as the medium A of the display element 80 of the present embodiment.

[Lyotropic Liquid Crystal]

Figure 9:
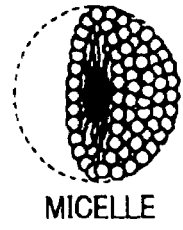
FIG. 9 is a classification view of lyotropic liquid crystal phases.
Figure 9:
Figure 9:
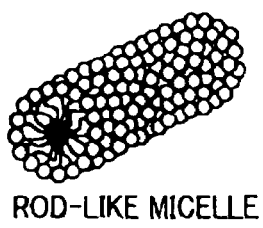
Figure 9:
Figure 9:
Figure 9:
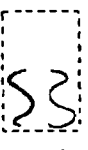
Figure 9:
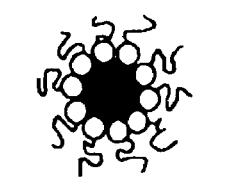
Figure 9:
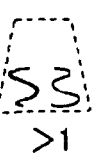
Figure 9:
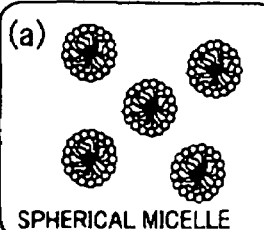
Figure 9:
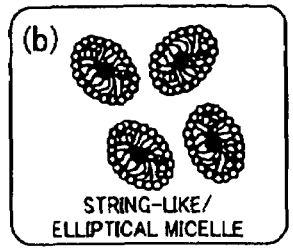
Figure 9:
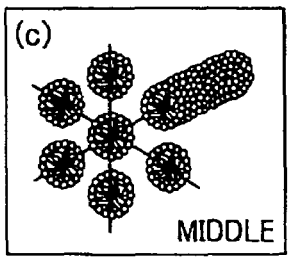
Figure 9:
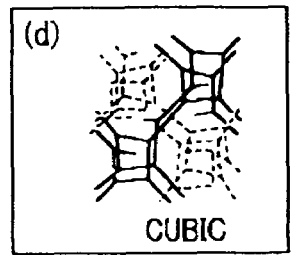
Figure 9:
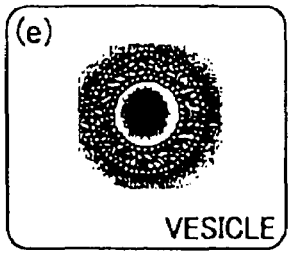
Figure 9:
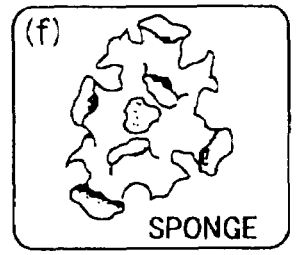
Figure 9:
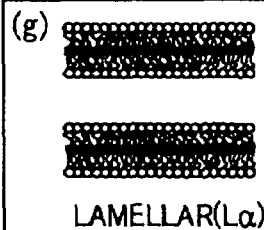
Figure 9:
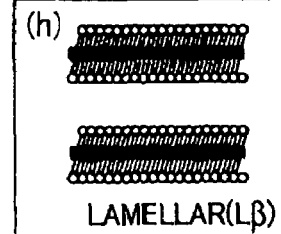
Figure 9:
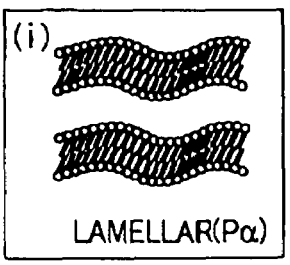
Figure 9:
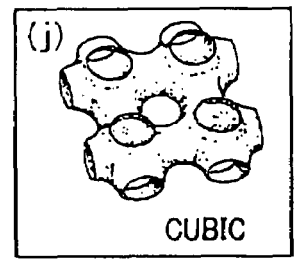
Figure 9:
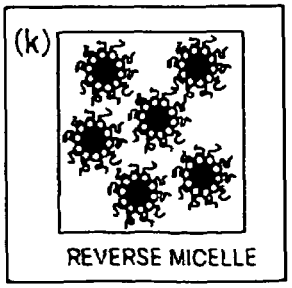
Figure 9:
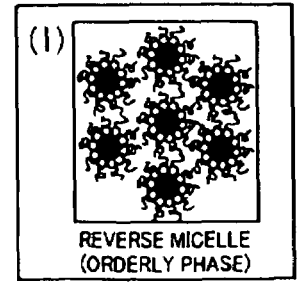

The lyotropic liquid crystal is a multicomponent system liquid crystal in which molecules constituting a liquid crystal are dissolved in a solvent (water, organic solvent, or the like) having different properties. In the present embodiment, lyotropic liquid crystal having particular phases can be used as the lyotropic liquid crystal. The particular phases are phases whose optical anisotropy is changeable in magnitude depending on whether or not the electric field is applied (that is, between when the electric field is applied and when no electric field is applied). An example of the particular phases is a phase that is optically isotropic when no electric field is applied but becomes optically anisotropic when the electric field is applied. Examples of such particular phases are micelle phase, sponge phase, cubic phase, and reverse micelle phase, which are described in "Jun Yamamoto, "Liquid Crystal Scientific Experiment Course 1: Identification of Liquid Crystal Phase: (4) Lyotropic Liquid Crystal", Liquid crystal, 2002, Vol. 6, No. 1, p. 72-83" (hereinafter referred to as "Non-patent Document 11"). FIG. 9 illustrates a classification view of lyotropic liquid crystal phases.

Some of surfactants, which are amphiphilic materials, express the micelle phase. For example, an aqueous solution of sodium dodecyl sulfate and an aqueous solution of potassium palmitin acid, both of which are ionic surfactants, form spherical micelles. In mixture liquid which is a nonionic surfactant and is a mixture of polyoxyethylene nonylphenyl ether and water, a nonylphenyl group functions as hydrophobic group and oxyethylene chain functions as hydrophilic group, so that micelles are formed. An aqueous solution of styrene-ethyleneoxideblock copolymer also forms micelles.

For example, the spherical micelle becomes globular by packing molecules in all spatial directions (by forming a molecular group). The size of the spherical micelle is smaller than the wavelength of the visible light, so that the spherical micelle is not anisotropic but isotropic. That is, the spherical micelle has an orderly structure (orientational order) smaller than the wavelength of the visible light. However, when an electric field is applied to such spherical micelle, the spherical micelle is distorted, so that the optical anisotropy is expressed. Therefore, it is possible to apply the lyotropic liquid crystal in the spherical micelle phase as the medium A of the display element 80 of the present embodiment. Note that, not only the lyotropic liquid crystal in the spherical micelle phase but also the lyotropic liquid crystal in other types of micelle phases such as string-type micelle phase, ellipse-type micelle phase, stick-type micelle phase can be used as the medium A in order to obtain the same effects.

Moreover, it is well-known that the reverse micelle in which the hydrophilic group and the hydrophobic group are replaced with each other is formed depending on conditions of concentration, temperature, and surfactant. Such reverse micelle optically shows the same effects as the micelle does. Therefore, when the lyotropic liquid crystal in the reverse micelle phase is applied as the medium A, it is possible to obtain effects equivalent to effects obtained in cases where the lyotropic liquid crystal in the micelle phase is used. Note that, the above-mentioned liquid crystal microemulsion is one example of the lyotropic liquid crystal in the reverse micelle phase (reverse micelle structure).

Moreover, an aqueous solution of pentaethyleneglycol-dodecylether, which is a non-ionic surfactant, shows the sponge phase or the cubic phase as illustrated in FIG. 9, depending on its concentration and temperature. Each of such sponge phase and cubic phase has an assembly of orderly aligned molecules which has a diameter (orientational order, orderly structure) smaller than the wavelength of the visible light, so that the materials are transparent. That is, the medium having these phases is optically isotropic. When an electric field (voltage) is applied to the medium having these phases, the orientational order (orderly structure) is changed and the optical anisotropy is expressed. Therefore, the lyotropic liquid crystal having the sponge phase or the cubic phase can be applied as the medium A of the display element 80 of the present embodiment.

[Liquid Crystal Fine Particle Dispersion System]

For example, the medium A may be a liquid crystal fine particle dispersion system in which an aqueous solution of pentaethyleneglycol-dodecylether, which is a non-ionic surfactant, is mixed with latex particles whose surfaces are modified by using a sulfuric acid group and each of which has a diameter of about 100 Å. The liquid crystal fine particle dispersion system expresses the sponge phase. The medium A used in the present embodiment may be a liquid crystal fine particle dispersion system expressing the micelle phase, the cubic phase, the reverse micelle phase, or the like, that is, the liquid crystal fine particle dispersion system showing a phase whose magnitude of the optical anisotropy changes depending on whether or not an electric field is applied. Note that, instead of using the latex particles, DDAB can be used to obtain the same alignment structure as the structure of the above-mentioned liquid crystal microemulsion.

[Dendrimer]

A dendrimer is a three-dimensional highly-branched polymer which branches per monomer unit. The dendrimer branches a lot. Therefore, when the molecular weight exceeds a certain level, the dendrimer constitutes a globular structure. The globular structure has an assembly of orderly aligned molecules which has a diameter (orderly structure, orientational order) smaller than the wavelength of the visible light, so that the dendrimer is transparent. When an electric field is applied, the orientational order is changed and the optical anisotropy is expressed (the magnitude of the optical anisotropy changes). Therefore, it is possible to apply the dendrimer as the medium A of the display element 80 of the present embodiment. Moreover, in the above-mentioned liquid crystal microemulsion, instead of using DDAB, the dendrimer can be used to obtain the same alignment structure as the structure of the above-mentioned liquid crystal microemulsion. It is possible to apply thus-obtained medium as the medium A.

[Cholesteric Blue Phase]

As for the cholesteric blue phase, it is well-known that a screw axis constitutes a three-dimensionally periodic structure, and the structure is highly symmetric (for example, see Non-patent Documents 6 and 7). The cholesteric blue phase has an assembly of orderly aligned molecules which has a diameter (orderly structure, orientational order) smaller than the wavelength of the visible light, so that the material is almost transparent. When an electric field is applied, the magnitude of the orientational order is changed and the optical anisotropy is expressed. That is, the cholesteric blue phase is optically almost isotropic. When an electric field is applied to the cholesteric blue phase, its liquid crystal molecules tend to change their directions to the direction of the electric field, so that the grating is distorted and the optical anisotropy is expressed (the magnitude of the optical anisotropy changes).

Note that, a well-known material which shows the cholesteric blue phase is a composition which is formed by mixing 48.2 mol % of "JC1041" (product name, mixture liquid crystal produced by CHISSO), 47.4 mol % of "5CB" (4-cyano-4'-pentylbiphenyl, nematic liquid crystal), and 4.4 mol % of "ZLI-4572" (product name, chiral dopant produced by MERCK). The composition shows the cholesteric blue phase in a temperature range from 330.7K to 331.8K.

[Smectic Blue Phase]

Just like the cholesteric blue phase, the smectic blue phase ($BP_{sm}$) has a highly-symmetric structure (for example, see Non-patent Document 7 and "Eric Grelet and three others, "Structural Investigations on Smectic Blue Phases", PHYSICAL REVIEW LETTERS, The American Physical Society, Apr. 23, 2001, Vol. 86, No. 17, p. 3791-3794" (hereinafter referred to as "Non-patent Document 10")). Moreover, the smectic blue phase ($BP_{sm}$) has an assembly of orderly aligned molecules which has a diameter (orderly structure, orientational order) smaller than the wavelength of the visible light, so that the material is almost transparent. When an electric field is applied, the magnitude of the orientational order is changed and the optical anisotropy is expressed (the magnitude of the optical anisotropy changes). That is, the smectic blue phase is optically almost isotropic. When an electric field is applied to the smectic blue phase, liquid crystal molecules tend to change their directions to the direction of the electric field, so that the grating is distorted and the optical anisotropy is expressed.

Note that, an example of materials showing the smectic blue phase is FH/FH/HH-14BTMHC described in Non-patent Document 10. The material shows a $BP_{sm}$ 3 phase in a temperature range from 74.4° C. to 73.2° C., a $BP_{sm}$ 2 phase in a temperature range from 73.2° C. to 72.3° C., a $BP_{sm}$ 1 phase in a temperature range from 72.3° C. to 72.1° C. As described in Non-patent Document 7, the $BP_{sm}$ phase has a highly-symmetric structure, so that the $BP_{sm}$ phase is optically almost isotropic. When an electric field is applied to FH/FH/HH-14BTMHC, liquid crystal molecules tend to change their directions to the direction of the electric field, so that the grating is distorted and the optical anisotropy is expressed. Therefore, it is possible to use FH/FH/HH-14BTMHC as the medium A of the display element 80 of the present embodiment.

As described above, as long as the optical anisotropy (refractive index, orientational order parameter) of a material is changed by applying an electric field, the material used as the medium A of the display element 80 of the present embodiment may be (i) a material which shows Pockel's effect or Kerr effect, (ii) a material made of molecules in the cubic phase, the smectic phase, cholesteric blue phase, or the smectic blue phase, (iii) the lyotropic liquid crystal in the micelle phase, the reverse micelle phase, the sponge phase, or the cubic phase, or (iv) the liquid crystal fine particle dispersion system in the micelle phase, the reverse micelle phase, the sponge phase, or the cubic phase. In addition, the medium A may be the liquid crystal microemulsion, the dendrimer (dendrimer molecule), amphiphilic molecule, copolymer, or other polar molecules than those above.

Moreover, the medium A is not limited to the liquid crystal material, and it is preferable that the medium have the orderly structure (orientational order) which is smaller than the wavelength of the visible light when an electric field is applied or when no electric field is applied. When the orderly structure is smaller than the wavelength of the visible light, the medium A is optically isotropic. Therefore, by using the medium in which an assembly of orderly aligned molecules (orientational order) has a diameter smaller than the wavelength of the visible light when an electric field is applied or when no electric field is applied, a display state when an electric field is applied and a display state when no electric field is applied are surely different.

In the following present embodiment, pentyl-cyano-biphenyl (5CB) shown by the structural formula (1) is used as the medium A, but the medium A is not limited to this. Instead of 5CB, it is possible to apply various materials described above.

According to the present embodiment, ITO is used as the comb-shaped electrodes 4 and 5 which have a line width of 5 μm, and the distance between which is 5 μm. The thickness of the medium layer 3 (that is, a distance between the substrates 1 and 2) is 10 μm. 5CB is used as the medium A. 5CB is heated by the outer heating means (heating means) so as to keep the temperature which is just above a nematic phase/isotropic phase transition temperature (a little higher temperature than the phase transition temperature, for example +0.1K). When an electric field (voltage) is applied, the tranmissivity can be changed. Note that, 5CB is in the nematic phase at a temperature below 33.3° C., and in the isotropic phase at a temperature of 33.3° C. or higher.

In the present embodiment, as required, a dielectric thin film (alignment film, not illustrated) to which a rubbing treatment is carried out may be formed onto each of counter surfaces of the substrates 1 and 2. By forming the dielectric thin film on an inner side of at least one of the substrates 1 and 2, it is possible to improve the orientational order (orderly structure, orientational order) parameter, and possible to obtain better electro-optic effect such as Kerr effect.

The dielectric thin film may be an organic film or an inorganic film. Moreover, the dielectric thin film is not especially limited as long as the above-mentioned alignment effect can be obtained. However, when the dielectric thin film is constituted of the organic thin film, a satisfactory alignment effect can be obtained. Therefore, it is preferable that the organic thin film be used for the dielectric thin film. In the organic thin film, polyimide has high stability and high reliability, and shows extremely excellent alignment effect. Therefore, by using polyimide as the dielectric thin film material, it is possible to provide the display element 80 having satisfactory display performance.

The dielectric thin film may be formed on the inner side of at least one of the substrates 1 and 2, for example, formed on the substrate 1 such that the dielectric thin film covers the comb-shaped electrodes 4 and 5. A thickness of the dielectric thin film is not especially limited. Moreover, the rubbing treatment is carried out with respect to the dielectric thin film formed on the substrate 1 and with respect to the dielectric thin film formed on the substrate 2, for example, in a reverse direction along the comb-teeth portions 4a and 5a of the comb-shaped electrodes 4 and 5.

The following description explains a display principle of the display element 80 in accordance with the present embodiment, that is, the following description explains a display principle of the display element which carries out the display by utilizing a change of the magnitude of the optical anisotropy which is caused by applying an electric field in reference to FIGS. 3(a) to 6(h) and 24.

Note that, in FIGS. 3(a) to 6(h), the following description explains a display principle common to the display elements, which carry out the display by utilizing a change of the magnitude of the optical anisotropy caused by applying an electric field, in reference to a cross-sectional view of the substantial parts of the simplest display element H as the display element 80 of the present embodiment. The display element 80 of the present embodiment is structured such that the comb-shaped electrodes 4 and 5 are formed on the substrate 1 of a pair of the substrates 1 and 2. Therefore, the comb-shaped electrodes 4 and 5 can apply an electric field (horizontal electric field) substantially parallel to the substrate 1 to the medium layer 3. Note that, in the following description, a transmission-type display element is used as the display element 80 in accordance with the present embodiment and as the display element H, and the material used herein is optically almost isotropic, preferably isotropic when no electric field is applied, and is optically anisotropic when an electric field is applied. However, the present invention is not limited to this.

Figure 3A:
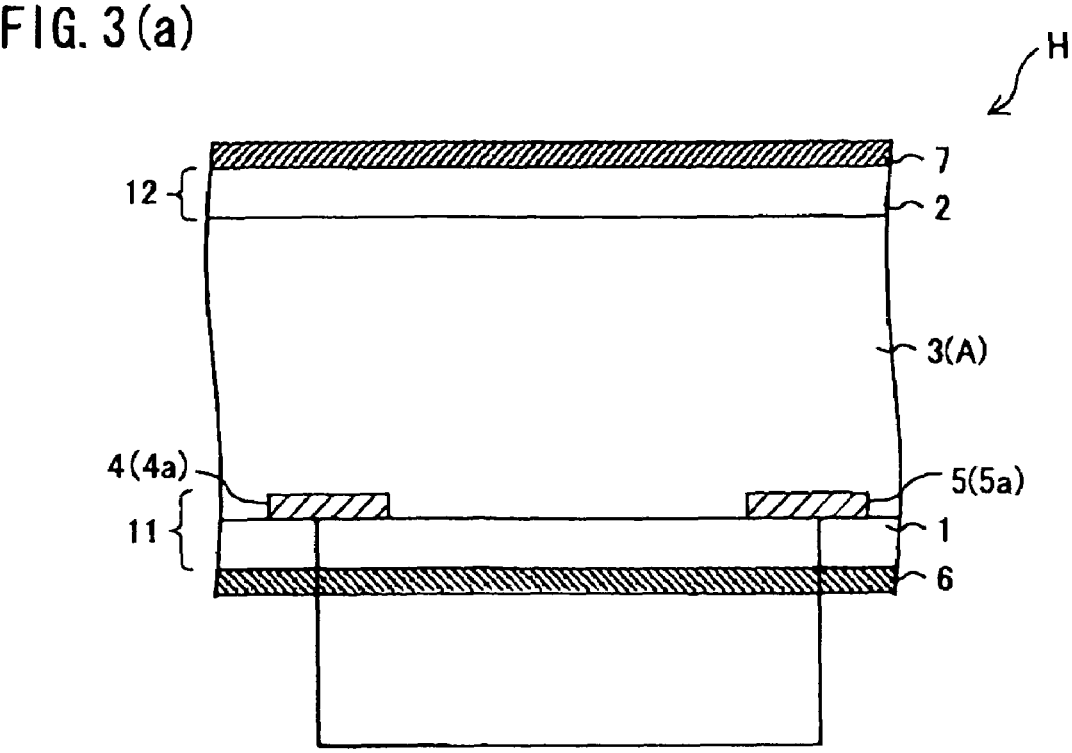
FIG. 3(a) is a cross-sectional view illustrating a schematic arrangement of substantial parts of a display element to which no electric field is applied. The display element carries out a display by utilizing a change in an optical anisotropy caused by application of an electric field.
Figure 3B:
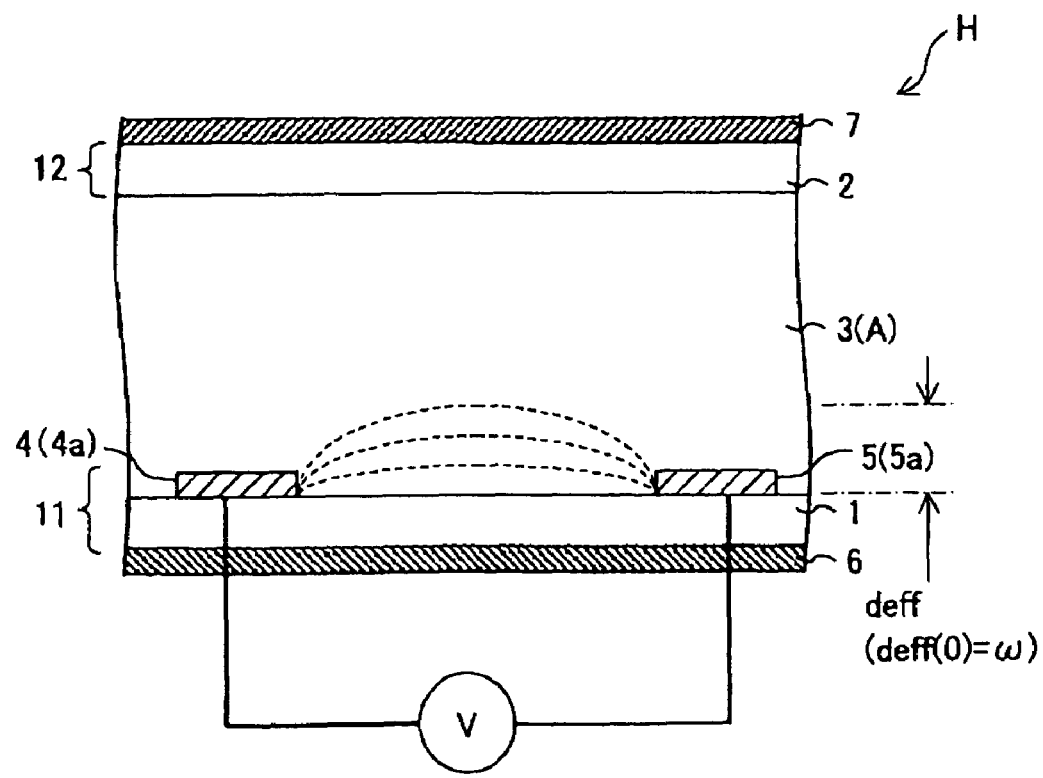
FIG. 3(b) is a cross-sectional view illustrating a schematic arrangement of substantial parts of the display element illustrated in FIG. 3(a) to which an electric field is applied.
Figure 4A:
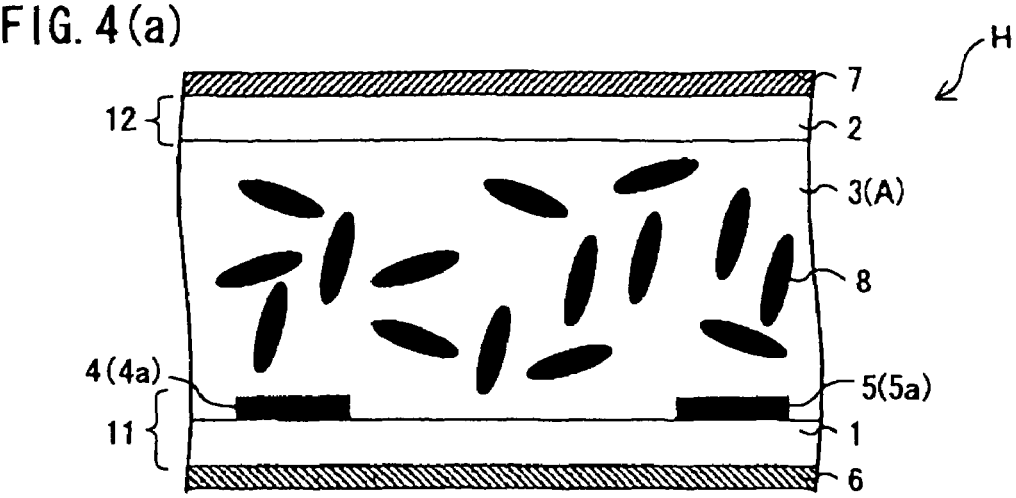
FIG. 4(a) is a cross-sectional view schematically illustrating a medium in the display element illustrated in FIGS. 3(a) and 3(b) to which no electric field is applied (OFF state).
Figure 4B:
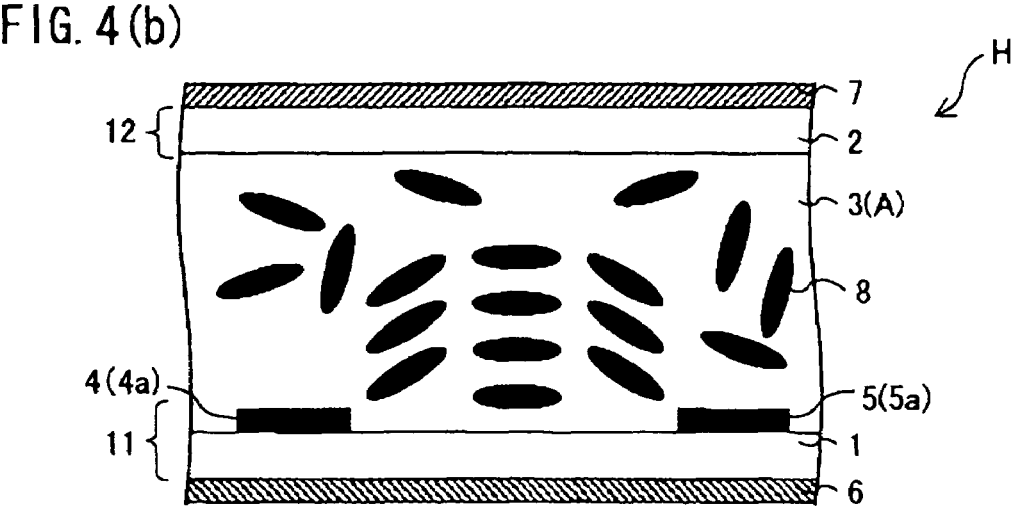
FIG. 4(b) is a cross-sectional view schematically illustrating a medium in the display element illustrated in FIGS. 3(a) and 3(b) to which an electric field is applied (ON state).
Figure 5:
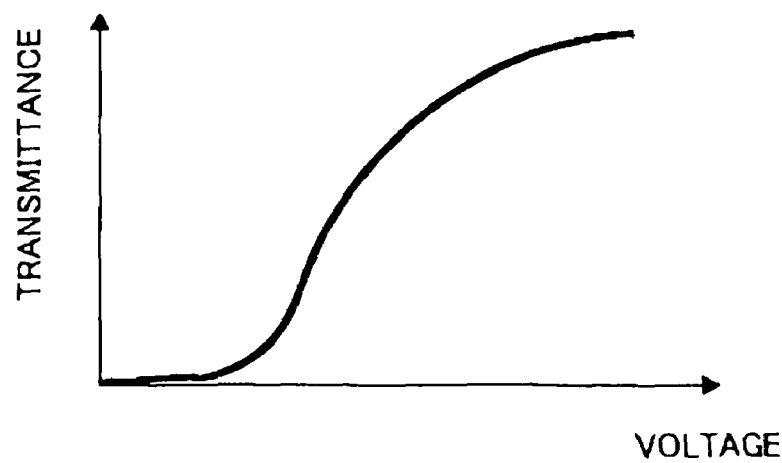
FIG. 5 is a graph showing a relationship between an applied voltage and transmittance in the display element illustrated in FIGS. 3(a) and 3(b).
Figure 7:
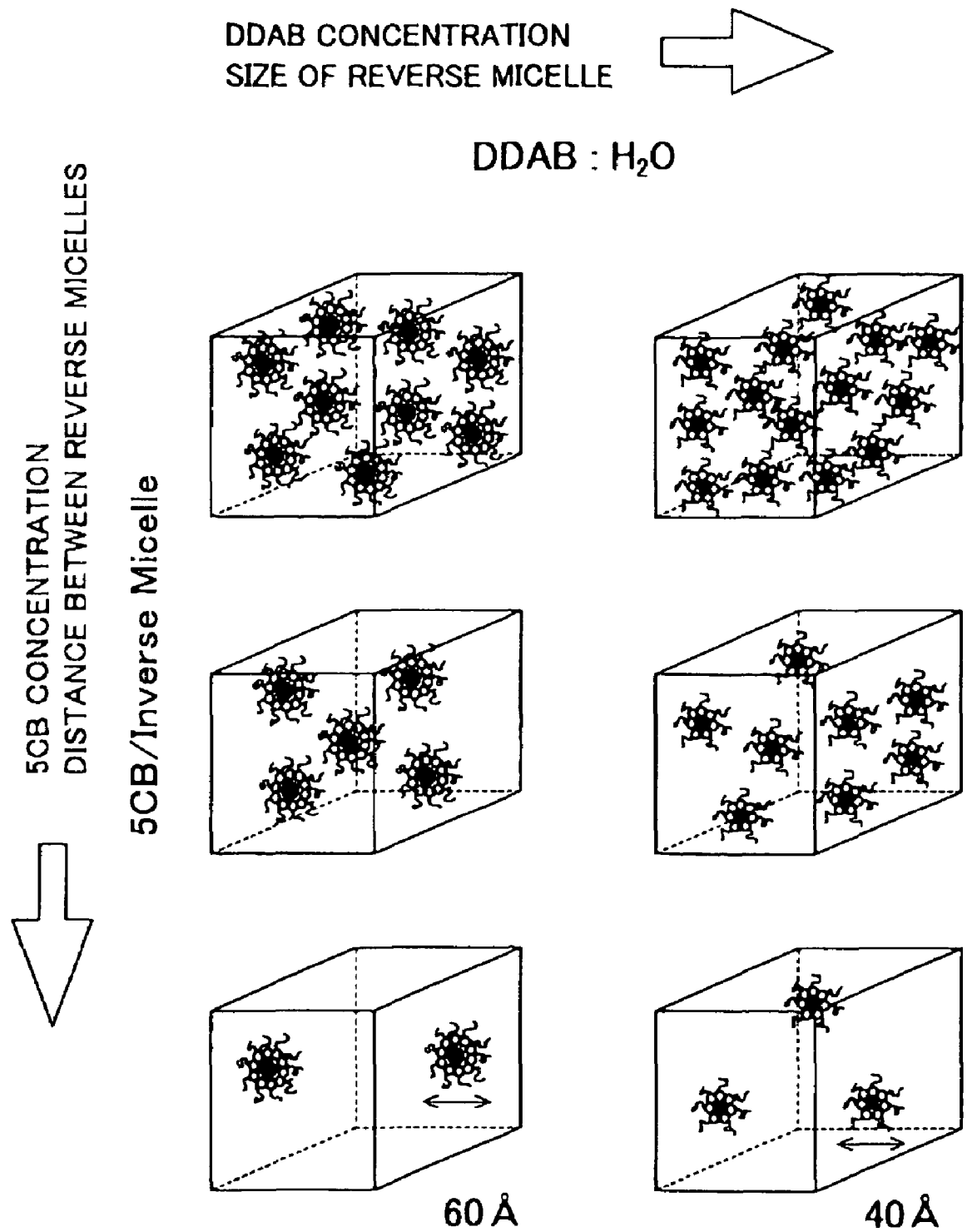
FIG. 7 is a schematic view illustrating one example of a reverse micelle phase mixture system of a liquid crystal microemulsion.
Figure 8:
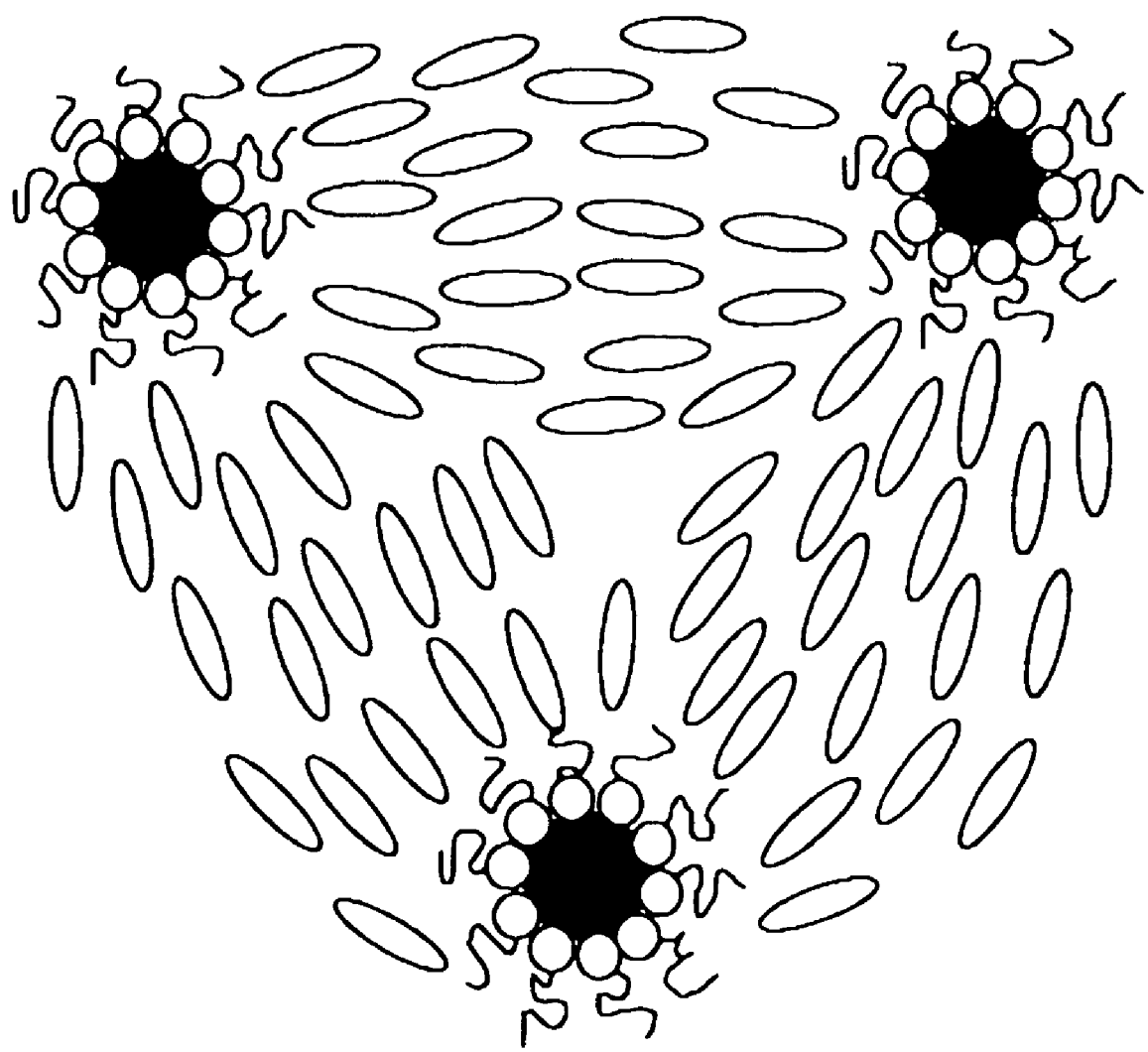
FIG. 8 is a schematic view illustrating another example of the reverse micelle phase mixture system of the liquid crystal microemulsion.

FIG. 3(a) is a cross-sectional view illustrating a schematic arrangement of substantial parts of a display element to which no electric field (voltage) is applied (OFF state). The display element carries out the display by utilizing a change of the magnitude of the optical anisotropy caused by applying an electric field. FIG. 3(b) is a cross-sectional view illustrating a schematic arrangement of substantial parts of the display element shown in FIG. 3(a) to which an electric field (voltage) is applied (ON state). FIG. 4(a) is a cross-sectional view schematically illustrating a medium in the display element shown in FIGS. 3(a) and 3(b) to which no electric field (voltage) is applied (OFF state). FIG. 4(b) is a cross-sectional view schematically illustrating the medium in the display element shown in FIGS. 3(a) and 3(b) to which an electric field (voltage) is applied (ON state). FIG. 5 is a graph showing a relationship between an applied voltage and transmittance in the display element of FIGS. 3(a) and 3(b). FIGS. 6(a) to 6(h) are cross-sectional views schematically illustrating differences of the display principle between the display element which carries out the display by utilizing a change of the magnitude of the optical anisotropy caused by applying an electric field and the conventional liquid crystal display element. The differences are shown by average shapes of refractive index ellipsoids of the medium (shapes of cut surfaces of refractive index ellipsoids) and their main axis directions, when no electric field (voltage) is applied (OFF state) and when an electric field (voltage) is applied (ON state). That is, FIG. 6(a) is a cross-sectional view illustrating the display element which carries out the display by utilizing a change in the optical anisotropy caused by applying an electric field, when no electric field is applied (OFF state). FIG. 6(b) is a cross-sectional view illustrating the display element when an electric field is applied (ON state). FIG. 6(c) is a cross-sectional view illustrating a conventional TN (Twisted Nematic) mode liquid crystal display element when no electric field is applied. FIG. 6(d) is a cross-sectional view illustrating the conventional TN mode liquid crystal display element when an electric field is applied. FIG. 6(e) is a cross-sectional view illustrating a conventional VA (Vertical Alignment) mode liquid crystal display element when no electric field is applied. FIG. 6(f) is a cross-sectional view illustrating the conventional VA mode liquid crystal display element when a voltage is applied. FIG. 6(g) is a cross-sectional view illustrating a conventional IPS (In Plane Switching) mode liquid crystal display element when no electric field is applied. FIG. 6(h) is a cross-sectional view illustrating the conventional IPS mode liquid crystal display element when an electric field is applied.

Generally, the refractive index of a material is not isotropic but varies according to its directions. Here, in cases where an x direction is a direction parallel to a substrate surface (in-plane direction of the substrate, substrate in-plane direction) and a direction opposite to the comb-shaped electrodes 4 and 5, and a y direction is a direction parallel to the substrate surface (in-plane direction of the substrate, substrate in-plane direction) and a direction perpendicular to the direction opposite to the comb-shaped electrodes 4 and 5, and a z direction is a direction perpendicular to the substrate surface (normal direction of the substrate, substrate normal direction), the anisotropy (optical anisotropy) of the refractive index is shown by an ellipsoid (refractive index ellipsoid) shown by the following equation (1) using an arbitrary orthogonal coordinate system $(X_1, X_2, X_3)$ (for example, see "Ryouichi Yamamoto and another, "Organic Electro-Optic Materials", National Technical Report, December 1976, Vol. 22, No. 6, p. 826-834" (hereinafter referred to as "Non-patent Document 12").

$$\sum_{ij}\left(\frac{1}{n_{ij}^2}\right)X_iX_j = 1 \quad (1)$$

$(n_{ji}=n_{ij}, i, j=1, 2, 3)$

When the equation (1) is rewritten by using a coordinate system $(Y_1, Y_2, Y_3)$ of the main axis direction of the ellipsoid, the following relational equation (2) is obtained.

$$\frac{Y_1^2}{n_1^2} + \frac{Y_2^2}{n_2^2} + \frac{Y_3^3}{n_3^3} = 1 \quad (2)$$

$n_1$, $n_2$, and $n_3$ (hereinafter referred to as nx, ny, and nz) are called main refractive indices, and correspond to half in length of three main axes in the ellipsoid. In case of a light wave proceeding from an origin to a direction perpendicular to a surface of $Y_3=0$, the light wave has polarization components in $Y_1$ direction and $Y_2$ direction. The refractive indices of the components in $Y_1$ direction and $Y_2$ direction are respectively nx and ny. Generally, a light proceeding in an arbitrary direction goes through the origin, and a surface perpendicular to a direction in which the light wave proceeds is a cut surface of the refractive index ellipsoid. Directions of main axes of this ellipse are polarization component directions of the light wave. Half in length of the main axis corresponds to the refractive index.

The following description explains the differences of the display principle between the display element which carries out the display by utilizing a change of the magnitude of the optical anisotropy caused by applying an electric field and the conventional liquid crystal display element. The display element H is used as an example of the display element which carries out the display by utilizing a change of the magnitude of the optical anisotropy which is caused by applying an electric field. TN mode, VA mode, and IPS mode are used as examples of the modes of the conventional liquid crystal display element.

As illustrated in FIGS. 6(c) and 6(d), the conventional TN mode liquid crystal display element is structured such that a liquid crystal layer 105 is sandwiched between a pair of substrates 101 and 102 which are provided face to face, and transparent electrodes 103 and 104 (electrode) are respectively provided on the substrates 101 and 102. When no electric field is applied, liquid crystal molecules of the liquid crystal layer 105 are aligned such that the liquid crystal molecules are spirally twisted in a long-axis direction. When an electric field is applied, the liquid crystal molecules are aligned such that the long-axis direction of each of the liquid crystal molecules is along an electric field direction. As illustrated in FIG. 6(c), a typical refractive index ellipsoid 105a is such that its main axis direction (long-axis direction, major axis direction) is parallel to the substrate surface (substrate in-plane direction) when no electric field is applied. As illustrated in FIG. 6(d), the typical refractive index ellipsoid 105a is such that its main axis direction turns to the substrate normal direction when an electric field is applied. That is, the shape of the refractive index ellipsoid 105a is an ellipse when no electric field is applied and when an electric field is applied. The long-axis direction (main axis direction, major axis direction, direction of the refractive index ellipsoid 105a) changes depending on whether or not an electric field is applied. That is, the refractive index ellipsoid 105a rotates. Note that, the shape and the size of the refractive index ellipsoid 105a do not change so much.

As illustrated in FIGS. 6(e) and 6(f), the conventional VA mode liquid crystal display element is structured such that a liquid crystal layer 205 is sandwiched between a pair of substrates 201 and 202 which are provided face to face, and transparent electrodes 203 and 204 (electrode) are respectively provided on the substrates 201 and 202. When no electric field is applied, liquid crystal molecules of the liquid crystal layer 205 are aligned such that the long-axis direction of each of the liquid crystal molecules is substantially perpendicular to the substrate surface. When an electric field is applied, the liquid crystal molecules are aligned such that the long axis direction of each of the liquid crystal molecules is perpendicular to an electric field. As illustrated in FIG. 6(e), a typical refractive index ellipsoid 205a is aligned such that the main axis direction (long-axis direction) turns to the substrate normal direction when no electric field is applied. As illustrated in FIG. 6(f), the typical refractive index ellipsoid 205a is aligned such that the main axis direction is parallel to the substrate surface (substrate in-plane direction) when an electric field is applied. That is, in case of the VA mode liquid crystal display element, just like the TN mode liquid crystal display element, the shape of the refractive index ellipsoid 205a is an ellipse. The long-axis direction changes (the refractive index ellipsoid 205a rotates) depending on whether or not an electric field is applied. Moreover, the shape and the size of the refractive index ellipsoid 205a do not change so much.

As illustrated in FIGS. 6(g) and 6(h), the conventional IPS mode liquid crystal display element is structured such that a pair of electrodes 302 and 303 are provided face to face on a substrate 301. When an electric field (voltage) is applied from the electrodes 302 and 303 to a liquid crystal layer sandwiched between the substrate 301 and a counter substrate (not illustrated), liquid crystal molecules of the liquid crystal layer change their alignment directions (main axis direction (long-axis direction) of the refractive index ellipsoid 305a). Therefore, it is possible to realize different display states depending on whether or not an electric field is applied. That is, in case of the IPS mode liquid crystal display element, just like the TN mode liquid crystal display element and the VA mode liquid crystal display element, the shape and the size of the refractive index ellipsoid 205a do not change so much (that is, the refractive index ellipsoid 305a is an ellipse), but the main axis direction changes (the refractive index ellipsoid 305a rotates) depending on whether or not an electric field is applied.

Thus, according to the conventional liquid crystal display elements, the liquid crystal molecules are aligned in a certain direction (typically, in a single direction) when no electric field is applied. When an electric field is applied, the liquid crystal molecules change their alignment direction all together so as to carry out the display (modulation of transmittance). That is, although the shape and the size of the refractive index ellipsoid do not change (that is, the shape is an ellipse), only the main axis direction (long-axis direction) of the refractive index ellipsoid is rotated (changed) by applying an electric field, so that the display is carried out. Therefore, the major axis direction of the refractive index ellipsoid is not always perpendicular or parallel to the electric field application direction. That is, according to the conventional liquid crystal display elements, the orientational order parameter of the liquid crystal molecules is substantially fixed, and the display is carried out by changing the alignment directions (modulation of transmittance). That is, according to the conventional liquid crystal display elements, when an electric field is applied, the orientational order parameter is substantially fixed, but a direction of an orientation easy axis changes.

Meanwhile, as illustrated in FIGS. 6(a) and 6(b) taking the display element H as an example, according to the display element which carries out the display by utilizing a change of the magnitude of the optical anisotropy caused by applying an electric field, including the display element 80 of the present embodiment, the refractive index ellipsoid 3a is globular when no electric field is applied, that is, the refractive index ellipsoid 3a is optically isotropic when no electric field is applied (nx=ny=nz, orientational order parameter≈0 (substantially 0) in a scale not smaller than the wavelength of the visible light). Moreover, the refractive index ellipsoid is optically anisotropic when an electric field is applied (nx>ny, orientational order parameter >0 in the scale not smaller than the wavelength of the visible light), and the refractive index ellipsoid 3a becomes an ellipse (shows the optical anisotropy). Moreover the major axis direction of the refractive index ellipsoid 3a becomes perpendicular to the electric field application direction. That is, when the dielectric anisotropy of the dielectric material is negative (negative type liquid crystal), the major axis direction of the refractive index ellipsoid 3a is perpendicular to the electric field direction (perpendicular state) regardless of how much electric field is applied. When the dielectric anisotropy of the dielectric material is positive (positive type liquid crystal), the major axis direction of the refractive index ellipsoid 3a is parallel to the electric field direction (parallel state) regardless of how much electric field is applied. In the present invention, the electric field application direction and at least one of the major axis directions of the refractive index ellipsoid 3a are parallel or perpendicular to each other always. Note that, in the present invention, the orientational order parameter ≈0 in the scale not less than the wavelength of the visible light indicates that the orientational order parameter is such a state: when the orientational order parameter ~0 in the scale not less than the wavelength of the visible light, a majority of the liquid crystal molecules or the like are orientated in a certain direction (there is an orientational order) when observed in a scale smaller than the wavelength of the visible light, whereas, in the scale larger than the wavelength of the visible light, the orientational directions of the molecules are averaged (that is, random) and there is no orientational order. Therefore, when the orientational order parameter ≈0 in the scale not less than the wavelength of the visible light, the orientational order parameter is so small that it causes no effect on the light in the wavelength range of the visible light and the light larger than the wavelength of the visible light. For example, when the orientational order parameter ≈0 in the scale equal to or greater than the wavelength of the visible light, the black display is realized under cross nicol polarizers. Furthermore, in the present invention, "the orientational order parameter >0 in the scale equal to or greater than the wavelength of the visible light" indicates that the orientational order parameter in the scale equal to or greater than the wavelength of the visible light is greater than the orientational order parameter of substantially 0. For example, when the orientational order parameter >0 in the scale equal to or greater than the wavelength of the visible light, the white display (and/or gray display, which is a gradation display) is realized under cross nicol polarizers.

That is, the display element which carries out the display by utilizing a change of the magnitude of the optical anisotropy which is caused by applying an electric field, including the display element 80 according to the present embodiment, is such that the molecules (molecules 8, see FIGS. 4(a) and 4(b)) are directed randomly in any directions when no electric field is applied. However, the molecules 8 are orientated in an order (orderly structure, orientational order) smaller than the wavelength of the visible light (the orientational order parameter in the scale not smaller than the wavelength of the visible light ≈0) and thus no optical anisotropy is caused. Therefore, the shape of the refractive index ellipsoid 3a is spherical as illustrated in FIG. 6(a). When the electric field is applied as illustrated in FIG. 6(b), orientational state of the respective molecules 8 is changed because the respective molecules 8 is directed along the in-plane direction of the substrates because the molecules 8 has the negative dielectric anisotropy. Moreover, when the orientation state is changed, the optical anisotropy is caused (the orientational order parameter in the scale not smaller than the wavelength of the visible light >0) as a result of distortion occurred in the orderly structure smaller than the wavelength of the visible light. As described above, as illustrated in the figure taking the display element H as an example, the display element which carries out the display by utilizing a change of the magnitude of the optical anisotropy which is caused by applying an electric field, including the display element 80 in accordance with the present embodiment, is arranged such that, when no electric field is applied, the refractive index ellipsoid 3a has such a shape (nx=ny=nz) that causes the optical isotropy, and when the electric field is applied, the refractive index ellipsoid 3a has such a shape (nx>ny in the vicinity of the surface of the lower substrate (in FIG. 6(b), the substrate 1 located lower); and ny>nx in the vicinity of the surface of the upper substrate (in FIG. 6(b), the substrate 2 located upper)) that causes the optical anisotropy, for example, as illustrated in FIG. 5(b). That is, the display element 80 in accordance with the present embodiment is arranged such that the shape and the size of the refractive index ellipsoid 3a are changeable by and according to the electric field applied thereon. Note that nx, ny, and nz are the principal refractive index of the direction parallel to the substrate surface (substrate in-plane direction) and along the direction in which the interleave electrodes 4 and 5 face each other, the refractive index of the direction parallel to the substrate surface (substrate in-plane direction) and perpendicular to the direction in which the interleave electrodes 4 and 5 face each other, and the principal index of the direction perpendicular to the substrate surface (substrate normal direction).

Figure 24:
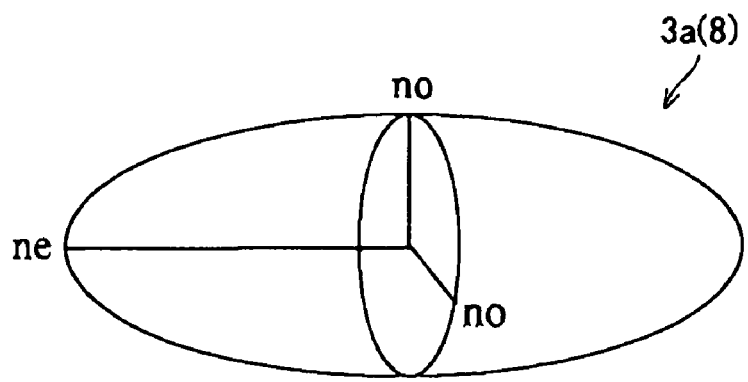
FIG. 24 is a diagram schematically illustrating a shape of a refractive index ellipsoid of a single molecule in the display element illustrated in FIG. 1 when an electric field is applied.

Moreover, FIG. 24 is a schematic view illustrating the shape of the refractive index ellipsoid 3a of one molecule (molecule 8) in the medium A when the electric field is applied, in the display element 80 in accordance with the present embodiment. As illustrated in FIG. 24, the shape of the refractive index ellipsoid 3a is indicated as a cross section of the refractive index ellipsoid (ellipsoid) taken along a plane passing through an original point and perpendicular to a propagation (traveling) direction of light wave. As described above, the major axis direction of the ellipsoid is a component direction of the polarized light of the light wave, and a half of the length of the major axis corresponds to a refractive index along that direction.

The medium A according to the present embodiment is optically isotropic (in isotropic phase) when no electric field is applied, and becomes optically anisotropic when the electric field is applied thereon.

Where ne is the refractive index along the major axis direction of the ellipsoid (that is, the component direction of the polarized light of the light wave) due to the occurrence of the optical anisotropy when the electric field is applied, that is, the refractive index (extraordinary light refractive index) along the major axis direction of the refractive index ellipsoid 3a of the molecule 8, and no is the refractive index along the direction perpendicular to the major axis direction of the refractive index ellipsoid 3a, that is, the refractive index (ordinary light refractive index) along the minor axis direction of the refractive index ellipsoid 3a, the refractive index anisotropy ($\Delta n$) (change in birefringence) is expressed as follows:

$$\Delta n = ne - no.$$

That is, in the present invention, the refractive index anisotropy ($\Delta n$) indicates the change in the birefringence expressed as $\Delta n = ne - no$ (ne: extraordinary light refractive index, no: ordinary light refractive index) ne and no are changed in the present invention, but not in the conventional liquid crystal display element/device.

The major axis direction of the refractive index ellipsoid 3a is parallel to the electric field application direction when the electric field is applied (in case of the medium having the positive dielectric anisotropy), or the major axis direction of the refractive index ellipsoid 3a is perpendicular to the electric field application direction when the electric field is applied (in case of the medium having the negative dielectric anisotropy).

On the other hand, in the conventional liquid crystal display element, the display operation is carried out by rotating the major axis direction of the refractive index ellipsoid on the basis of the electric field application. Thus, in the conventional liquid crystal display element, the major axis direction of the refractive index ellipsoid is not always parallel or perpendicular to the electric field application direction.

Thus, according to the display element 80 of the present embodiment, the direction of the optical anisotropy is fixed (electric field application direction do not change), and the display is carried out by, for example, changing the orientational order parameter in the scale not smaller than the wavelength of the visible light. The magnitude of the optical anisotropy (for example, the orientational order in the scale not smaller than the wavelength of the visible light) of the medium A itself is changed. Therefore, the display element of the present embodiment is totally different from the conventional display elements in terms of the display principle.

Note that, the medium A sealed in the medium layer 3 may be any medium provided that the magnitude of the optical anisotropy thereof is changeable by and according to the electric field applied thereon. For example, the medium A may be such a medium that is substantially optically isotropic (the orientational order parameter in the scale not smaller than the wavelength of the visible light ≈0) when the electric field is applied or when no electric field is applied, and in which optical modulation is induced by the electric field application (that is, the medium becomes optically anisotropic or isotropic by the electric field application). Moreover, the medium A may be such a material (medium) in which the orientational order parameter in the scale not smaller than the wavelength of the visible light is increased among the molecules 8 or molecular agglomerations (clusters) by and according to the application of the electric field (it is further increased from a value of the orientational order parameter in a state where the optical modulation is already induced (the orientational order parameter in the scale not smaller than the wavelength of the visible light >0)). Moreover, the medium A may be a medium in which the orientational order parameter in the scale not smaller than the wavelength of the visible light (magnitude of the optical anisotropy) is decreased among the molecules 8 or the molecular agglomerations by the and according to the application of electric field, compared with the orientational order parameter before the application of the electric field. For example, the medium A may be a medium which is changed from an optical anisotropic state (where the orientational order parameter in the scale not smaller than the wavelength of the visible light >0) to an optical isotropic state (where the orientational order parameter in the scale not smaller than the wavelength of the visible light ≈0).

In the present invention, to change in the magnitude of the optical anisotropy of the medium A by and according to electric field applied on the medium A indicates that, as described above, is to change the refractive index ellipsoid 3a by and according to the electric field applied on the medium A. In the aforementioned arrangement in which the medium A is optically isotropic when no electric field is applied and the magnitude of its optical anisotropy is changeable by and according to the electric field applied thereon, that is, in the arrangement in which the optical anisotropy of the medium A is generated when the electric field is applied, the shape of the refractive index ellipsoid 3a is changed from the spherical shape to the ellipsoidal shape by and according to the electric field applied thereon. On the other hand, in the arrangement in which the medium A is optically isotropic when no electric field is applied thereon, but becomes optically isotropic when the electric field is applied, the shape of the refractive index ellipsoid 3a is changed from the ellipsoidal shape to the spherical shape by and according to the electric field applied thereon. Moreover, in the arrangement in which the medium A is optical anisotropic when no electric field is applied and the magnitude of its optical anisotropy becomes higher or lower by and according to the electric field application, compared with the magnitude of its optical anisotropy attained when no electric field is applied, a major axial length or a minor axial length of the refractive index ellipsoid is changed (extended or shortened) whereby a ratio between the major axial length and the minor axial length of the refractive index ellipsoid is changed between before and after the electric field application (as a result, or example, curvature is changed). For example, in case where the magnitude of the optical anisotropy becomes higher when the electric field is applied, the electric field application causes the ellipsoid to have a larger ratio of its major axial length over its minor axial direction compared with the ratio attained when no electric field is applied. In case where the magnitude of the optical anisotropy becomes lower when the electric field is applied, the electric field application causes the ellipsoid to have a smaller ratio of its major axial length over its minor axial direction compared with the ratio attained when no electric field is applied (that is, the ratio gets closer to 1; the ratio in this case may be such a ratio with which the ellipsoid becomes substantially spherical).

As illustrated in FIG. 4(a), according to the display element which carries out the display by utilizing a change of the magnitude of the optical anisotropy caused by applying an electric field, including the display element 80 of the present embodiment and the display element H, the medium A injected and sealed in a space between the substrates 1 and 2 is in the isotropic phase when no electric field (voltage) is applied to the comb-shaped electrodes 4 and 5, and the medium A is optically isotropic. On this account, the black display is carried out.

Meanwhile, as illustrated in FIG. 4(b), when an electric field (voltage) is applied to the comb-shaped electrodes 4 and 5, each of the molecules 8 in the medium A is aligned such that the long-axis direction of the molecule 8 is along the electric field formed between the comb-shaped electrodes 4 and 5. Therefore, the birefringence phenomenon is expressed. As illustrated in FIG. 5, due to the birefringence phenomenon, it is possible to modulate transmittance of the display element 80 according to the voltage between the comb-shaped electrodes 4 and 5.

Note that, at a temperature which is very far from a phase transition temperature (transition point), a high voltage is required in modulating the transmittance of the display element 80. However, at a temperature which is just above the transition point, it is possible to adequately modulate the transmittance of the display element with a voltage from 0V to about 100V.

For example, according to "D. Demus and three others, "Handbook of Liquid Crystals. Low Molecular Weight Liquid Crystal", Wiley-VCH, 1998, Vol. 1, p. 484-485" (hereinafter referred to as "Non-patent Document 9") and Non-patent Document 12, in cases where the refractive index of the electric field direction is n// and the refractive index of the direction perpendicular to the electric field direction is $n^\perp$, a relationship between birefringence change ($\Delta n=n//-n^\perp$) and the outer electric field, that is, the electric field E (V/m) is shown by $$\Delta n = \lambda \cdot B_k \cdot E^2. \tag{3}$$

Note that, $\lambda$ is a wavelength (m) of the incident light in a vacuum, and $B_k$ is Kerr constant (m/V$^2$), and E is an applied electric field intensity (V/m).

It is well-known that, with a rise in temperature (T), Kerr constant B decreases according to a function proportional to 1/(T−Tni). It is possible to drive the molecules with low electric field intensity when the temperature is around the transition point (Tni). However, high electric intensity is steeply required with a rise in temperature (T). On this account, at a temperature which is very far from the transition temperature (a temperature which is enough higher than the transition temperature), a high voltage is required in modulating the transmittance of the display element. However, at a temperature which is just above the phase transition point, it is possible to adequately modulate the transmittance of the display element with a voltage of about 100V or less.

Note that, the maximal transmittance is obtained by applying a voltage of about 100V to the display element H, which is illustrated in FIGS. 3(a) and 3(b), and in which ITO is used for the comb-shaped electrodes 4 and 5, and the line width of the comb-shaped electrodes 4 and 5 is 5 μm, and the distance between the electrodes is 5 μm, and the thickness of the electrode is 3 μm, and the distance between the substrates (distance between the substrates 1 and 2, that is, thickness of the medium layer 3) is 10 μm, and 5CB is used for the medium A.

Note that, the medium layer 3 can be used in a shutter-type display element in which the optical anisotropy is expressed with a rise in the orientational order parameter in the electric field application direction and the transmittance changes. Therefore, the maximal transmittance is obtained when the anisotropy direction is at an angle of 45° with respect to a direction of each of the polarizing plate absorption axes which are orthogonal with each other. Note that, when a direction in which the optical anisotropy of the medium A is expressed is at an angle of ±θ (degree) with respect to the polarizing plate absorption axis, the transmittance (P) is estimated by the following relational formula (4).

$$P(\%) = \sin^2(2\theta) \tag{4}$$

For example, in cases where the transmittance is 100% when an angle θ is 45°, humans feel that the transmittance of 90% or more is the maximal brightness. Therefore, humans feel that the brightness is substantially maximum or close to maximum when θ is 35°≦θ≦55°. Therefore, it is preferable that θ be 35°≦θ≦55°, most preferably, θ be 45°.

As illustrated in FIG. 2, in the display element 80 of the present embodiment, the polarizing plates 6 and 7 which are respectively provided on the substrates 1 and 2 are formed such that the absorption axis 6a of the polarizing plate 6 and the absorption axis 7a of the polarizing plate 7 be formed so as to be orthogonal with each other, that is, the directions of the polarizing plate absorption axes be orthogonal with each other. Moreover, the polarizing plates 6 and 7 are formed such that: the absorption axis 6a of the polarizing plate 6 is at an angle of 45° with respect to a direction in which the comb-teeth portion 4a of the comb-shaped electrode 4 extends; the absorption axis 7a of the polarizing plate 7 is at an angle of 45° with respect to a direction in which the comb-teeth portion 5a of the comb-shaped electrode 5 extends. On this account, the absorption axis 6a of the polarizing plate 6 is at an angle of 45° with respect to the electric field application direction of the comb-shaped electrode 4, and the absorption axis 7a of the polarizing plate 7 is at an angle of 45° with respect to the electric field application direction of the comb-shaped electrode 5. For comparison, the display element H illustrated in FIGS. 3(a) and 3(b) is set up in the same way as above, so that the display element H illustrated in FIGS. 3(a) and 3(b) and the display element 80 of the present invention are arranged in the same way except that the insulating layer 21 is provided in the display element 80 of the present invention. The measurement is carried out under this condition.

As a result, the display element 80 illustrated in FIG. 1 is different from the display element H illustrated in FIGS. 3(a) and 3(b) in that the insulating layer 21 having a thickness of 3.2 µm is provided between the substrate 1 and the comb-shaped electrode 4 and between the substrate 1 and the comb-shaped electrode 5, so that the maximal transmittance is obtained with a voltage of 71V. Therefore, as compared with the display element H illustrated in FIGS. 3(a) and 3(b), the display element 80 illustrated in FIG. 1 can further reduce the driving voltage.

The reasons for this are discussed below.

As described above, the phenomenon (typically, Kerr effect) in which the birefringence ratio $\Delta n$ ($\Delta n = n// - n^\perp$) is proportional to the square of the applied electric field is shown by the following relational formula (5).

$$\Delta n = C \cdot E^2 = C \cdot (V/ds)_2 \quad (5)$$

Note that, E is an applied electric field (V/m), and V is an applied voltage (V), and ds is a distance between the electrodes, and C is a constant (m²/V²). As described above, C is typically shown by $\lambda \cdot B_k$ ($\lambda$ is a wavelength (m) of the incident light in a vacuum, and $B_k$ is Kerr constant (m/V²)).

Moreover, as described above, in cases where linear polarized light which is projected from a light source through the polarizing plate 6 and has a polarized wave surface shifted at an angle of 45° with respect to the electric field direction is incident on the medium layer 3, a phase difference $\delta$ generated between polarized light components in the electric field direction and in a direction perpendicular to the electric field direction is shown by the following relational formula (6).

$$\delta = 2\pi \cdot \text{deff} \cdot \Delta n / \lambda \quad (6)$$

Note that, as illustrated in FIG. 3(b), deff is a visual thickness (practical thickness) of a region in the medium layer 3, the region responding by applying an electric field.

On this account, the light transmitted through the medium layer 3 becomes elliptically polarized light corresponding to the above relational formula (6). Therefore, part of the elliptically polarized light can be transmitted through the polarizing plate 7. Part of the elliptically polarized light becomes linear polarized light, and is transmitted through the polarizing plate 7. Transmittance ($P_T$) in this case is shown by the following relational formula (7).

$$P_T = \sin^2(\delta/2) \quad (7)$$

Therefore, according to the relational formulas (6) and (7), the maximal transmittance is obtained when the following relational formula (8) is satisfied.

$$\text{deff} \cdot \Delta n = \lambda/2 \quad (8)$$

Here, the practical thickness (deff(0)) of the display element H illustrated in FIG. 3(b) is set to be ω (deff(0)=ω). The measurement is carried out by changing the distance between the substrates (distance between the substrates 1 and 2, that is, thickness of the medium layer 3) ranging from 1 µm to 10 µm. When the distance between the substrates is 1 µm, the voltage required in obtaining the maximal transmittance is maximal. Moreover, the voltage required in obtaining the maximal transmittance tends to decrease with an increase in the distance between the substrates. However, the voltage required in obtaining the maximal transmittance stops decreasing when the distance between the substrates is about 3 µm. According to the above, ω may be about 3 µm. In other words, a region 3 µm away from the surfaces of the comb-shaped electrodes 4 and 5 is too far from the electrodes (comb-shaped electrodes 4 and 5) to contribute to the optical response. Note that, ω also depends on the distance between the electrodes.

Therefore, the practical thickness (deff(1)) of the display element 80 illustrated in FIG. 1 may be about 2ω (deff(1)=2ω). In the display element 80 illustrated in FIG. 1, the concave portion 9 having a thickness of 3.5 µm (including an electrode thickness of the comb-shaped electrodes 4 and 5) is formed between the comb-shaped electrodes 4 and 5. That is, the practical thickness of the display element 80 illustrated in FIG. 1 may be twice as thick as the practical thickness of the display element H illustrated in FIGS. 3(a) and 3(b).

Therefore, according to the above relational formula (8), the birefringence ratio $\Delta n$ for obtaining the maximal transmittance of the display element 80 illustrated in FIG. 1 is half the value of the birefringence ratio $\Delta n$ for obtaining the maximal transmittance of the display element H illustrated in FIGS. 3(a) and 3(b). That is, according to the above relational formula (5), the maximal transmittance of the display element 80 illustrated in FIG. 1 can be obtained when the electric field E and the voltage V are $1/\sqrt{2}$ of the electric field E and the voltage V of the display element H illustrated in FIGS. 3(a) and 3(b).

On this account, the display element 80 illustrated in FIG. 1 can reduce the driving voltage in the following way as compared with the display element H illustrated in FIGS. 3(a) and 3(b) which requires 100V of the driving voltage.

$$100V \times (1/\sqrt{2}) \approx 71V$$

Note that, deff is not an actual depth of the concave portion 9 but a parameter showing a thickness of the medium layer 3 which practically responds. In the above case, the thickness (ω) which practically responds is about 3 µm, so that the concave portion 9 is not especially limited as long as the concave portion 9 is concaved lower than the comb-shaped electrodes 4 and 5 (at least the comb-teeth portion 4a and 5a). The depth of the concave portion may be 31m or more. Even when the depth of the concave portion 9 is 3 µm or more, the thickness which practically responds is 3 µm.

Figure 10:
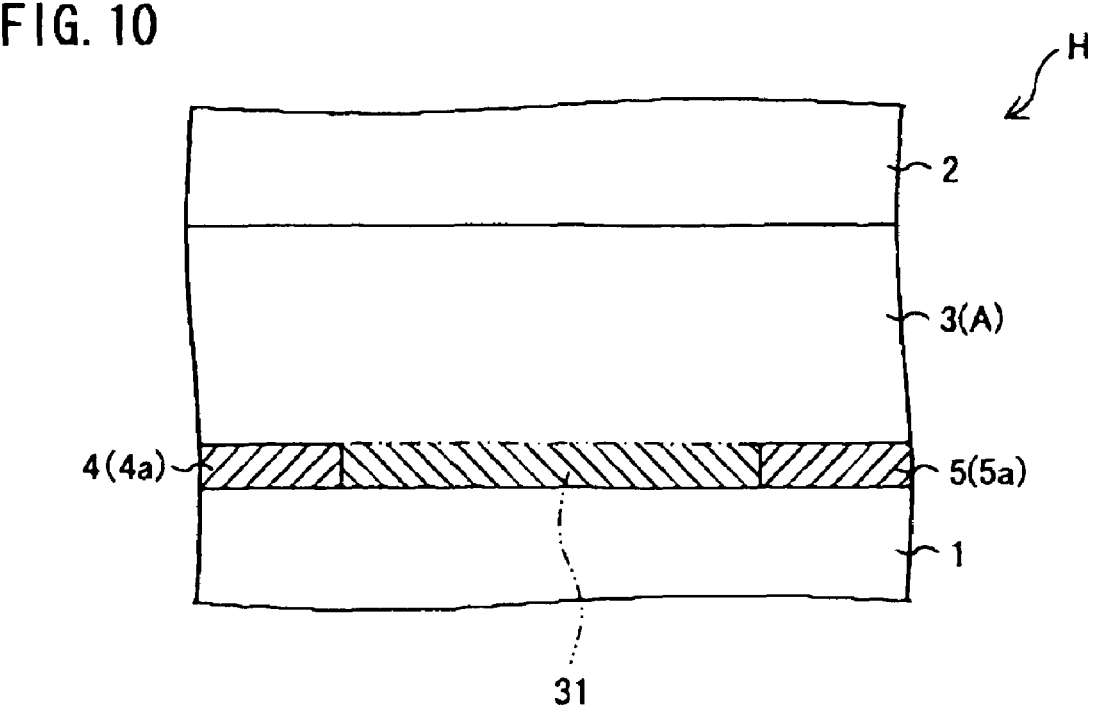
FIG. 10 is a cross-sectional view illustrating a maximal electric field region in the display element illustrated in FIGS. 3(a) and 3(b).

Furthermore, in the display element H illustrated in FIGS. 3(a) and 3(b), a region where the electric field intensity is maximal is illustrated by hatched lines in FIG. 10. In other words, the region where the electric field intensity is maximal is a region between the comb-shaped electrodes 4 and 5 (comb-teeth portions 4a and 5a), that is, a region surrounded by the comb-shaped electrodes 4 and 5 and the substrate 1 (hereinafter referred to as a maximal electric field region 31).

Molecules (molecules 8) constituting the medium A stick fast to an interface of the substrate 1. In the display element which carries out the display by utilizing a change of the magnitude of the optical anisotropy caused by applying an electric field (including the display element 80 of the present embodiment), it is ideally desirable that the molecules constituting the medium A are optically isotropic and stick fast to the interface of the substrate 1.

However, when the electric field intensity is high, the molecules are aligned in an electric field direction while spending a long period of time (a few minutes to several tens minutes). Then, the optical anisotropy is expressed. Moreover, the molecules which have been once stuck in a certain direction do not easily return to an optically-isotropic state because an interaction between the substrate 1 and the molecules is strong. Therefore, when the state is changed from a state (for example, white) where the electric field intensity is high to another state (neutral color, black), a printing afterimage is generated. Moreover, in cases where the printing afterimage is generated entirely, the contrast may be deteriorated.

In order to bring the molecules (molecules 8) which have been stuck in a certain direction back to the molecules in the optically-isotropic state, it is necessary to increase the temperature of the display element so that the medium A is in a physically-isotropic state (liquid). However, this is not easy. In addition, changing the state of the medium A to the physically-isotropic state (liquid) leads to an increase in cost and an increase in power consumption. Moreover, in cases where the liquid crystal material such as 5CB is used as the medium A, that is, in cases where the liquid crystal material, which changes its transmittance by applying an electric field (voltage) at a temperature higher than the liquid crystal phase/isotropic phase transition temperature, is used as the medium A, it is impossible to change the state of the medium A to the liquid state during displaying because it is impossible to carry out the display when the medium A is in the liquid state.

Figure 11:
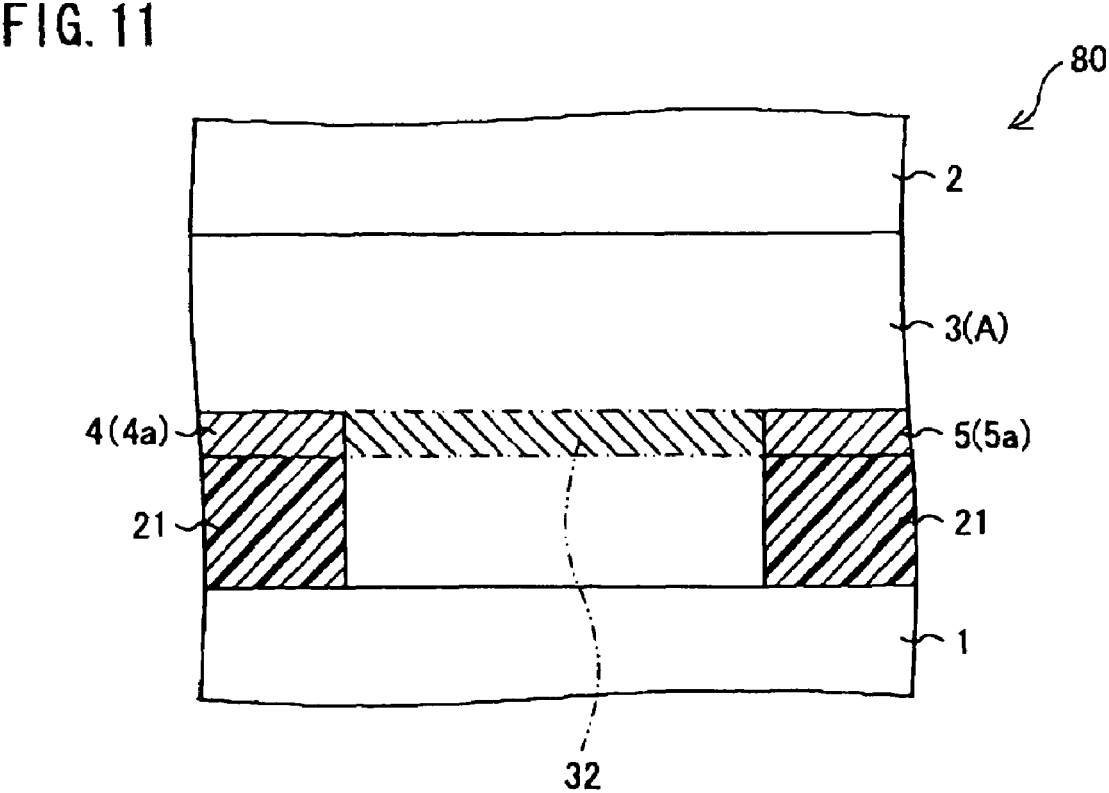
FIG. 11 is a cross-sectional view illustrating a maximal electric field region in the display element illustrated in FIG. 1.

In contrast, according to the display element 80 of the present embodiment, the above problem does not occur. According to the display element 80 of the present embodiment, the driving voltage (the electric field intensity) can be reduced, so that it is possible to suppress the generation of the afterimage. In addition, in the display element 80 of the present embodiment, a maximal electric field 32 illustrated by hatched lines (a region illustrated by chain double-dashed lines) in FIG. 11 is separated from the interface of the substrate 1. On this account, it is possible to suppress the above afterimage.

Note that, in an IPS mode liquid crystal display apparatus which is one of conventional liquid crystal display apparatuses in which, instead of the medium layer 3, a liquid crystal layer is used and a horizontal electric field is applied to the liquid crystal layer, it is impossible to suppress the afterimage.

Figure 12A:
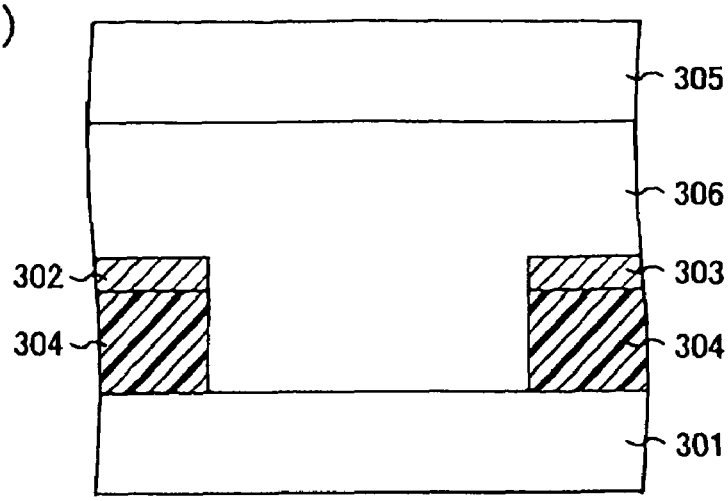
FIG. 12(a) is a cross-sectional view illustrating a schematic arrangement of substantial parts of the IPS mode liquid crystal display element illustrated in FIGS. 6(g) and 6(h) to which insulating layers equivalent to the insulating layers illustrated in FIG. 1 are provided.
Figure 12B:
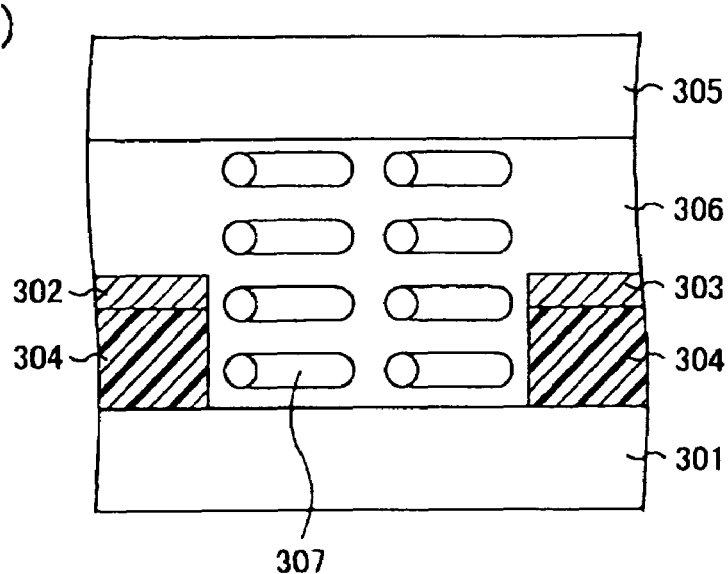
FIG. 12(b) is a cross-sectional view illustrating a schematic arrangement of substantial parts of the liquid crystal display element illustrated in FIG. 12(a) and also schematically illustrating an ideal alignment state of liquid crystal molecules in the liquid crystal display element when an electric field is applied.
Figure 12C:
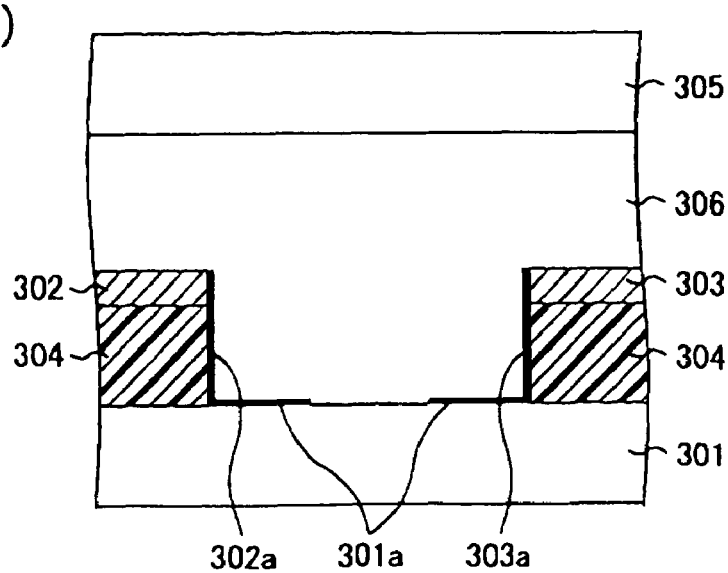
FIG. 12(c) is a cross-sectional view illustrating a schematic arrangement of substantial parts of the liquid crystal display element illustrated in FIG. 12(a) and also schematically illustrating regions where imperfect alignment occurs in the liquid crystal display element.

Each of FIGS. 12(*a*) to 12(*c*) is a cross-sectional view illustrating an arrangement of substantial parts of the IPS mode liquid crystal display element to which the present invention (electrode structure) is applied. Moreover, FIG. 13 is a plane view illustrating a rubbing direction of the substrate in the liquid crystal display element shown in FIGS. 12(*a*) to 12(*c*).

FIG. 12(*a*) is a cross-sectional view illustrating a schematic arrangement of substantial parts of the liquid crystal display element in which an insulating layer 304 equivalent to the insulating layer 21 in the display element 80 of the present embodiment is provided on the IPS mode liquid crystal display element illustrated in FIGS. 6(*g*) and 6(*h*). As illustrated in FIG. 12(*a*), the liquid crystal display element is structured such that electrodes 302 and 303 are provided face to face above a substrate 301 via insulating layers 304. A liquid crystal layer 306 is sandwiched between the substrate 301 and a substrate 305 which are provided face to face, and an electric field (voltage) is applied from the electrodes 302 and 303 to the liquid crystal layer 306. In this way, liquid crystal molecules 307 in the liquid crystal layer 306 change their alignment direction as illustrated in FIG. 12(*b*). Therefore, it is possible to carry out different display states depending on whether or not an electric field is applied.

Figure 13:
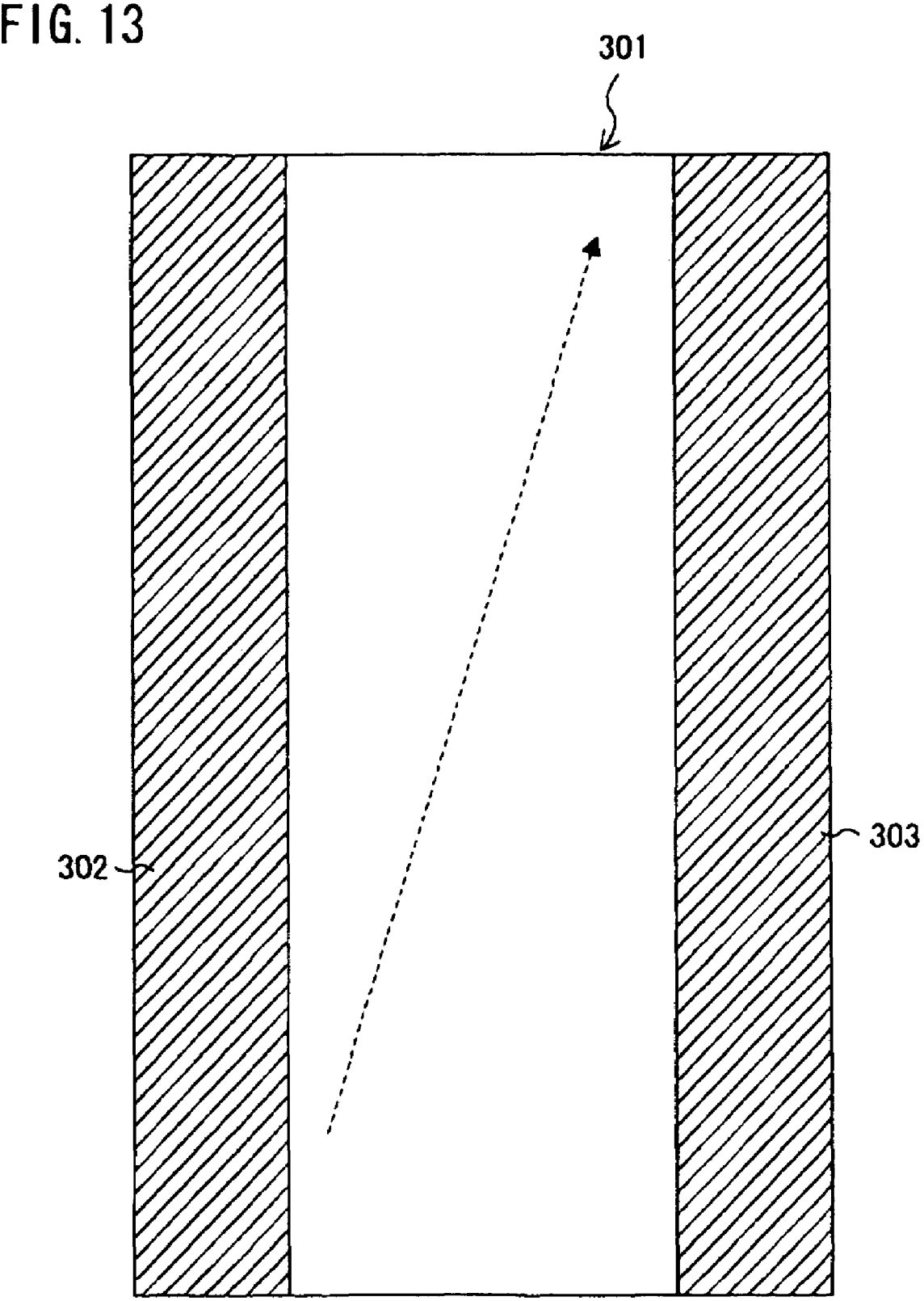
FIG. 13 is a plane view illustrating a rubbing direction of the substrate in the display element illustrated in FIGS. 12(a) to 12(c).

In case of the IPS mode liquid crystal display element, a rubbing treatment is carried out with respect to a horizontal alignment film (not illustrated) so that the horizontal alignment film is rubbed in an oblique direction with respect to the substrate 301 (an arrow direction illustrated in FIG. 13). The horizontal alignment film is previously applied onto the surface of the substrate 301 above which the electrodes 302 and 303 are formed via the insulating layers 304. In this case, as illustrated in FIG. 12(*b*), in the normal direction of the substrate 301, ideally, the liquid crystal molecules 307 are aligned such that the long-axis direction of each of the liquid crystal molecules 307 is parallel to the substrate 301. However, because the insulating layers 304 are provided, the liquid crystal molecules 307 are imperfectly aligned near a side surface 302*a* of the electrode 302, a side surface 303*a* of the electrode 303, and regions 301*a* which are on the substrate 301 and shadows of the electrodes 302 and 303. Therefore, an ideal alignment is not realized. Moreover, light leakage occurs when a black display is carried out, so that the contrast is greatly deteriorated.

One reason why the imperfect alignment occurs is that, in case of the regions 301*a*, the rubbing treatment is not carried out because the electrodes 302 and 303 are protruded (a cloth for rubbing cannot reach the regions 301*a*). Moreover, in case of the side surface 302*a* of the electrode 302 and the side surface 303*a* of the electrode 303, vertical alignment films, which are different from the level alignment films, are required (that is, the long-axis direction of the liquid crystal molecules 307 is perpendicular to a wall surface of the element). However, it is difficult to partially change the alignment films. When the level alignment films are applied to the side surfaces 302*a* and 303*a*, the molecules 307 are imperfectly aligned.

That is, when the present invention is applied to the IPS mode liquid crystal display element, the contrast is deteriorated. Meanwhile, according to the display element 80 of the present embodiment, it is possible to suppress the printing afterimage and the deterioration of the contrast, which cannot be realized by the IPS mode liquid crystal display element.

In addition, unlike the liquid crystal display apparatus, the display element 80 of the present embodiment does not require the alignment treatment carried out with respect to the interface of the substrate 1 because the medium A showing the optical isotropy is used. Therefore, it is possible to reduce cost, and to prevent a ratio of satisfactorily produced goods from decreasing, and to suppress an imperfect display (deterioration of the contrast and rough display).

Note that, in the present embodiment, the transmission-type display element is used as an example of the display element 80 of the present embodiment. However, the present invention is not limited to this, and it is possible to use a reflection-type display element as an example of the display element 80.

Figure 14:
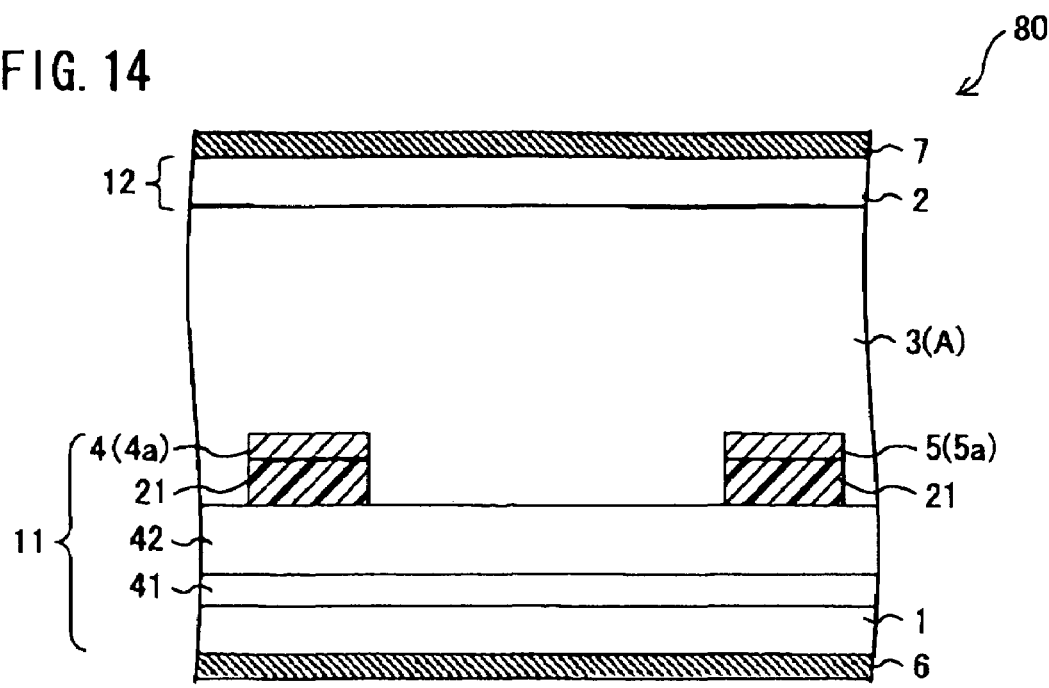
FIG. 14 is a cross-sectional view illustrating one example of a schematic arrangement of a reflection-type display element in accordance with one embodiment of the present invention.

FIG. 14 is one example of a schematic arrangement of a reflection-type display element in accordance with the present embodiment as the display element 80 of the present embodiment. Note that, the present invention is applied to the reflection-type display element.

In the reflection-type display element 80, a pixel substrate 11 is structured such that a reflection layer 41 is provided above a substrate 1 which is a glass substrate or the like, and comb-shaped electrodes 4 and 5 made of ITO or the like are provided above the reflection layer 41, if necessary, via an insulating layer 42. Note that, the rest of the arrangement of the reflection-type display element is the same as the above-mentioned. As the insulating layer 42, it is possible to apply an organic film (acrylic resin, etc.), an inorganic film (silicon nitride, silicon dioxide, etc.), and the like. Moreover, as the reflection layer 41, it is possible to apply an aluminum thin film, a silver thin film, or the like. In the above arrangement, the reflection layer 41 can reflect light incoming from another substrate 2 which is a transparent substrate such as a glass substrate or the like. Therefore, it is possible to function as the reflection-type display element.

Note that, when the display element 80 of the present embodiment is used as the reflection-type display element, not only transparent electrode materials (such as ITO which is used when the display element is used as the transmission-type display electrode) but also various materials (which are conventionally well-known as electrode materials such as metal electrode materials (aluminum, etc.)) can be used for the comb-shaped electrodes 4 and 5. The line width of the comb-shaped electrodes 4 and 5 and the distance between the electrodes (electrode interval) are not especially limited. It is possible to set up arbitrarily, for example, according to a gap between the substrate 1 and the substrate 2.

Furthermore, the present embodiment explained, as an example, a case where glass substrates are used as the substrates 1 and 2. However, the present invention is not limited to this, and the substrates 1 and 2 may be of any kind as long as at least one of the substrates 1 and 2 is a transparent substrate. For example, it is possible to use various substrates which are conventionally well-known.

Note that, the substrates 1 and 2 are not limited to substrates which are conventionally used, but may be a film-type substrate, or a substrate having flexibility. As long as at least one of the substrates is transparent, and the medium A can be kept (sandwiched) between the substrates (in the means for holding the medium), that is, the medium A can be kept (sandwiched) inside, it is possible to use variety of materials according to the kind of the medium A, the state of the phase, and the like.

Moreover, the present embodiment explained, as a concrete example, a case where the medium A is made of a material which is optically isotropic when no electric field is applied and is optically anisotropic when a voltage is applied. However, the present invention is not limited to this. As mentioned above, the medium A may be such a material that anisotropy is lost by applying a voltage and the optical isotropy is expressed.

The following description deals with a concrete example. The medium A used in the concrete example is such a material that anisotropy is lost by applying a voltage and the optical isotropy is expressed.

In the present concrete example, the substrates 1 and 2 are transparent, and are glass substrates. The transparent comb-shaped electrodes 4 and 5 made of ITO and the alignment film made of polyimide are formed on the substrate 1 so as to be positioned in a counter surface which faces the substrate 2 (faces a counter surface of the substrate 2). Moreover, the medium A is injected and sealed between the substrates 1 and 2. The medium A is 4'-n-alkoxy-3'-nitrobiphenyl-4-carboxylic acid (ANBC-22), which is a transparent dielectric material. Plastic beads are scattered onto the counter surfaces of the substrates 1 and 2 in advance, so that a thickness of the medium layer 3 in the display element 80 is adjusted to be 4 μm.

Note that, as mentioned above, the polarizing plate 6 is provided on an outer surface of the substrate 1 (rear surface with respect to the counter surface of the substrate 1) and the polarizing plate 7 is provided on an outer surface of the substrate 2 (rear surface with respect to the counter surface of the substrate 2). The absorption axis 6a of the polarizing plate 6 is orthogonal to the absorptions axis 7a of the polarizing plate 7. Moreover, the absorption axis 6a is at an angle of about 45° with respect to a direction in which the comb-teeth portion 4a of the comb-shaped electrode 4 extends, and the absorption axis 7a is at an angle of about 45° with respect to a direction in which the comb-teeth portion 5a of the comb-shaped electrode 5 extends.

The display element 80 thus obtained is kept at about a smectic C phase/cubic phase transition temperature (at a temperature which is lower than the phase transition temperature, and is higher than a temperature about 10K lower than the phase transition temperature) by using an outer heating device (heating means). When a voltage is applied to the display element, the transmittance can be changed. That is, when an electric field is applied to the display element in the smectic C phase (bright state) which is optically anisotropic when no electric field is applied, the smectic C phase can be changed into a cubic phase (dark state) which is isotropic.

Note that, in the above concrete example, the absorption axis 6a of the polarizing plate 6 is at an angle of 45° with respect to the direction in which the comb-teeth portion 4a of the comb-shaped electrode 4 extends, and the absorption axis 7a of the polarizing plate 7 is at an angle of 45° with respect to the direction in which the comb-teeth portion 5a of the comb-shaped electrode 5 extends. However, the present invention is not limited to this. The display can be carried out with any angle ranging from 0° to 90°. This is because the bright state is realized when no electric field is applied. It is possible to obtain the bright state only by setting an orientational treatment direction (rubbing direction) and directions of the absorption axes of the polarizing plates. Moreover, the dark state is realized by an electric field inducing phase transition which is occurred by applying an electric field to a medium so that the medium becomes optically isotropic. It is possible to obtain the dark state only by setting the absorption axes of the polarizing plates which are orthogonal to each other, and the directions of the comb-shaped electrodes do not matter.

Therefore, in the above concrete example, the alignment treatment is not indispensable, and it is possible to carry out the display in an amorphous alignment state (random alignment state). Note that, alignment films are respectively formed onto the inner sides (counter surfaces) of the substrates 1 and 2. The alignment films are made of polyimide, and the rubbing treatment is carried out with respect to the alignment films. It is preferable that the rubbing direction be such direction that a bright state is realized in the smectic C phase. Typically, it is preferable that the rubbing direction be at an angle of about 45° with respect to the direction of the polarizing plate absorption axis.

Thus, the medium A used in the display element 80 of the present embodiment may be a medium which has the optical anisotropy when no voltage is applied, and in which the optical anisotropy is lost by applying a voltage and the optical isotropy is expressed.

Moreover, the medium A may have positive dielectric anisotropy, or may have negative dielectric anisotropy. Moreover, an electric field applied to the display element 80 of the present embodiment does not always have to be parallel to the substrates 1 and 2. For example, it is possible to drive the display element 80 by the electric field which is oblique with respect to the substrates 1 and 2. That is, as long as the electric field applied to the display element 80 is substantially parallel to the substrates 1 and 2 (that is, the electric field is substantially in the substrate in-plane direction), it is possible to drive the display element 80. Note that, when applying the electric field which is oblique with respect to the substrates 1 and 2, the shape of the electrode, and the arrangement position of the electrode may be suitably changed.

Moreover, in the present embodiment, each of the comb-shaped electrodes 4 and 5 is formed in a convex shape. To be more precise, each of the comb-shaped electrodes 4 and 5 is stacked on the insulating layer 21 which is formed in a comb-like shape, which is just like the shape of each of the comb-shaped electrodes 4 and 5. Therefore, the convex portion 9 is provided between the comb-shaped electrodes 4 and 5. However, the present invention is not limited to this arrangement. An arrangement may be such that concavities and convexities are formed on the surface of the substrate 1, and the concave portion is formed between the comb-shaped electrodes 4 and 5.

Embodiment 2

Figure 15:
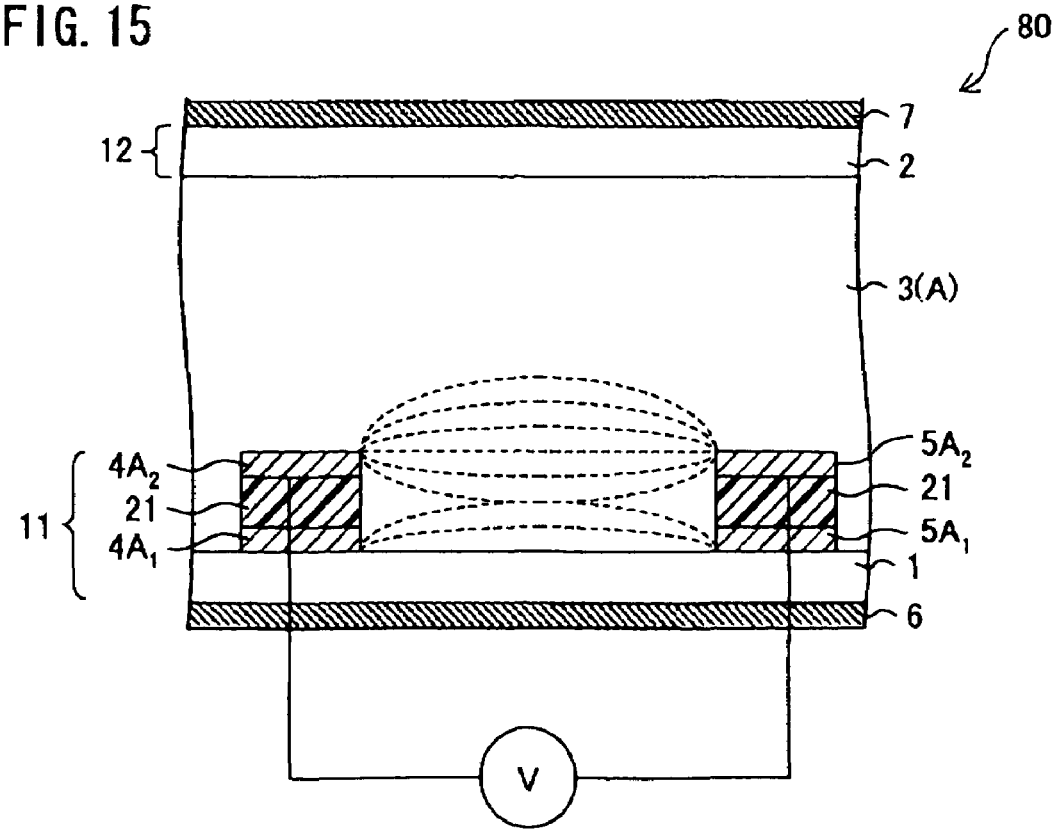
FIG. 15 is a cross-sectional view illustrating one example of a schematic arrangement of substantial parts of a display element in accordance with another embodiment of the present invention.
Figure 16:
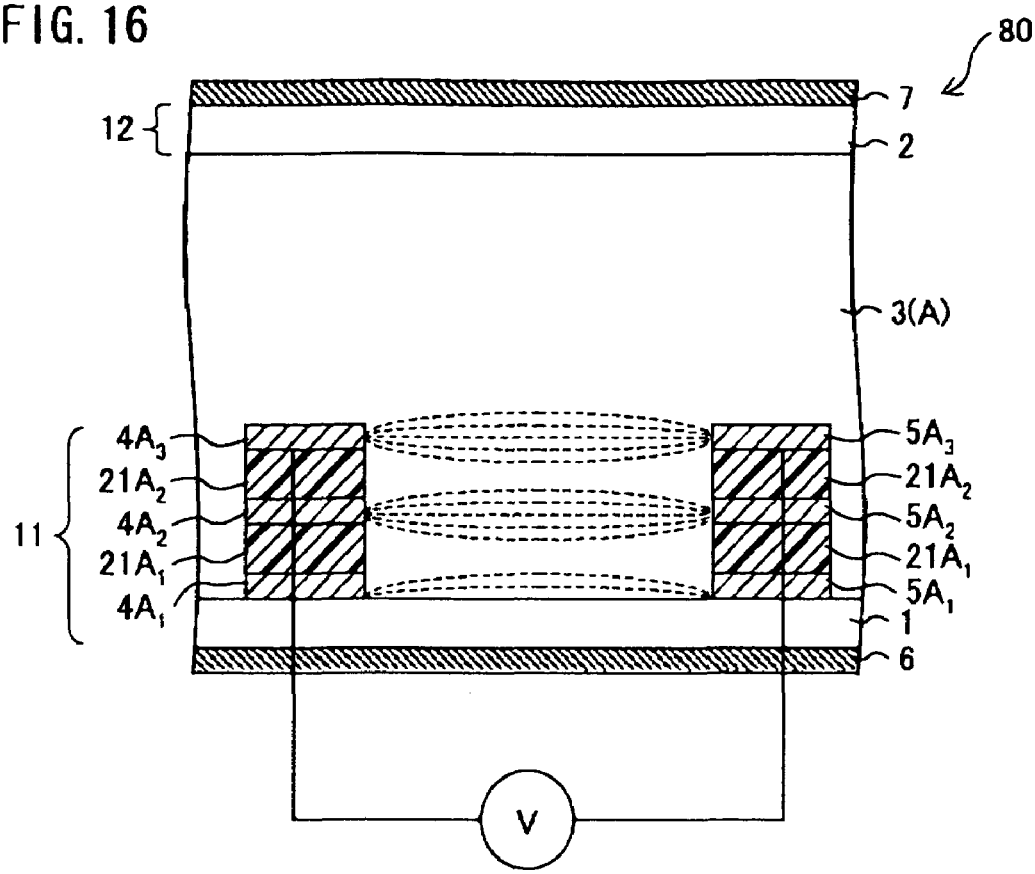
FIG. 16 is a cross-sectional view illustrating another example of a schematic arrangement of substantial parts of a display element in accordance with another embodiment of the present invention.

The following description explains another embodiment of the present invention in reference to FIGS. 15 and 16. Note that, the present embodiment mainly explains points different from points described in Embodiment 1. The same reference numerals are used for the members having the same functions as the members used in Embodiment 1, and further explanations thereof are omitted.

Embodiment 1 explained a case where each of the comb-shaped electrodes 4 and 5 is stacked above the substrate 1 via the insulating layer 21 which is formed (patterned) in a comb-like shape, which is just like the shape of each of the comb-shaped electrodes 4 and 5. The present embodiment explains a case where a plurality of the comb-shaped electrodes 4 are formed via the insulating layers 21 and a plurality of the comb-shaped electrodes 5 are formed via the insulating layers 21.

That is, the display element 80 of the present embodiment is structured such that a pair of substrates 1 and 2 are provided, and the comb-shaped electrode 4 and the insulating layer 21 are alternately stacked on and above the substrate 1, and also the comb-shaped electrode 5 and the insulating layer 21 are alternately stacked on and above the substrate 1.

FIG. 15 is a cross-sectional view illustrating a schematic arrangement of substantial parts of the display element 80 of the present embodiment. Moreover, FIG. 16 is a cross-sectional view illustrating a schematic arrangement of substantial parts of another display element 80 of the present embodiment.

The display elements 80 illustrated in FIGS. 15 and 16 are structured in the same way as the display element 80 of Embodiment 1, except that the display elements 80 illustrated in FIGS. 15 and 16 are structured such that the comb-shaped electrode 4 and the insulating layer 21 are alternately stacked on and above the substrate 1, and also the comb-shaped electrode 5 and the insulating layer 21 are alternately stacked on and above the substrate 1.

That is, in the pixel substrate 11 of the display element 80 illustrated in FIG. 15, $4A_1$ is the comb-shaped electrode 4 in a first layer (first electrode), and $5A_1$ is the comb-shaped electrode 5 in the first layer (first electrode). Moreover, $4A_r$ is the comb-shaped electrode 4 in an r layer (r electrode), and $5A_r$ is the comb-shaped electrode 5 in the r layer (r electrode) (r is an arbitrary integer). That is, the pixel substrate 11 of the display element illustrated in FIG. 15 is structured such that the substrate 1, the comb-shaped electrode $4A_1$ (first electrode), the insulating layer 21 (resin), and the comb-shaped electrode $4A_2$ are stacked in this order, and also the substrate 1, the comb-shaped electrode $5A_1$ (first electrode), the insulating layer 21 (resin), and the comb-shaped electrode $5A_2$ are stacked in this order.

Moreover, like the pixel substrate 11 of the display element illustrated in FIG. 15, in cases where $4A_1$ is the comb-shaped electrode 4 in a first layer (first electrode), and $5A_1$ is the comb-shaped electrode 5 in the first layer (first electrode), and $4A_r$ is the comb-shaped electrode 4 in an r layer (r electrode), and $5A_r$ is the comb-shaped electrode 5 in the r layer (r electrode) (r is an arbitrary integer), and $21A_1$ is the insulating layer 21 in a first layer (first insulating layer), and $21A_r$ is the insulating layer 21 in an r layer (r insulating layer) (r is an arbitrary integer), the pixel substrate 11 of the display element illustrated in FIG. 16 is structured such that the substrate 1, the comb-shaped electrode $4A_1$ (first electrode), the insulating layer $21A_1$ (first insulating layer, resin), the comb-shaped electrode $4A_2$ (second electrode), the insulating layer $21A_2$ (second insulating layer, resin), and the comb-shaped electrode $4A_3$ (third electrode) are stacked in this order, and also the substrate 1, the comb-shaped electrode $5A_1$ (first electrode), the insulating layer $21A_1$ (first insulating layer, resin), the comb-shaped electrode $5A_2$ (second electrode), the insulating layer $21A_2$ (second insulating layer, resin), and the comb-shaped electrode $5A_3$ (third electrode) are stacked in this order.

Therefore, the comb-shaped electrodes $4A_2$, $5A_2$, $4A_3$, and $5A_3$ are separated from the substrate 1 by the insulating layers $21A_1$ and $21A_2$. Moreover, a concave portion is formed between the comb-shaped electrodes $4A_2$ and $5A_2$ (between $4A_3$ and $5A_3$), and is concaved lower than the comb-shaped electrodes $4A_2$, $5A_2$, $4A_3$, and $5A_3$ (that is, concaved in a direction of the substrate). That is, the display element 80 is structured such that a plurality of the comb-shaped electrodes 4 are formed via the insulating layers 21 and also a plurality of the comb-shaped electrodes 5 are formed via the insulating layers, and a concave portion is formed between at least a pair of the comb-shaped electrodes 4 and 5 and is concaved lower than the comb-shaped electrodes 4 and 5.

The above-described stacking arrangement can be realized by using conventionally-known various techniques such as sputtering, photolithography, etching, or the like.

Here, the practical thickness of each of the display elements 80 illustrated in FIGS. 15 and 16 is measured in the same way that the practical thickness is measured in Embodiment 1. In case of the display element 80 illustrated in FIG. 15, deff(2)=3ω. In case of the display element 80 illustrated in FIG. 16, deff(3)=5ω. On this account, the display element 80 illustrated in FIG. 15 can reduce the driving voltage in the following way as compared with the display element H illustrated in FIGS. 3(*a*) and 3(*b*) which requires 100V of the driving voltage.

$$100V \times (1/\sqrt{3}) = 58V$$

Moreover, the display element 80 illustrated in FIG. 16 can reduce the driving voltage in the following way as compared with the display element H illustrated in FIGS. 3(*a*) and 3(*b*) which requires 100V of the driving voltage.

$$100V \times (1/\sqrt{5}) = 45V$$

As a result, the voltage required in obtaining the maximal transmittance in the display element 80 illustrated in FIG. 15 is 58V, and the voltage required in obtaining the maximal transmittance in the display element 80 illustrated in FIG. 16 is 45V. Therefore, it is possible to decrease the voltage drastically as compared with the display element H illustrated in FIGS. 3(*a*) and 3(*b*).

Note that, the present embodiment explained a case where the comb-shaped electrodes $4A_1$ and $5A_1$ (first electrodes) are directly provided on the substrate 1. However, the present invention is not limited to this. For example, as described in Embodiment 1, the insulating layer 21, that is, the insulating layer $21A_1$ (first insulating layer, resin) may be formed on the substrate 1, and the comb-shaped electrode $4A_1$ may be provided on the insulating layer $21A_1$ and also the comb-shaped electrode $5A_1$ may be provided on the insulating layer $21A_1$. Moreover, the comb-shaped electrode 4 and the insulating layer 21 may be alternately stacked on and above the substrate 1, and also the comb-shaped electrode 5 and the insulating layer 21 may be alternately stacked on and above the substrate 1

Moreover, also in the present embodiment, an arrangement may be such that concavities and convexities are formed on the surface of the substrate 1, so that the concave portion is formed between the comb-shaped electrodes $4A_1$ and $5A_1$ (first electrodes).

Furthermore, in the display element 80 of the present embodiment, the maximal electric field region between the comb-shaped electrodes $4A_2$ ($4A_r$) and $5A_2$ ($5A_r$) is separated from the interface of the substrate 1. Any of the display elements 80 of the present embodiment can reduce the driving voltage (voltage reduction effect). Therefore, it is possible to suppress the generation of the printing afterimage, and also possible to suppress the deterioration of the contrast.

Embodiment 3

Figure 17:
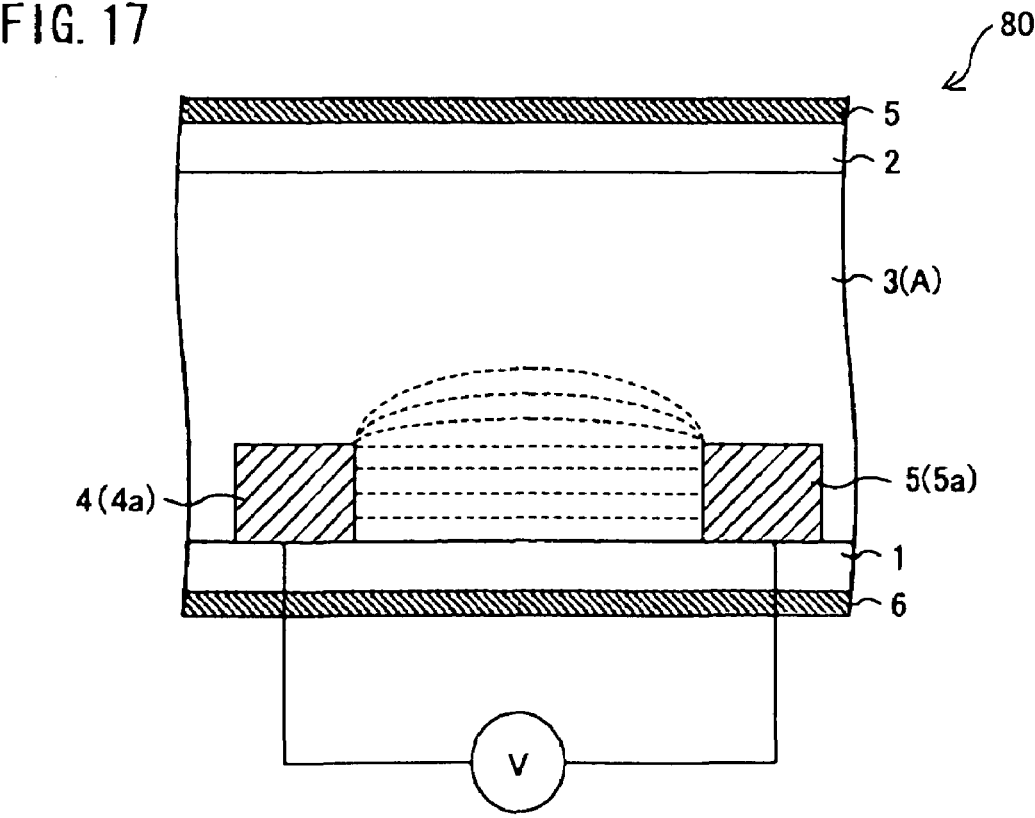
FIG. 17 is a cross-sectional view illustrating one example of a schematic arrangement of substantial parts of a display element in accordance with still another embodiment of the present invention.
Figure 18:
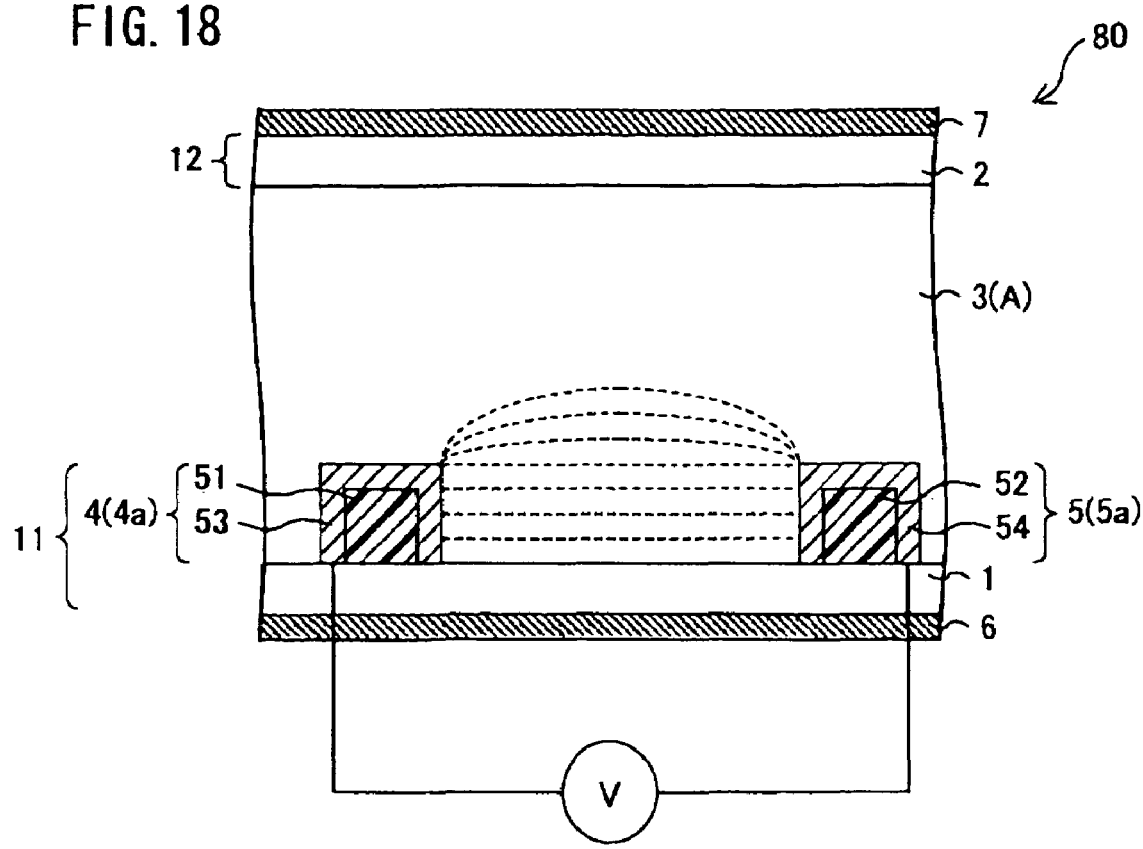
FIG. 18 is a cross-sectional view illustrating another example of a schematic arrangement of substantial parts of a display element in accordance with still another embodiment of the present invention.
Figure 19:
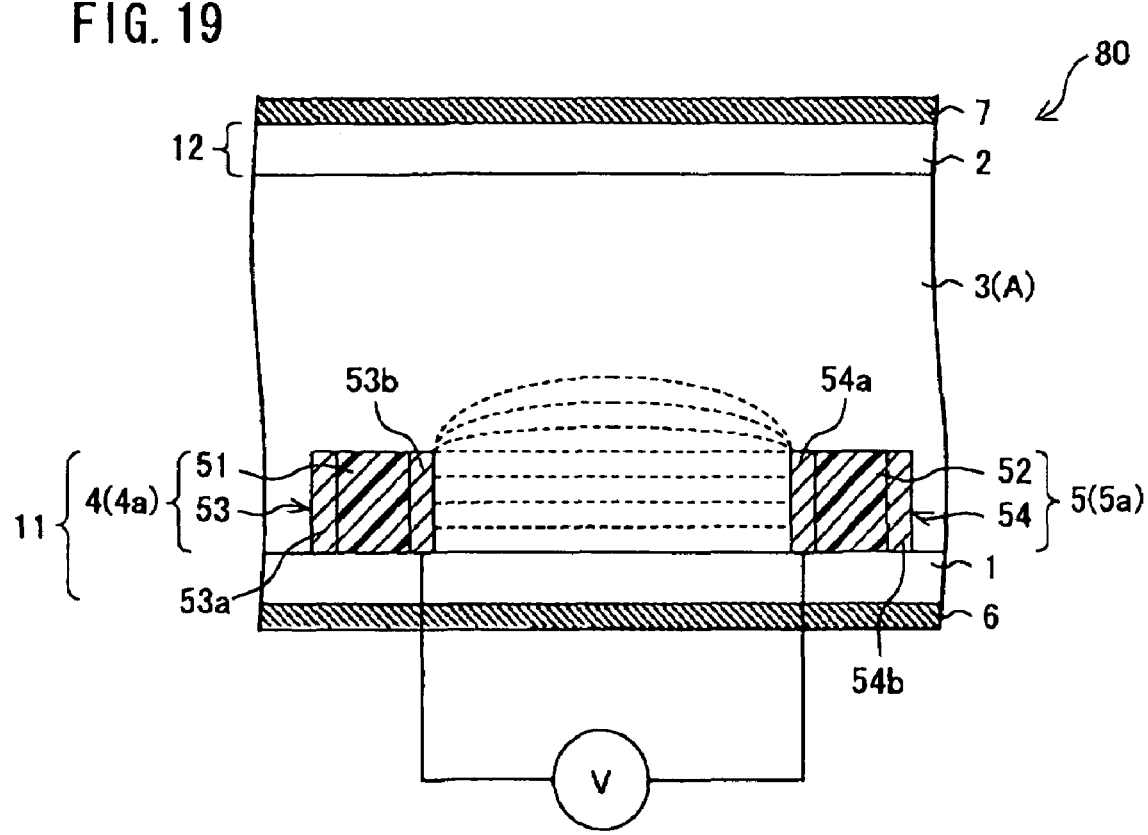
FIG. 19 is a cross-sectional view illustrating still another example of a schematic arrangement of substantial parts of a display element in accordance with still another embodiment of the present invention.

The following description explains yet another embodiment of the present invention in reference to FIGS. 17 to 19. Note that, the present embodiment mainly explains points different from points described in Embodiments 1 and 2. The same reference numerals are used for the members having the same functions as the members used in Embodiments 1 and 2, and further explanations thereof are omitted.

Each of FIGS. 17 to 19 is a cross-sectional view illustrating an example of a schematic arrangement of substantial parts of the display element in accordance with the present embodiment.

Embodiments 1 and 2 explained a case where each of the comb-shaped electrodes 4 and 5 are stacked on and above the substrate 1 via the insulating layer 21 which is formed (patterned) in a comb-like shape, which is just like the shape of each of the comb-shaped electrodes 4 and 5. The present embodiment explains a case where the thickness of the comb-shaped electrodes 4 and 5 are increased in order to increase the practical thickness and in order to reduce the driving voltage.

The display element 80 of the present embodiment is structured such that a surface area of each of the comb-shaped electrodes 4 and 5 in the substrate normal direction, more specifically, an area of each of counter surfaces of the comb-shaped electrodes 4 and 5 is increased as compared with a surface area of each of the comb-shaped electrodes 4 and 5 in the display element H illustrated in FIGS. 3(*a*) and 3(*b*).

Such electrode arrangement can be formed by carrying out the sputtering for a long time in order to form the comb-shaped electrodes 4 and 5, or by using metal, conductive paste, conductive resin, or the like in order to form the comb-shaped electrodes 4 and 5.

According to the electrode arrangement in the display element 80 illustrated in FIG. 17, the thickness of each of the comb-shaped electrodes 4 and 5 is increased (film thickening). The electrode structure illustrated in FIG. 17 can be easily formed by carrying out the sputtering for a long time.

The electrode structure of the display elements 80 illustrated in FIGS. 18 and 19 are as follows. On the substrate 1, insulating layers 51 and 52, both of which are made of the insulating materials described above, are formed by patterning so that each of the insulating layers 51 and 52 is formed in a convex shape. In other words, each of the insulating layers 51 and 52 is formed in a comb-like shape, which is just like the shape of each of the comb-shaped electrodes 4 and 5 described in Embodiment 1. After that, the insulating layers 51 and 52 are coated with the electrode materials described above.

That is, the comb-shaped electrode 4 in the display element 80 illustrated in FIG. 18 and the comb-shaped electrode 4 in the display element 80 illustrated in FIG. 19 are made of the insulating layer 51 and an electrode layer 53. Moreover, the electrode layer 53 is formed on at least a counter surface of the comb-shaped electrode 4 which counter surface is opposite to the comb-shaped electrode 5, that is, the electrode layer 53 is formed on at least each of side surfaces of the insulating layer 51. More concretely, in the display element 80 illustrated in FIG. 18, the electrode layer 53 is formed only on the side surfaces of the insulating layer 51. In the display element 80 illustrated in FIG. 19, the electrode layer 53 covers the entire surfaces of the insulating layer 51.

Similarly, the comb-shaped electrode 5 in the display element 80 illustrated in FIG. 18 and the comb-shaped electrode 5 in the display element 80 illustrated in FIG. 19 are made of the insulating layer 52 and an electrode layer 54. Moreover, the electrode layer 54 is formed on at least a counter surface of the comb-shaped electrode 5 which counter surface is opposite to the comb-shaped electrode 4, that is, the electrode layer 54 is formed at least on each of the side surfaces (oblique surfaces) of the insulating layer 52. More concretely, in the display element 80 illustrated in FIG. 19, the electrode layer 54 is formed only on each of the side surfaces (oblique surfaces) of the insulating layer 52. In the display element 80 illustrated in FIG. 18, the electrode layer 54 covers the entire surfaces of the insulating layer 52.

In the present embodiment, in any one of the display elements illustrated in FIGS. 17 to 19, the electrode thickness of each of the comb-shaped electrodes 4 and 5, that is, the height of each of the comb-shaped electrodes 4 and 5 in the substrate normal direction is set to be 2 μm. Concretely, in the display element 80 illustrated in FIG. 17, the electrode material is stacked so as to have a thickness of 2 μm. In the display element 80 illustrated in FIG. 18, the electrode layer 53 having a thickness of 0.3 μm covers the entire surfaces of the insulating layer 51 having a thickness of 1.7 μm, and also the electrode layer 54 having a thickness of 0.3 μm covers the entire surfaces of the insulating layer 52 having a thickness of 1.7 μm. In the display element 80 illustrated in FIG. 19, each of the insulating layers 51 and 52 is formed so as to have a thickness of 2 μm. After that, by using a well-known method such as plating, photolithography, or the like method, the electrode layer 53 is formed on each of the side surfaces of the insulating layer 51, and also the electrode layer 54 is formed on each of the side surfaces of the insulating layer 52. Therefore, the height of the electrode layer 53 is the same as that of the insulating layer 51, and also the height of the electrode layer 54 is the same as that of the insulating layer 52. According to the display elements illustrated in FIGS. 17 to 19, the voltage required in obtaining the maximal transimissivity is about 70V, so that the voltage reduction effect is almost the same as the case described in Embodiment 1 (about 70V) in which the insulating layer 21 has a thickness of 3.2 μm.

The reasons for this are as follows. In the display element described in Embodiment 1, the comb-shaped electrodes 4 and 5 (electrode layers) are thin-flat plates (0.3 μm). Therefore, when focusing on the electric field intensity in the substrate normal direction, the electric field intensity decreases with an increase of a distance between the electrode and a center point (interelectrode center point) which is positioned between the comb-shaped electrodes 4 and 5. However, in the display element of the present embodiment, the electrode thickness is increased, so that the electric field intensity in the substrate normal direction of the interelectrode center point does not become low as compared with the electric field intensity described in Embodiment 1.

In other words, in the medium layer 3 of the display element 80 described in Embodiment 1, there is little space where the parallel electric field is applied to the medium layer 3 by the comb-shaped electrodes 4 and 5. Meanwhile, in the medium layer 3 of the display element 80 of the present embodiment, the parallel electric field is applied to at least in a space corresponding to the electrode thickness. Moreover, the electric field does not become low. On this account, the present embodiment can obtain the same result as the result of Embodiment 1 only by setting the height of the electrodes (electrode structure) to be 2 μm.

Note that, in the display elements 80 illustrated in FIGS. 17 to 19, by setting the height of each of the comb-shaped electrodes 4 and 5 (electrode layers 53 and 54) in the substrate normal direction to be 0.5 μm or more, it is possible to obtain the voltage reduction effect drastically as compared with the conventional display element in which the electrode formed by sputtering has a thickness of 0.1 μm.

Note that, it is preferable that the height of each of the comb-shaped electrodes 4 and 5 (electrode layers 53 and 54) in the substrate normal direction be 1 μm or more. In this case, it is possible to reduce 10% or more of the voltage.

It is preferable that the height of each of the comb-shaped electrodes 4 and 5 (electrode layers 53 and 54) in the substrate normal direction be as high as possible. Moreover, within the width between the substrates 1 and 2, it is possible to set the height arbitrarily. However, there is an upper limit. In view of a process for injecting and sealing the medium A, i.e., a display medium, it is preferable that the height be shorter than the width between the substrates 1 and 2 by 1 μm or more. It is more preferable that the height be shorter than the width between the substrates 1 and 2 by 2 μm or more. When the height of each of the comb-shaped electrodes 4 and 5 (electrode layer 53 and 54) in the substrate normal direction is too high, a gap between the comb-shaped electrode 4 (5) (electrode layer 53 (54)) and a substrate (substrate 2 of the present embodiment (that is, counter substrate 12)) becomes too narrow. In this case, there is a possibility that it will be difficult to carry out a process (typically, vacuum injecting-sealing process, or dropping injecting-sealing process) of injecting and sealing the display medium (medium A) in a gap between the substrates 1 and 2 (that is, between the pixel substrate 11 and the counter substrate 12). Typically, there is a possibility that, in a gap between the substrates 1 and 2, there will remain a region where the display medium is not injected and sealed. This may cause the imperfect display. When the gap between the comb-shaped electrode 4 (5) (electrode layer 53 (54)) and the substrate 2 (counter substrate 12)) is 1 μm or more, it is possible to inject and seal the display medium in the entire gap between the substrates 1 and 2. However, it takes time in this case. In view of reliability and productivity, it is more preferable that the above-mentioned gap be 2 μm or more. In cases where it takes much time for injecting and sealing, the display medium before injecting may deteriorate. Note that, when using a process of evenly applying the display medium to one of the substrates 1 and 2 before the substrates 1 and 2 are bonded with each other, it is not necessary to consider the above-mentioned problem. Therefore, an optimal value of the height of each of the comb-shaped electrodes 4 and 5 (electrode layer 53 and 54) in the substrate normal direction is equal to the width between the substrates 1 and 2 (the pixel electrode 11 and the counter electrode 12).

Note that, as illustrated by hatched lines in FIG. 20 (a region illustrated by chain double-dashed lines), a region where the electric field intensity is maximal in the display elements 80 illustrated in FIGS. 17 to 19 is a region between a center of the comb-shaped electrode 4 (comb-teeth portion 4a) in the substrate normal direction and a center of the comb-shaped electrode 5 (comb-teeth portion 5a) in the substrate normal direction (hereinafter referred to as maximal electric field region 33). The maximal electric field region 33 is separated from the interface of the substrate 1. Therefore, it is possible to suppress the generation of the printing afterimage, and also possible to suppress the deterioration of the contrast or prevent the contrast from deteriorating.

Figure 20:
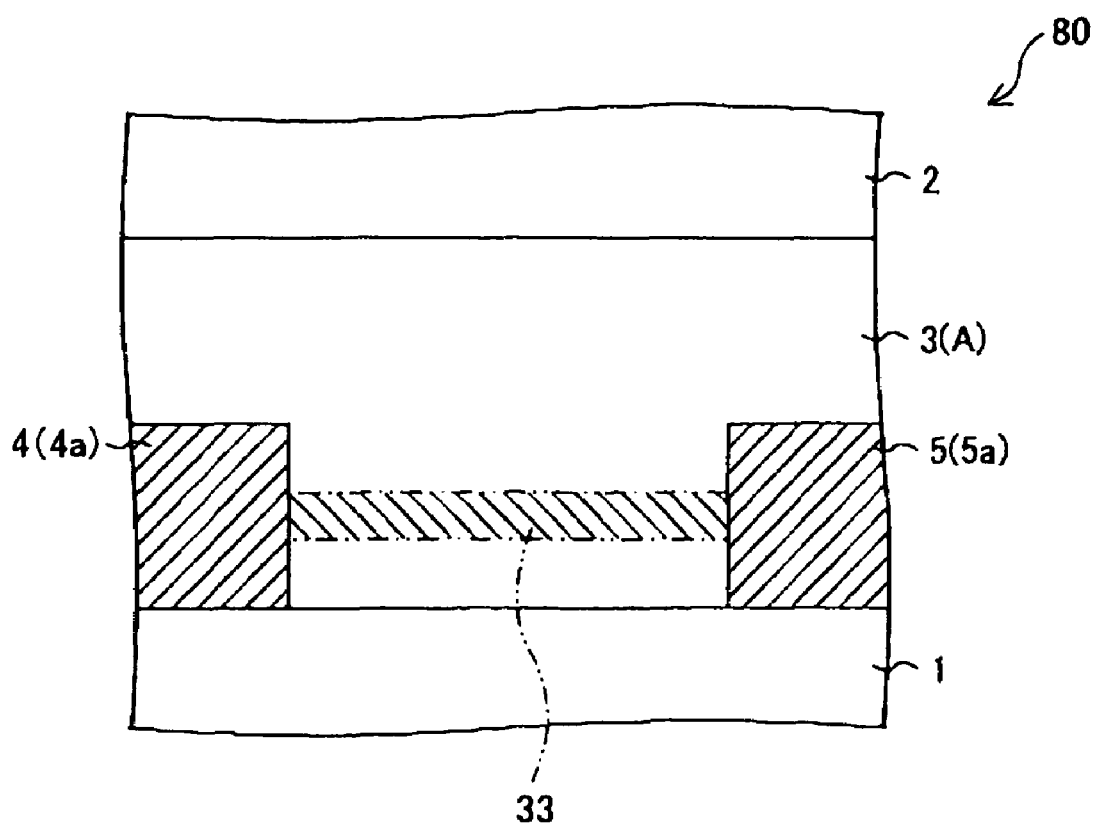
FIG. 20 is a cross-sectional view illustrating a maximal electric field region in the display element illustrated in FIG. 17.

Note that, FIG. 20 illustrates the electrode structure of the display element 80 illustrated in FIG. 17. However, the effect obtained above can be obtained by any arrangement described in the present embodiment.

Note that, in the present embodiment, the difference between the display element 80 of FIG. 18 and the display element 80 of FIG. 19 is whether or not the electrode layers 53 and 54 are respectively provided on the upper surfaces of the insulating layers 51 and 52. As illustrated in FIG. 19, when electrode layers 53a and 53b, which are respectively positioned on a left side and a right side (side surfaces) of the insulating layer 51, are not conductive with each other, and electrode layers 54a and 54b, which are respectively positioned on a left side and a right side (side surfaces) of the insulating layer 52, are not conductive with each other, that is, when the electrode layers 53a and 53b, which are provided face to face via the insulating layer 51, are not conductive, and the electrode layers 54a and 54b, which are provided face to face via the insulating layer 52, are not conductive, it is possible to use the electrode layers 53a and 54a as signal electrodes and the electrode layers 53b and 54b as counter electrodes. For example, by using the insulating layers 51 and 52 (resin layers), it is possible to form an auxiliary capacitor required in the active matrix driving.

Embodiment 4

Figure 21A:
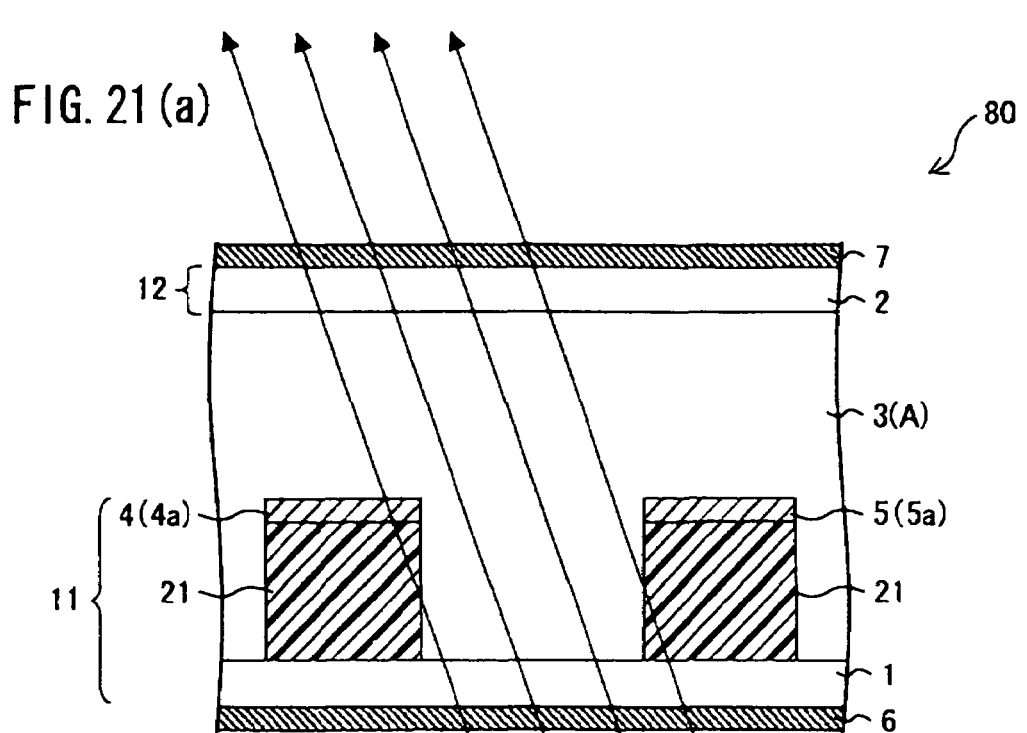
FIG. 21(a) is a cross-sectional view illustrating substantial parts of the display element illustrated in FIG. 1 and also illustrating transmitted light paths in cases where comb-shaped electrodes and insulating layers in the display element are made of translucency materials.
Figure 21B:
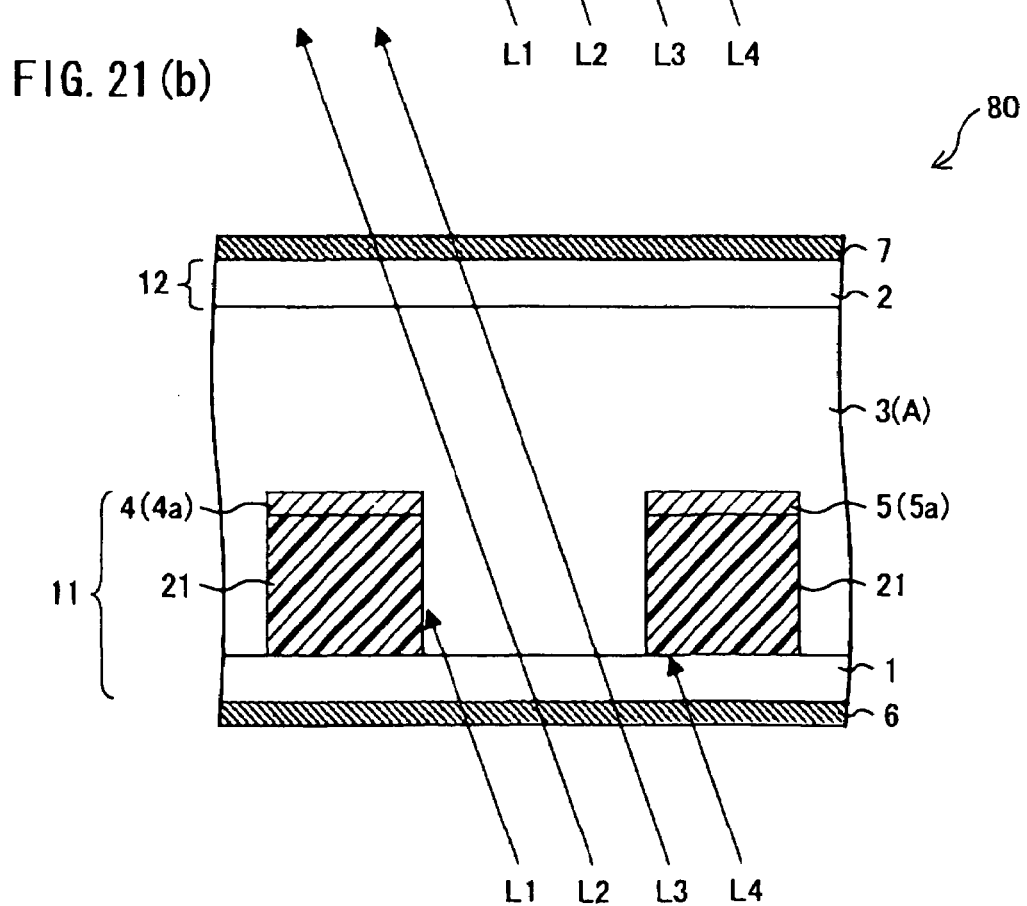
FIG. 21(b) is a cross-sectional view illustrating substantial parts of the display element illustrated in FIG. 1 and also illustrating transmitted light paths in cases where comb-shaped electrodes and insulating layers in the display element are made of non-translucency materials.

The following description explains still another embodiment of the present invention in reference to FIGS. 21(a) and 21(b). Note that, the present embodiment mainly explains points different from points described in Embodiments 1 to 3. The same reference numerals are used for the members having the same functions as the members used in Embodiments 1 to 3, and further explanations thereof are omitted.

FIG. 21(a) is a cross-sectional view of substantial parts of the display element 80 and also illustrates a transmitted light path in cases where the comb-shaped electrodes 4 and 5 and the insulating layer 21 in the display element 80 illustrated in FIG. 1 are made of translucency materials. FIG. 21(b) is a cross-sectional view of substantial parts of the display element 80 and also illustrates a transmitted light path in cases where the comb-shaped electrodes 4 and 5 and the insulating layer 21 in the display element 80 shown in FIG. 1 are made of non-translucency materials.

When the comb-shaped electrodes 4 and 5 and the insulating layer 21 (especially, the insulating layer 21) are made of the non-translucency materials as illustrated in FIG. 21(b), intensity of the transmitted light decreases as compared with a case where the comb-shaped electrodes 4 and 5 and the insulating layer 21 (especially, the insulating layer 21) are made of the translucency materials as illustrated in FIG. 21(a).

As is apparent from FIGS. 21(a) and 21(b), when the insulating layer 21 is formed by the translucency materials (preferably, transparent materials), a light path L4 among light paths L1 to L4 illustrated in FIGS. 21(a) and 21(b) is transmitted through the display element. Further, when the comb-shaped electrodes 4 and 5 are made of the translucency materials (preferably, transparent electrode materials), the light path 1 is transmitted through the display element. On this account, the intensity of the transmitted light from an oblique viewing angle does not decrease because the insulating layer 21 and/or the comb-shaped electrodes 4 and 5 do not interrupt the light from the oblique viewing angle. Therefore, for example, by using the above display element 80, it is possible to widen the viewing angle of televisions, computer monitors, and the like.

Note that, the present embodiment explained the case where the comb-shaped electrodes 4 and 5 and the insulating layer 21 in the display element illustrated in FIG. 1 are made of the translucency materials. However, the present invention is not limited to this. In each of the display elements 80 described in Embodiments 1 to 3, it is possible to obtain the above effects by using the non-translucency materials so as to form at least one of two electrodes and/or an insulating layer.

As described above, according to the present invention, it is possible to reduce the driving voltage for the display element (display element 80) to 100V or less, for example, to about 70 V or less, preferably to 60V or less, more preferably to 50V or less.

Note that, in Embodiments 1 to 4, structures (electrode structures described in Embodiments 1 to 4) different from the conventional structures are applied for the comb-shaped electrodes 4 and 5 (a signal electrode and a signal electrode). However, the present invention is not limited to this. When the structures different from the conventional structures are applied to at least one of two electrodes, the driving voltage reduction effect can be obtained. That is, an essence of the present invention is to practically increase the thickness of an applied electric field, and to increase the thickness (practical thickness) of the medium layer 3 which practically responds. The effect can be obtained by applying the structure of the present invention to at least one of two electrodes. Moreover, the effect can be maximized by applying the structure of the present invention to both electrodes.

Moreover, the display element of the present invention may be structured such that a concave portion is formed between the electrodes to which an electric field is applied, or may be structured such that, in at least a part of the electrode, the electrode is stacked via the insulating layer, or may be structured such that, in at least a part of the electrode, the electrode has a thickness of 0.5 μm or more, or may be structured such that, in at least a part of the electrode, the electrode covers the concave portion constituted of the insulating layer, or may be structured such that, in at least a part of the electrode, the electrode covers each of the oblique surfaces or the side surfaces of the concave portion constituted of the insulating layer.

As described above, the display element of the present invention is structured such that the thickness of the medium, whose magnitude of the optical anisotropy is changed by applying an electric field, is practically increased, and the thickness (practical thickness) of the medium layer which practically responds is increased.

More concretely, the display element of the present invention includes: a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein, the electrodes are provided such that a maximal electric field region is separated from interfaces of the substrates.

According to the display element of the present invention, the display is carried out by utilizing a change of the magnitude of the optical anisotropy, so that the display element of the present invention can be driven at temperatures in a wide driving temperature range, and has the wide viewing angle property and the high-speed response property. On this account, the above-described display element can be used, for example, in a display device of the field sequential color mode.

Moreover, according to the display element of the present invention, the maximal electric field region is separated from interfaces of the substrates, so that it is possible to increase the practical thickness of the medium and also possible to reduce the driving voltage as compared with the conventional cases. In addition, it is possible to suppress and prevent the printing afterimage which occurs because the molecules stuck to the interface of the substrate are aligned in the electric field direction so as to express the optical anisotropy. It is also possible to suppress and prevent the contrast deterioration which occurs due to the printing afterimage.

Such display element has at least one of the following arrangements; an arrangement in which a concave portion is formed between at least a pair of the electrodes so as to be concaved lower than the electrodes; an arrangement in which at least one of the electrodes is formed above the substrate via an insulating layer formed in a convex shape; an arrangement in which at least one of the electrodes is structured such that a plurality of electrodes are stacked via insulating layers, an arrangement in which at least one of the electrodes is formed such that a height of the electrode in a substrate normal direction is 0.5 μm or more; an arrangement in which at least one of the electrodes is formed so as to cover at least part of an insulating layer formed in a convex shape; and an arrangement in which the electrodes are formed on side surfaces of insulating layers each of which is formed in a convex shape, and electrodes which are not electrically connected to those electrodes are further provided on the side surfaces of the insulating layers.

That is, it may be so arranged that the display element of the present invention includes: a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein a concave portion is formed between the electrodes so as to be concaved lower than the electrodes.

On this account, unlike the conventional liquid crystal display elements, viscosity of the liquid crystal does not affect the response speed in the above display element. It is possible to obtain the high-speed response. Moreover, as described above, because the display element has the high-speed response property, the above-described display element can be used, for example, in a display device of the field sequential color mode.

Moreover, according to the conventional liquid crystal display elements, the driving temperature range is limited to temperatures near the phase transition point of the liquid crystal phase. Therefore, the conventional liquid crystal display elements require a highly accurate temperature control. Meanwhile, according to the present invention, the foregoing effect can be obtained merely by keeping the medium at temperatures at which the magnitude of the optical anisotropy is changeable by the application of the electric field. Thus, it is possible to easily perform the temperature control in the preset invention.

Moreover, because the display is carried out by utilizing a change of the magnitude of the optical anisotropy of the medium which is caused by application of an electric field, the display element of the present invention can obtain a wider viewing angle property than the conventional liquid crystal display element which carries out the display by changing the alignment directions of the liquid crystal molecules.

Further, according to the above arrangement, a concave portion is formed between the electrodes and is concaved lower than the electrodes, so that it is possible to effectively use components of the electric field positioned lower than the maximal electric field region, that is, positioned closer to the interface of the substrate than the maximal electric field region. Therefore, it is possible to increase the thickness (practical thickness) of the medium which practically responds. On this account, according to the above arrangement, it is possible to provide the display element whose driving voltage is reduced to be low as compared with the conventional display elements and to be able to reach a practical level.

Moreover, according to the above arrangement, a concave portion is formed between the electrodes and is concaved lower than the electrodes, so that the maximal electric field region generated by the electrodes is formed so as to be separated from the interface of the substrate. On this account, according to the above arrangement, the electrodes are provided so as to form the maximal electric field region separated from the interface of the substrate and to reduce the driving voltage, so that it is possible to suppress and prevent the printing afterimage which occurs because the molecules stuck to the interface of the substrate are aligned in the electric field direction so as to express the optical anisotropy. It is also possible to suppress and prevent the contrast deterioration which occurs due to the printing afterimage.

The display element can be realized by, for example, providing each of the electrodes on the substrate via the insulating layer formed in a convex shape.

That is, it may be so arranged that the display element of the present invention includes: a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein at least one of the electrodes is formed above the substrate via an insulating layer formed in a convex shape.

Unlike the conventional liquid crystal display elements, viscosity of the liquid crystal does not affect the response speed in the above display element. It is possible to obtain the high-speed response. Moreover, as described above, because the display element has the high-speed response property, the above-described display element can be used, for example, in a display device of the field sequential color mode.

Moreover, according to the conventional liquid crystal display elements, the driving temperature range is limited to temperatures near the phase transition point of the liquid crystal phase. Therefore, the conventional liquid crystal display elements require a highly accurate temperature control. Meanwhile, according to the present invention, the foregoing effect can be obtained merely by keeping the medium at temperatures at which the magnitude of the optical anisotropy is changeable by the application of the electric field. Thus, it is possible to easily perform the temperature control in the preset invention.

Moreover, because the display is carried out by utilizing a change of the magnitude of the optical anisotropy of the medium which is caused by application of an electric field, the display element of the present invention can obtain a wider viewing angle property than the conventional liquid crystal display element which carries out the display by changing the alignment directions of the liquid crystal molecules.

Further, according to the above arrangement, at least one of the electrodes is formed on the substrate via the insulating layer formed in a convex shape, so that it is possible to effectively use components of the electric field positioned lower than the electrode provided via the insulating layer formed in a convex shape, that is, positioned closer to the interface of the substrate than the electrode. Therefore, it is possible to increase the thickness (practical thickness) of the medium which practically responds. Moreover, the increase of the practical thickness and the driving voltage reduction effect can be obtained by applying the above arrangement to at least one of the electrodes. In case of applying the above arrangement to both of the electrodes, better effects can be obtained. On this account, according to the above arrangement, it is possible to provide the display element whose driving voltage is reduced to be low as compared with the conventional display elements and to be able to reach a practical level.

Moreover, according to the above arrangement, at least one of the electrodes is formed on the substrate via the insulating layer formed in a convex shape, so that the maximal electric field region generated by the electrodes is formed so as to be separated from the interface of the substrate. On this account, according to the above arrangement, the electrodes are provided so as to form the maximal electric field region separated from the interface of the substrate and to reduce the driving voltage, so that it is possible to suppress and prevent the printing afterimage which occurs because the molecules stuck to the interface of the substrate are aligned in the electric field direction so as to express the optical anisotropy. It is also possible to suppress and prevent the contrast deterioration which occurs due to the printing afterimage.

Further, it may be so arranged that the display element of the present invention includes: a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein at least one of the electrodes is structured such that a plurality of electrodes are stacked via insulating layers.

Unlike the conventional liquid crystal display elements, viscosity of the liquid crystal does not affect the response speed in the above display element. It is possible to obtain the high-speed response. Moreover, because the display element has the high-speed response property, the above-described display element can be used, for example, in a display device of the field sequential color mode.

Moreover, according to the conventional liquid crystal display elements, the driving temperature range is limited to temperatures near the phase transition point of the liquid crystal phase. Therefore, the conventional liquid crystal display elements require a highly accurate temperature control. Meanwhile, according to the present invention, the foregoing effect can be obtained merely by keeping the medium at temperatures at which the magnitude of the optical anisotropy is changeable by the application of the electric field. Thus, it is possible to easily perform the temperature control in the preset invention.

Moreover, because the display is carried out by utilizing a change of the magnitude of the optical anisotropy of the medium which is caused by application of an electric field, the display element of the present invention can obtain a wider viewing angle property than the conventional liquid crystal display element which carries out the display by changing the alignment directions of the liquid crystal molecules.

Further, according to the above arrangement, at least one of the electrodes has an arrangement in which a plurality of electrodes are stacked via the insulating layers, so that it is possible to effectively use components of the electric field positioned lower than the electrodes, that is, positioned closer to the interface of the substrate than the electrodes. Therefore, it is possible to increase the thickness (practical thickness) of the medium which practically responds. Especially, as compared with the display element in which a single electrode is provided, it is possible to further increase the practical thickness by providing a plurality of the electrodes via the insulating layers. As a result, it is possible to further reduce the driving voltage. Note that, the increase of the practical thickness and the driving voltage reduction effect can be obtained by applying the above arrangement to at least one of the electrodes. In case of applying the above arrangement to both of the electrodes, better effects can be obtained. On this account, according to the above arrangement, it is possible to provide the display element whose driving voltage is reduced to be low as compared with the conventional display elements and to be able to reach a practical level.

Moreover, according to the above arrangement, at least one of the electrodes has an arrangement in which a plurality of the electrodes are stacked via the insulating layers, so that the maximal electric field region generated by the electrodes is formed so as to be separated from the interface of the substrate. On this account, according to the above arrangement, the electrodes are provided so as to form the maximal electric field region separated from the interface of the substrate and to reduce the driving voltage, so that it is possible to suppress and prevent the printing afterimage which occurs because the molecules stuck to the interface of the substrate are aligned in the electric field direction so as to express the optical anisotropy. It is also possible to suppress and prevent the contrast deterioration which occurs due to the printing afterimage.

Moreover, it may be so arranged that the display element of the present invention includes: a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein at least one of the electrodes is formed such that a height of the electrode in a substrate normal direction is 0.5 μm or more.

Unlike the conventional liquid crystal display elements, viscosity of the liquid crystal does not affect the response speed in the above display element. It is possible to obtain the high-speed response. Moreover, because the display element has the high-speed response property, the above-described display element can be used, for example, in a display device of the field sequential color mode.

Moreover, according to the conventional liquid crystal display elements, the driving temperature range is limited to temperatures near the phase transition point of the liquid crystal phase. Therefore, the conventional liquid crystal display elements require a highly accurate temperature control. Meanwhile, according to the present invention, the foregoing effect can be obtained merely by keeping the medium at temperatures at which the magnitude of the optical anisotropy is changeable by the application of the electric field. Thus, it is possible to easily perform the temperature control in the preset invention.

Moreover, because the display is carried out by utilizing a change of the magnitude of the optical anisotropy of the medium which is caused by application of an electric field, the display element of the present invention can obtain a wider viewing angle property than the conventional liquid crystal display element which carries out the display by changing the alignment directions of the liquid crystal molecules.

Moreover, in cases where the electrodes are thin-flat plates, when focusing on the electric field intensity in the substrate normal direction from an interelectrode center point, the electric field intensity decreases with an increase of a distance between the electrodes and the interelectrode center point. However, in the display element of the present invention, the thickness of each of the electrodes is increased as compared with the conventional display elements, so that, because of the thickness of the electrode, the electric field intensity of the interelectrode center point in the substrate normal direction does not become low as compared with the electric field intensity of the conventional display element. In other words, in the conventional display element, there is little space where the parallel electric field is applied. Meanwhile, in the display element of the present invention, the parallel electric field is applied to at least in a space corresponding to the electrode thickness. Moreover, the electric field does not become low. On this account, according to the above arrangement, it is possible to increase the practical thickness of the medium. Then, by setting the height (for example, thickness of the electrode) of each of the electrodes in the substrate normal direction to be 0.5 µm or more, it is possible to obtain the voltage reduction effect drastically as compared with the conventional display element in which the electrode formed by sputtering (which is conventionally used) has a typical thickness of 0.1 µm. On this account, according to the above arrangement, it is possible to provide the display element whose driving voltage is reduced to be low as compared with the conventional display elements and to be able to reach a practical level.

Moreover, in the above-described display element, a region where the electric field intensity is maximal (maximal electric field region) is a region between the centers of the electrodes in the substrate normal direction. On this account, in case where the electrodes are thin flat plates like the electrodes of the conventional liquid crystal display element, there is little region where a parallel electric field is applied, and the maximal electric field region is formed substantially on the interfaces of the substrates. On the contrary, according to the above arrangement, the maximal electric field region generated by the electrodes is formed so as to be separated from the interface of the substrate. On this account, according to the above arrangement, the electrodes are provided so as to form the maximal electric field region separated from the interface of the substrate and to reduce the driving voltage, so that it is possible to suppress and prevent the printing afterimage which occurs because the molecules stuck to the interface of the substrate are aligned in the electric field direction so as to express the optical anisotropy. It is also possible to suppress and prevent the contrast deterioration which occurs due to the printing afterimage.

Moreover, it may be so arranged that the display element of the present invention includes: a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein at least one of the electrodes is formed so as to cover at least part of an insulating layer formed in a convex shape.

Unlike the conventional liquid crystal display elements, viscosity of the liquid crystal does not affect the response speed in the above display element. It is possible to obtain the high-speed response Moreover, because the display element has the high-speed response property, the above-described display element can be used, for example, in a display device of the field sequential color mode.

Moreover, according to the conventional liquid crystal display elements, the driving temperature range is limited to temperatures near the phase transition point of the liquid crystal phase. Therefore, the conventional liquid crystal display elements require a highly accurate temperature control. Meanwhile, according to the present invention, the foregoing effect can be obtained merely by keeping the medium at temperatures at which the magnitude of the optical anisotropy is changeable by the application of the electric field. Thus, it is possible to easily perform the temperature control in the preset invention.

Moreover, because the display is carried out by utilizing a change of the magnitude of the optical anisotropy in the medium caused by application of an electric field, the display element of the present invention can obtain a wider viewing angle property than the conventional liquid crystal display element which carries out the display by changing the alignment directions of the liquid crystal molecules.

Further, according to the above arrangement, at least one of the electrodes is formed so as to cover part of the insulating layer formed in a convex shape or so as to cover at least part of the insulating layer, so that it is possible to secure a region, to which the parallel electric field is applied in the medium, because of the thickness (for example, thickness of the insulating layer) of the insulating layer covered by the electrode. Moreover, because of the thickness of the insulating layer covered by the electrode, the electric field intensity of the interelectrode center point in the substrate normal direction does not become low as compared with the electric field intensity of the conventional display element, so that it is possible to increase the practical thickness of the medium. Therefore, also in this case, it is possible to provide the display element whose driving voltage is reduced to be low as compared with the conventional display elements and to be able to reach a practical level.

Moreover, according to the above arrangement, the maximal electric field region generated by the electrodes is formed so as to be separated from the interface of the substrate. On this account, according to the above arrangement, the electrodes are provided so as to form the maximal electric field region separated from the interface of the substrate and to reduce the driving voltage, so that it is possible to suppress and prevent the printing afterimage which occurs because the molecules stuck to the interface of the substrate are aligned in the electric field direction so as to express the optical anisotropy. It is also possible to suppress and prevent the contrast deterioration which occurs due to the printing afterimage. Moreover, in this case, for example, at least one of the electrodes is formed so as to cover part of the insulating layer formed in a convex shape, so that the maximal electric field region is formed so as to be separated from the interface of the substrate. On this account, the maximal electric field region can be surely formed so as to be separated from the interface of the substrate.

Moreover, it may be so arranged that the display element of the present invention includes: a pair of substrates at least one of which is transparent; a medium, sandwiched between the substrates, whose magnitude of the optical anisotropy is changed by applying an electric field; and at least a pair of electrodes for applying to the medium an electric field which is substantially parallel to the substrates, wherein: the electrodes is formed on side surfaces of insulating layers each of which is formed in a convex shape, and electrodes which are not electrically connected to those electrodes is further provided on the side surfaces of the insulating layers.

Unlike the conventional liquid crystal display elements, viscosity of the liquid crystal does not affect the response speed in the above display element. It is possible to obtain the high-speed response. Moreover, because the display element has the high-speed response property, the above-described display element can be used, for example, in a display device of the field sequential color mode.

Moreover, according to the conventional liquid crystal display elements, the driving temperature range is limited to temperatures near the phase transition point of the liquid crystal phase. Therefore, the conventional liquid crystal display elements require a highly accurate temperature control. Meanwhile, according to the present invention, the foregoing effect can be obtained merely by keeping the medium at temperatures at which the magnitude of the optical anisotropy is changeable by the application of the electric field. Thus, it is possible to easily perform the temperature control in the preset invention.

Moreover, because the display is carried out by utilizing a change of the magnitude of the optical anisotropy of the medium which is caused by application of an electric field, the display element of the present invention can obtain a wider viewing angle property than the conventional liquid crystal display element which carries out the display by changing the alignment directions of the liquid crystal molecules.

Further, according to the present invention, each of the electrodes is provided on the side surface of the insulating layer formed in a convex shape, so that it is possible to secure a region, to which the parallel electric field is applied in the medium, because of the thickness of the insulating layer. Moreover, because of the thickness of the insulating layer, the electric field intensity of the interelectrode center point in the substrate normal direction does not become low as compared with the electric field intensity of the conventional display element, so that it is possible to increase the practical thickness of the medium. Therefore, also in this case, it is possible to provide the display element whose driving voltage is reduced to be low as compared with the conventional display elements and to be able to reach a practical level.

Moreover, according to the above arrangement, the maximal electric field region generated by the electrodes is formed so as to be separated from the interface of the substrate. On this account, according to the above arrangement, the electrodes are provided so as to form the maximal electric field region separated from the interface of the substrate and to reduce the driving voltage, so that it is possible to suppress and prevent the printing afterimage which occurs because the molecules stuck to the interface of the substrate are aligned in the electric field direction so as to express the optical anisotropy. It is also possible to suppress and prevent the contrast deterioration which occurs due to the printing afterimage.

Furthermore, according to the above arrangement, other electrodes are provided on a side surface of each of the insulating layers so as not to be conductive with the electrodes, so that it is possible to use one electrode provided on an insulating layer as a signal electrode and another electrode provided on the insulating layer as a counter electrode. For example, an auxiliary capacitor required for the active matrix driving can be formed by the insulating layer.

It is preferable that the insulating layer in the display element have translucency.

Moreover, it is preferable that at least one of the electrodes in the display element have translucency.

At least one of the electrodes and/or the insulating layer have the translucency, so that, as compared with a case where at least one of the electrodes and/or the insulating layer do not have the translucency, the intensity of the transmitted light does not decrease. For example, it is possible to widen the viewing angle of televisions, computer monitors, and the like.

Moreover, the medium maybe such a medium that is optically isotropic when no electric field is applied, and becomes optically anisotropic when the electric field is applied. In this case, the shape of the refractive index ellipsoid is globular when no electric field is applied, and becomes ellipsoidal when the electric field is applied. Moreover, the medium may be such a medium that is optically anisotropic when no electric field is applied, and becomes optically isotropic when the electric field is applied. In this case, the shape of the refractive index ellipsoid is ellipsoidal when no electric field is applied, and becomes globular when the electric field is applied. Furthermore, the medium may be such a medium that is optically anisotropic when no electric field is applied thereon, and that the magnitude of its optical anisotropy, which has been already existed, is changed by and according to the electric field applied thereon. In this case, the ratio of the major axial length over the minor axial length of the refractive index ellipsoid is changed before and after the electric field application (the shape of the refractive index ellipsoid may be substantially globular).

With any of these arrangements, it is possible to change the shape of the refractive index ellipsoid depending on whether or not the electric field is applied. Thus, it is possible to perform the display operation by changing the magnitude of the optical anisotropy (orientational order parameter, refractive index), even though the direction of the optical anisotropy is constant. Therefore, with any of these arrangements, it is possible to realize a display element whose display state is changeable between a time when the electric field is applied and a time when no electric field is applied, and which has a wide driving temperature range, a wide viewing angle, and high-responding capability.

Moreover, it is preferable that the medium be such a medium that has an orientational order when the electric field is applied or when no electric field is applied, the orientational order being smaller than the wavelength of the visible light. That is, it is preferable that, when the electric field is applied or when no electric field is applied, the medium is not in an isotropic liquid phase, but in a phase which has an order (orderly structure, orientational order) in a scale smaller than the wavelength of the visible light. When the orderly structure is smaller than the wavelength of the visible light, the medium is optically isotropic. Therefore, by using the medium in which the orientational order becomes smaller than the wavelength of the visible light when the electric field is applied or when no electric field is applied, it is possible to surely change the display state between when the electric field is applied and when no electric field is applied.

The medium may have an orderly structure having a cubic symmetry.

The medium may be constituted of molecules that show cubic phase or smectic D phase.

The medium may be a liquid crystal microemulsion.

The medium may be a lyotropic liquid crystal that shows a micelle phase, a reverse micelle phase, a sponge phase or a cubic phase.

The medium may be a liquid crystal fine particle dispersion system that shows a micelle phase, a reverse micelle phase, a sponge phase or a cubic phase.

The medium may be a dendrimer.

The medium may be constituted of molecules that show a cholesteric blue phase.

The medium may be a material that shows a smectic blue phase.

In any one of the materials listed above, magnitude of the optical anisotropy is changeable by and according to an electric field applied thereon. Thus, any one of the materials can be used as the medium.

As described above, the display element according to the present invention is such an excellent display element in which the wide viewing angle property and fast responding property are attained (the viewing angle is wide and the responding speed is fast). The display element is applicable, for example, in image display apparatus (display device) such as televisions, monitors and the like; OA apparatus such as word processors, personal computers, and the like; and image display apparatus (display device) for use in video cameras, digital cameras, information terminals such as portable phones. Moreover, the display element according to the present invention is applicable in display devices having a large screen or displaying moving pictures, because the display element according to the present invention, as described above, has the wide viewing angle property and the fast responding property, and can reduce the driving voltage as compared with the conventional display elements. Moreover, the fast responding property of the display element allows the use of display element, for example, in a display device of field sequential color mode.

Moreover, the display device according to the present invention is provided with the display element according to the present invention, as described above. Therefore, the display device according to the present invention has a wide driving temperature range, a wide viewing angle property, and a high-speed response property. Further, the display device according to the present invention require a low driving voltage as compared with the conventional ones, that is, the driving voltage is reduced so as to reach a practical level. Moreover, according to the display device of the present invention, it is possible to suppress and prevent the contrast deterioration which occurs due to the printing afterimage.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display element, comprising:
   a pair of substrates at least one of which is transparent;
   a medium, sandwiched between the substrates, whose magnitude of an optical anisotropy is changed by applying an electric field; and
   at least a pair of electrodes for applying to the medium an electric field which is substantially parallel to the substrates, wherein,
   said at least a pair of electrodes are provided such that a maximal electric field region is separated from interfaces of the substrates.

2. The display element as set forth in claim 1, wherein at least one of the electrodes has translucency.

3. The display element as set forth in claim 1, wherein the medium shows an optical isotropy when no electric field is applied, and shows an optical anisotropy when an electric field is applied.

4. The display element as set forth in claim 1, wherein the medium shows the optical anisotropy when no electric field is applied, and shows the optical isotropy when the electric field is applied.

5. The display element as set forth in claim 1, wherein the medium has an orientational order in a scale smaller than a wavelength of visible light when an electric field is applied or when no electric field is applied.

6. The display element as set forth in claim 1, wherein the medium has an orderly structure showing a cubic symmetry.

7. The display element as set forth in claim 1, wherein the medium is constituted of molecules in a cubic phase or in a smectic D phase.

8. The display element as set forth in claim 1, wherein the medium is constituted of a liquid crystal microemulsion.

9. The display element as set forth in claim 1, wherein the medium is constituted of lyotropic liquid crystal in a micelle phase, in a reverse micelle phase, in a sponge phase, or in a cubic phase.

10. The display element as set forth in claim 1, wherein the medium is constituted of a liquid crystal fine particle dispersion system in a micelle phase, in a reverse micelle phase, in a sponge phase, or in a cubic phase.

11. The display element as set forth in claim 1, wherein the medium is constituted of a dendrimer.

12. The display element as set forth in claim 1, wherein the medium is constituted of molecules in a cholesteric blue phase.

13. The display element as set forth in claim 1, wherein the medium is constituted of molecules in a smectic blue phase.

14. A display element, comprising:
    a pair of substrates at least one of which is transparent;
    a medium, sandwiched between the substrates, whose magnitude of an optical anisotropy is changed by applying an electric field; and
    at least a pair of electrodes for applying to the medium an electric field which is substantially parallel to the substrates, wherein
    a concave portion is formed between the electrodes so as to be concaved lower than the electrodes.

15. The display element as set forth in claim 14, wherein at least one of the electrodes has translucency.

16. The display element as set forth in claim 14, wherein the medium shows an optical isotropy when no electric field is applied, and shows an optical anisotropy when an electric field is applied.

17. The display element as set forth in claim 14, wherein the medium shows the optical anisotropy when no electric field is applied, and shows the optical isotropy when the electric field is applied.

18. The display element as set forth in claim 14, wherein the medium has an orientational order in a scale smaller than a wavelength of visible light when an electric field is applied or when no electric field is applied.

19. The display element as set forth in claim 14, wherein the medium has an orderly structure showing a cubic symmetry.

20. The display element as set forth in claim 14, wherein the medium is constituted of molecules in a cubic phase or in a smectic D phase.

21. The display element as set forth in claim 14, wherein the medium is constituted of a liquid crystal microemulsion.

22. The display element as set forth in claim 14, wherein the medium is constituted of lyotropic liquid crystal in a micelle phase, in a reverse micelle phase, in a sponge phase, or in a cubic phase.

23. The display element as set forth in claim 14, wherein the medium is constituted of a liquid crystal fine particle dispersion system in a micelle phase, in a reverse micelle phase, in a sponge phase, or in a cubic phase.

24. The display element as set forth in claim 14, wherein the medium is constituted of a dendrimer.

25. The display element as set forth in claim 14, wherein the medium is constituted of molecules in a cholesteric blue phase.

26. The display element as set forth in claim 14, wherein the medium is constituted of molecules in a smectic blue phase.

27. A display element, comprising:
a pair of substrates at least one of which is transparent;
a medium, sandwiched between the substrates, whose magnitude of an optical anisotropy is changed by applying an electric field; and
at least a pair of electrodes for applying to the medium an electric field which is substantially parallel to the substrates, wherein
at least one of the electrodes is formed above the substrate via an insulating layer formed in a convex shape.

28. The display element as set forth in claim 27, wherein the insulating layer has translucency.

29. The display element as set forth in claim 27, wherein at least one of the electrodes has translucency.

30. The display element as set forth in claim 27, wherein the medium shows an optical isotropy when no electric field is applied, and shows an optical anisotropy when an electric field is applied.

31. The display element as set forth in claim 27, wherein the medium shows the optical anisotropy when no electric field is applied, and shows the optical isotropy when the electric field is applied.

32. The display element as set forth in claim 27, wherein the medium has an orientational order in a scale smaller than a wavelength of visible light when an electric field is applied or when no electric field is applied.

33. The display element as set forth in claim 27, wherein the medium has an orderly structure showing a cubic symmetry.

34. The display element as set forth in claim 27, wherein the medium is constituted of molecules in a cubic phase or in a smectic D phase.

35. The display element as set forth in claim 27, wherein the medium is constituted of a liquid crystal microemulsion.

36. The display element as set forth in claim 27, wherein the medium is constituted of lyotropic liquid crystal in a micelle phase, in a reverse micelle phase, in a sponge phase, or in a cubic phase.

37. The display element as set forth in claim 27, wherein the medium is constituted of a liquid crystal fine particle dispersion system in a micelle phase, in a reverse micelle phase, in a sponge phase, or in a cubic phase.

38. The display element as set forth in claim 27, wherein the medium is constituted of a dendrimer.

39. The display element as set forth in claim 27, wherein the medium is constituted of molecules in a cholesteric blue phase.

40. The display element as set forth in claim 27, wherein the medium is constituted of molecules in a smectic blue phase.

41. A display element, comprising:
a pair of substrates at least one of which is transparent;
a medium, sandwiched between the substrates, whose magnitude of an optical anisotropy is changed by applying an electric field; and
at least a pair of electrodes for applying to the medium an electric field which is substantially parallel to the substrates, wherein
at least one of the electrodes is structured such that a plurality of electrodes are stacked via insulating layers.

42. The display element as set forth in claim 41, wherein the insulating layer has translucency.

43. The display element as set forth in claim 41, wherein at least one of the electrodes has translucency.

44. The display element as set forth in claim 43, wherein the medium shows an optical isotropy when no electric field is applied, and shows an optical anisotropy when an electric field is applied.

45. The display element as set forth in claim 43, wherein the medium shows the optical anisotropy when no electric field is applied, and shows the optical isotropy when the electric field is applied.

46. The display element as set forth in claim 43, wherein the medium has an orientational order in a scale smaller than a wavelength of visible light when an electric field is applied or when no electric field is applied.

47. The display element as set forth in claim 43, wherein the medium has an orderly structure showing a cubic symmetry.

48. The display element as set forth in claim 43, wherein the medium is constituted of molecules in a cubic phase or in a smectic D phase.

49. The display element as set forth in claim 43, wherein the medium is constituted of a liquid crystal microemulsion.

50. The display element as set forth in claim 43, wherein the medium is constituted of lyotropic liquid crystal in a micelle phase, in a reverse micelle phase, in a sponge phase, or in a cubic phase.

51. The display element as set forth in claim 43, wherein the medium is constituted of a liquid crystal fine particle dispersion system in a micelle phase, in a reverse micelle phase, in a sponge phase, or in a cubic phase.

52. The display element as set forth in claim 43, wherein the medium is constituted of a dendrimer.

53. The display element as set forth in claim 43, wherein the medium is constituted of molecules in a cholesteric blue phase.

54. The display element as set forth in claim 43, wherein the medium is constituted of molecules in a smectic blue phase.

55. A display element, comprising:
a pair of substrates at least one of which is transparent;
a medium, sandwiched between the substrates, whose magnitude of an optical anisotropy is changed by applying an electric field; and
at least a pair of electrodes for applying to the medium an electric field which is substantially parallel to the substrates, wherein
at least one of the electrodes is formed such that a height of the electrode in a substrate normal direction is 0.5 µm or more.

56. The display element as set forth in claim 55, wherein at least one of the electrodes has translucency.

57. The display element as set forth in claim 55, wherein the medium shows an optical isotropy when no electric field is applied, and shows an optical anisotropy when an electric field is applied.

58. The display element as set forth in claim 55, wherein the medium shows the optical anisotropy when no electric field is applied, and shows the optical isotropy when the electric field is applied.

59. The display element as set forth in claim 55, wherein the medium has an orientational order in a scale smaller than a wavelength of visible light when an electric field is applied or when no electric field is applied.

60. The display element as set forth in claim 55, wherein the medium has an orderly structure showing a cubic symmetry.

61. The display element as set forth in claim 55, wherein the medium is constituted of molecules in a cubic phase or in a smectic D phase.

62. The display element as set forth in claim 55, wherein the medium is constituted of a liquid crystal microemulsion.

63. The display element as set forth in claim 55, wherein the medium is constituted of lyotropic liquid crystal in a micelle phase, in a reverse micelle phase, in a sponge phase, or in a cubic phase.

64. The display element as set forth in claim 55, wherein the medium is constituted of a liquid crystal fine particle dispersion system in a micelle phase, in a reverse micelle phase, in a sponge phase, or in a cubic phase.

65. The display element as set forth in claim 55, wherein the medium is constituted of a dendrimer.

66. The display element as set forth in claim 55, wherein the medium is constituted of molecules in a cholesteric blue phase.

67. The display element as set forth in claim 55, wherein the medium is constituted of molecules in a smectic blue phase.

68. A display element, comprising:
a pair of substrates at least one of which is transparent;
a medium, sandwiched between the substrates, whose magnitude of an optical anisotropy is changed by applying an electric field; and
at least a pair of electrodes for applying to the medium an electric field which is substantially parallel to the substrates, wherein
at least one of the electrodes is formed so as to cover at least part of an insulating layer formed in a convex shape.

69. The display element as set forth in claim 68, wherein the insulating layer has translucency.

70. The display element as set forth in claim 68, wherein at least one of the electrodes has translucency.

71. The display element as set forth in claim 68, wherein the medium shows an optical isotropy when no electric field is applied, and shows an optical anisotropy when an electric field is applied.

72. The display element as set forth in claim 68, wherein the medium shows the optical anisotropy when no electric field is applied, and shows the optical isotropy when the electric field is applied.

73. The display element as set forth in claim 68, wherein the medium has an orientational order in a scale smaller than a wavelength of visible light when an electric field is applied or when no electric field is applied.

74. The display element as set forth in claim 68, wherein the medium has an orderly structure showing a cubic symmetry.

75. The display element as set forth in claim 68, wherein the medium is constituted of molecules in a cubic phase or in a smectic D phase.

76. The display element as set forth in claim 68, wherein the medium is constituted of a liquid crystal microemulsion.

77. The display element as set forth in claim 68, wherein the medium is constituted of lyotropic liquid crystal in a micelle phase, in a reverse micelle phase, in a sponge phase, or in a cubic phase.

78. The display element as set forth in claim 68, wherein the medium is constituted of a liquid crystal fine particle dispersion system in a micelle phase, in a reverse micelle phase, in a sponge phase, or in a cubic phase.

79. The display element as set forth in claim 68, wherein the medium is constituted of a dendrimer.

80. The display element as set forth in claim 68, wherein the medium is constituted of molecules in a cholesteric blue phase.

81. The display element as set forth in claim 68, wherein the medium is constituted of molecules in a smectic blue phase.

82. A display element, comprising:
a pair of substrates at least one of which is transparent;
a medium, sandwiched between the substrates, whose magnitude of an optical anisotropy is changed by applying an electric field; and
at least a pair of electrodes for applying to the medium an electric field which is substantially parallel to the substrates, wherein:
the electrodes are formed on side surfaces of insulating layers each of which is formed in a convex shape, and
electrodes which are not electrically connected to those electrodes are further provided on the side surfaces of the insulating layers.

83. The display element as set forth in claim 82, wherein the insulating layer has translucency.

84. The display element as set forth in claim 82, wherein at least one of the electrodes has translucency.

85. The display element as set forth in claim 82, wherein the medium shows an optical isotropy when no electric field is applied, and shows an optical anisotropy when an electric field is applied.

86. The display element as set forth in claim 82, wherein the medium shows the optical anisotropy when no electric field is applied, and shows the optical isotropy when the electric field is applied.

87. The display element as set forth in claim 82, wherein the medium has an orientational order in a scale smaller than a wavelength of visible light when an electric field is applied or when no electric field is applied.

88. The display element as set forth in claim 82, wherein the medium has an orderly structure showing a cubic symmetry.

89. The display element as set forth in claim 82, wherein the medium is constituted of molecules in a cubic phase or in a smectic D phase.

90. The display element as set forth in claim 82, wherein the medium is constituted of a liquid crystal microemulsion.

91. The display element as set forth in claim 82, wherein the medium is constituted of lyotropic liquid crystal in a micelle phase, in a reverse micelle phase, in a sponge phase, or in a cubic phase.

92. The display element as set forth in claim 82, wherein the medium is constituted of a liquid crystal fine particle dispersion system in a micelle phase, in a reverse micelle phase, in a sponge phase, or in a cubic phase.

93. The display element as set forth in claim 82, wherein the medium is constituted of a dendrimer.

94. The display element as set forth in claim 82, wherein the medium is constituted of molecules in a cholesteric blue phase.

95. The display element as set forth in claim 82, wherein the medium is constituted of molecules in a smectic blue phase.

96. A display device, comprising a display element which includes:
a pair of substrate at least one of which is transparent;
a medium, sandwiched between the substrates, whose magnitude of an optical anisotropy is changed by applying an electric field; and
at least a pair of electrodes for applying to the medium an electric field which is substantially parallel to the substrates, wherein, said at least a pair of electrodes are provided such that a maximal electric field region is separated from interfaces of the substrates.

97. A display device, comprising a display element which includes:
- a pair of substrates at least one of which is transparent;
- a medium, sandwiched between the substrates, whose magnitude of an optical anisotropy is changed by applying an electric field; and
- at least a pair of electrodes for applying to the medium an electric field which is substantially parallel to the substrates, wherein
- a concave portion is formed between the electrodes so as to be concaved lower than the electrodes.

98. A display device, comprising a display element which includes:
- a pair of substrates at least one of which is transparent;
- a medium, sandwiched between the substrates, whose magnitude of an optical anisotropy is changed by applying an electric field; and
- at least a pair of electrodes for applying to the medium an electric field which is substantially parallel to the substrates, wherein
- at least one of the electrodes is formed above the substrate via an insulating layer formed in a convex shape.

99. A display device, comprising a display element which includes:
- a pair of substrates at least one of which is transparent;
- a medium, sandwiched between the substrates, whose magnitude of an optical anisotropy is changed by applying an electric field; and
- at least a pair of electrodes for applying to the medium an electric field which is substantially parallel to the substrates, wherein
- at least one of the electrodes is structured such that a plurality of electrodes are stacked via insulating layers.

100. A display device, comprising a display element which includes:
- a pair of substrates at least one of which is transparent;
- a medium, sandwiched between the substrates, whose magnitude of an optical anisotropy is changed by applying an electric field; and
- at least a pair of electrodes for applying to the medium an electric field which is substantially parallel to the substrates, wherein
- at least one of the electrodes is formed such that a height of the electrode in a substrate normal direction is 0.5 µm or more.

101. A display device, comprising a display element which includes:
- a pair of substrates at least one of which is transparent;
- a medium, sandwiched between the substrates, whose magnitude of an optical anisotropy is changed by applying an electric field; and
- at least a pair of electrodes for applying to the medium an electric field which is substantially parallel to the substrates, wherein
- at least one of the electrodes is formed so as to cover at least part of an insulating layer formed in a convex shape.

102. A display device, comprising a display element which includes:
- a pair of substrates at least one of which is transparent;
- a medium, sandwiched between the substrates, whose magnitude of an optical anisotropy is changed by applying an electric field; and
- at least a pair of electrodes for applying to the medium an electric field which is substantially parallel to the substrates, wherein:
- the electrodes are formed on side surfaces of insulating layers each of which is formed in a convex shape, and
- electrodes which are not electrically connected to those electrodes are further provided on the side surfaces of the insulating layers.

* * * * *